United States Patent
Yamamoto et al.

(10) Patent No.: US 9,049,669 B2
(45) Date of Patent: Jun. 2, 2015

(54) BASE STATION DEVICE AND TERMINAL DEVICE

(75) Inventors: Takashi Yamamoto, Osaka (JP); Yoshizo Tanaka, Osaka (JP); Eiji Mochida, Osaka (JP)

(73) Assignee: SUMITOMO ELECTRIC INDUSTRIES, LTD., Osaka-shi, Osaka (JP)

(*) Notice: Subject to any disclaimer, the term of this patent is extended or adjusted under 35 U.S.C. 154(b) by 66 days.

(21) Appl. No.: 13/583,960

(22) PCT Filed: Mar. 22, 2011

(86) PCT No.: PCT/JP2011/056828
§ 371 (c)(1), (2), (4) Date: Sep. 11, 2012

(87) PCT Pub. No.: WO2011/118577
PCT Pub. Date: Sep. 29, 2011

(65) Prior Publication Data
US 2013/0003680 A1    Jan. 3, 2013

(30) Foreign Application Priority Data

Mar. 23, 2010 (JP) .................. 2010-066205
Apr. 5, 2010 (JP) .................. 2010-087109
Apr. 5, 2010 (JP) .................. 2010-087194

(51) Int. Cl.
*H04W 28/04* (2009.01)
*H04W 72/04* (2009.01)
(Continued)

(52) U.S. Cl.
CPC .......... *H04W 52/244* (2013.01); *G01S 5/0205* (2013.01); *H04W 72/1231* (2013.01); *H04W 80/02* (2013.01); *H04W 88/08* (2013.01); *G01S 5/0009* (2013.01); *G01S 5/0252* (2013.01);
(Continued)

(58) Field of Classification Search
USPC ................... 370/328, 329, 338, 437
See application file for complete search history.

(56) References Cited

U.S. PATENT DOCUMENTS 7,672,674 B2 * 3/2010 Mahany et al. ............ 455/452.2
7,764,662 B2 * 7/2010 Oh et al. ...................... 370/343
(Continued)

FOREIGN PATENT DOCUMENTS

JP    2002-26808    1/2002
JP    2005-189154   7/2005
(Continued)

OTHER PUBLICATIONS

Takeshi Hattori et al., "HSPA+/LTE-SAE Textbook," Impress R&D, Aug. 1, 2009, p. 140, including concise explanation of relevance.
(Continued)

*Primary Examiner* — Hong Cho
(74) *Attorney, Agent, or Firm* — Drinker Biddle & Reath LLP

(57) ABSTRACT

A base station device is provided with a MAC unit 30 which performs processing on a MAC layer for wireless communication, a scheduler 10 which performs scheduling for determining allocation of radio resources, and a radio resource management unit 70 which manages the radio resources. The scheduler 10 is connected to the radio resource management unit 70 so as to obtain information from the radio resource management unit 70 without intervention of the MAC unit 30.

18 Claims, 28 Drawing Sheets

(51) Int. Cl.

| | |
|---|---|
| *H04W 52/34* | (2009.01) |
| *H04W 52/24* | (2009.01) |
| *G01S 5/02* | (2010.01) |
| *G01S 5/00* | (2006.01) |
| *H04W 72/08* | (2009.01) |
| *H04W 72/12* | (2009.01) |
| *H04W 80/02* | (2009.01) |
| *H04W 88/08* | (2009.01) |

(52) U.S. Cl.
CPC ............ *G01S5/0278* (2013.01); *H04W 28/048* (2013.01); *H04W 72/082* (2013.01); *H04W 72/0426* (2013.01); *H04W 52/346* (2013.01)

(56) References Cited

U.S. PATENT DOCUMENTS

| | | | | |
|---|---|---|---|---|
| 7,936,716 | B2* | 5/2011 | Jang et al. | 370/329 |
| 7,995,521 | B2* | 8/2011 | Sung et al. | 370/328 |
| 8,145,223 | B2* | 3/2012 | Guey | 455/447 |
| 8,208,432 | B2* | 6/2012 | Takashima | 370/329 |
| 8,229,445 | B2* | 7/2012 | Jeong et al. | 455/450 |
| 2008/0056184 | A1* | 3/2008 | Green | 370/329 |
| 2008/0254819 | A1* | 10/2008 | Niwano et al. | 455/522 |
| 2009/0069043 | A1* | 3/2009 | Roh et al. | 455/522 |
| 2009/0147706 | A1* | 6/2009 | Yu et al. | 370/277 |
| 2009/0207785 | A1* | 8/2009 | Smith et al. | 370/328 |
| 2009/0219870 | A1* | 9/2009 | Wengerter et al. | 370/329 |
| 2009/0253448 | A1* | 10/2009 | Kwon et al. | 455/501 |
| 2009/0279495 | A1* | 11/2009 | Yoo | 370/329 |
| 2009/0323574 | A1* | 12/2009 | Koskinen et al. | 370/312 |
| 2010/0182972 | A1* | 7/2010 | Katayama et al. | 370/329 |
| 2011/0218002 | A1* | 9/2011 | Hong et al. | 455/501 |

FOREIGN PATENT DOCUMENTS

| | | |
|---|---|---|
| JP | 2006-109169 | 4/2006 |
| JP | 2009-81818 | 4/2009 |
| JP | 2009-219114 | 9/2009 |
| JP | 2009-261035 | 11/2009 |
| JP | 2010-38895 | 2/2010 |
| JP | 2010-50961 | 3/2010 |
| WO | 2007/058270 | 5/2007 |
| WO | 2007/148704 | 12/2007 |
| WO | 2007/148707 | 12/2007 |
| WO | 2008/007437 | 1/2008 |
| WO | 2010/024107 | 3/2010 |

OTHER PUBLICATIONS

Emmanuelle Vivier, "Radio Resources Management in Wimax," Iste/Hermes Science Pub, 2009, p. 241.

Nobuyoshi Kikuma, "Adaptive Signal Processing Using Array Antenna," Kagaku Gijutsu Shuppan, Nov. 25, 1998, pp. 1-347, including concise explanation of relevance.

* cited by examiner

FIG. 18

CALCULATE PENALTY VALUE OF USER k

RB NUMBERS ALLOCATED TO USER k: 1, 2, 3, 4
ONE GROUP
⇩
PENALTY VALUE $f_k = 1$

RB NUMBERS ALLOCATED TO USER k: 1, 2, 3, 4 , 10, 11
TWO GROUPS
⇩
PENALTY VALUE $f_k = 2$

RB NUMBERS ALLOCATED TO USER k: 1 , 3 , 5 , 7
FOUR GROUPS
⇩
PENALTY VALUE $f_k = 4$

FIG. 25
(a)
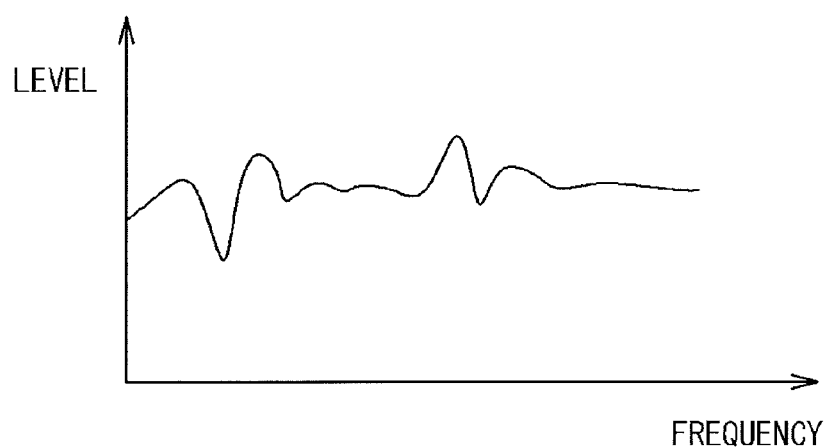
(b)
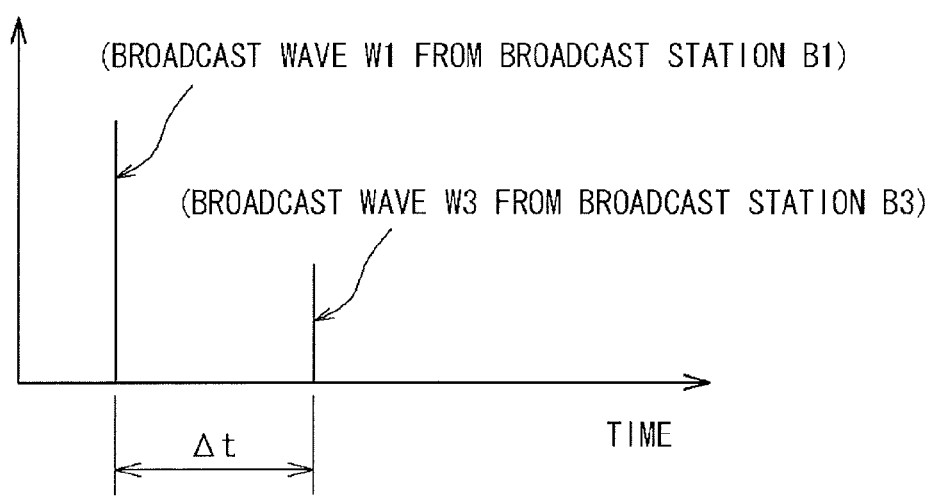

BASE STATION DEVICE AND TERMINAL DEVICE

TECHNICAL FIELD

The present invention relates to base station devices and terminal devices.

BACKGROUND ART

<Background Art 1>

A base station device is provided with a scheduler that performs scheduling to determine radio resources (frequencies, times, and the like) to be allocated to terminal devices.

The scheduler enables to appropriately determine allocation of radio resources to each terminal in accordance with the radio wave condition or the like.

In LTE (Long Term Evolution), the scheduler is configured as a function of MAC (Media Access Control; second layer) for wireless communication, i.e., as a MAC scheduler.

FIG. 9 illustrates a layer structure relating to wireless communication of a base station device in the LTE. This layer structure includes PHY (Physical Layer) as a first layer relating to wireless communication, and MAC as a layer higher than the PHY. The scheduler is a function of the MAC.

RLC (Radio Link Control)/PDCP (Packet Data Convergence Protocol) is provided above the MAC. The RLC (Radio Link Control) has a signal retransmission function and the like, and the PDCP (Packet Data Convergence Protocol) has a security function and the like (refer to Non-Patent Literature 1).

Further, RRC (Radio Resource Control), RRM (Radio Resource Management), and NAS (Non-Access Stratum) are provided above the RLC/PDCP.

As described above, in the LTE, the functions relating to management of radio resources, such as the RRC (Radio Resource Control) and the RRM (Radio Resource Management), are provided in the base station device.

The RRM included in the layers above the MAC manages the radio resources, and provides the MAC scheduler with information required for scheduling (schedule information). The schedule information provided from the RRM includes QoS (Quality of Service) information and the like.

The PHY as a layer lower than the MAC obtains CQI (Channel Quality Indicator) information, and the CQI information is sometimes provided as schedule information to the MAC scheduler.

<Background Art 2>

Generally, a base station device is provided with a scheduler that determines radio resources (frequencies, times, and the like) to be allocated to terminal devices.

As a conventional scheduling algorithm for determining allocation of radio resources, for example, round robin is known (refer to Non-Patent Literature 2). In the round robin scheduling, almost the same amount of radio resources are allocated to terminal devices (users) in order.

Meanwhile, proportional fairness is also known as a scheduling algorithm, in which allocation of radio resources is performed in consideration of the quality values of communication with terminal devices.

<Background Art 3>

In a wireless communication system having a plurality of base station devices, if communication areas (cells) set by the respective base station devices overlap each other, a signal transmitted from a certain base station device may reach a terminal device existing in a cell of another base station device located near the base station device, and the signal may become an interference signal for the terminal device.

It is well known that such interference can be suppressed by beam forming. That is, by performing beam forming such that a beam is directed to a terminal device (hereinafter also referred to as "own terminal device") existing in a cell of the (certain) base station device while a null beam is directed to the terminal device (hereinafter also referred to as "another terminal device") existing in the cell of the another base station device, the signal (interference signal) from the (certain) base station device becomes less likely to reach the another terminal device, thereby suppressing interference (refer to Non-Patent Literature 3 for beam forming).

CITATION LIST

Non Patent Literature

Non-Patent Literature 1: "HSPA+/LTE/SAE TEXTBOOK", written and edited by Takeshi Hattori and Masanobu Fujioka, Impress R&D, Aug. 1, 2009, pp. 140

Non-Patent Literature 2: Viver, Emmanuelle, "Radio Resource Management in Wimax", Iste/Hermes Science Pub, 2009, pp. 241

Non-Patent Literature 3: "Adaptive Signal Processing Using Array Antennas", written by Nobuyoshi Kikuma, Kagaku Gijutsu Shuppan, Nov. 25, 1998

SUMMARY OF THE INVENTION

Problems to be Solved by the Invention

Regarding the above <Background Art 1>, the scheduler is required to perform scheduling at a high speed. For example, in the LTE, allocation information of resource blocks (minimum units of resource allocation) as radio resources is stored in each radio subframe, and the period of the subframe is 1 msec.

Accordingly, the MAC and the scheduler included in the MAC need to operate with a period of 1 msec which is the period of the subframe. That is, scheduling per subframe is desired to be completed within 1 msec. If the scheduling is not completed within 1 msec, appropriate scheduling may not be performed.

Since the scheduler is included in the MAC, the MAC obtains schedule information from another layer function such as the RRM, and the scheduler performs scheduling by using the schedule information obtained by the MAC.

The MAC performs various kinds of processes other than the process of dealing with the schedule information. Accordingly, the process of dealing with the schedule information causes increase in the processing load on the MAC.

Such increase in the processing load on the MAC makes the MAC difficult to operate with a period of 1 msec which is the period of the subframe. As a result, it becomes difficult for the scheduler provided in the MAC to perform appropriate scheduling.

On the other hand, in order to suppress such increase in the processing load on the MAC, the clock rate of a processor that implements the function as the MAC needs to be increased, which causes increase in the cost of the base station device.

The present invention is made in view of the above-described problems, and has an object (first object) to enable the scheduler to quickly deal with information while suppressing increase in the load on the MAC.

Regarding the above <Background Art 2>, the conventional radio resource allocation schemes using the scheduler were only simply allocating radio resources to terminal devices in order, such as the round robin, and allocating radio resources to terminal devices in view of communication qualities. That is, in the convention allocation of radio resources by using the scheduler, the allocation has not been determined in view of suppression of inter-cell interference.

However, the inventors of the present invention have conceived an idea that appropriate radio resource allocation in view of suppression of inter-cell interference can be performed by newly taking into consideration a transmission power limit value for each radio resource when performing allocation of radio resources by the scheduler.

The inter-cell interference means that a transmission signal from a base station device becomes an interference signal for a terminal device connected to another base station device, or that a transmission signal from a terminal device connected to a base station device becomes an interference signal for another base station device.

Such inter-cell interference is more likely to occur when a femto base station device that forms a relatively small femto cell having a size of about several tens of meters is located in a relatively large macro cell formed by a macro base station device. This is because the macro cell and the femto cell overlap each other, and a signal from the macro cell (femto cell) easily reaches the femto cell (macro cell).

In order to reduce the inter-cell interference, it is considered to limit the magnitude of the power (transmission power) of a signal transmitted from a base station device or a terminal device. The smaller the transmission power of the signal, the less the likelihood that the signal reaches another cell, and thus suppression of inter-cell interference can be expected.

When the magnitude of the transmission power is to be limited as described above, it is considered to compulsorily limit the transmission power of the signal in the PHY that performs a process in the physical layer level of the signal.

However, in the case where the transmission power of the signal is simply limited compulsorily as the process in the physical layer level, such limitation is performed independently from the radio resource allocation process by the scheduler (generally, the process by the MAC), and therefore, the limitation of the transmission power has no influence on the radio resource allocation process.

The magnitude of the transmission power might have an influence on the throughput. The transmission power and the throughput could be factors that influence the manner of radio resource allocation, depending on the scheduling algorithm adopted by the scheduler.

Accordingly, when the magnitude of the transmission power is to be limited, it is more appropriate, in view of suppression of inter-cell interference, to determine the radio resource allocation in consideration of the transmission power limit value.

The present invention is made based on the above-described idea, and has an object (second object) to provide a base station device capable of performing appropriate radio resource allocation (scheduling) in view of suppression of inter-cell interference.

Regarding the above <Background Art 3>, the wireless communication system includes, as base station devices, a macro base station device that forms a cell (macro cell) having a size of several kilometers, and a femto base station device that is located in the macro cell and forms a relatively small cell (femto cell) having a size of several tens of meters.

In the wireless communication system, the femto cell of the femto base station device may be formed in the macro cell. In this case, almost the entire area of the femto cell overlaps the macro cell. Further, since the femto base station device is installed at an arbitrary position in the macro cell by a user, a downlink signal transmitted from the macro base station device may interfere with a terminal device connected to the femto base station device, or an uplink signal transmitted from a terminal device connected to the macro base station device may interfere with the femto base station device.

So, it is considered that the macro base station device utilizes the above-described beam forming. However, the macro base station device does not know a direction in which a null beam should be transmitted, and therefore, it is difficult to successfully suppress interference.

In order to control the interference suppression, it is preferred that the macro base station device can obtain the location of the femto base station device. For this purpose, it is preferred that the femto base station device has a GPS receiver, obtains its own location based on a GPS signal, and transmits information indicating this location to the macro base station device in some way.

However, when using a GPS signal, the femto base station device needs to be installed in a place with a fine view. If the femto base station device is installed in a place with a bad view such as indoors, since the radio wave of the GPS signal is weak, it is difficult for the femto base station device to obtain the accurate location thereof.

Therefore, the present invention has an object (third object) to provide new technical means that allows a base station device to estimate its own location.

Solution to the Problems (1-1) In order to achieve the first object, the present invention is a base station device including: a MAC unit which performs processing on a MAC layer for wireless communication; a scheduler which performs scheduling for determining allocation of radio resources; and a radio resource management unit which manages the radio resources. The scheduler is connected to the radio resource management unit so as to obtain information from the radio resource management unit without intervention of the MAC unit.

According to the present invention, the scheduler can obtain the information without intervention of the MAC unit. Therefore, the scheduler can obtain the necessary information from the radio resource management unit, while avoiding a delay due to intervention of the MAC unit. Moreover, since the information does not pass through the MAC unit, increase in the load on the MAC unit can be suppressed.

(1-2) Preferably, the scheduler is configured to obtain schedule information required for the scheduling, from the radio resource management unit without intervention of the MAC unit. In this case, the scheduler can obtain the schedule information from the radio resource management unit without intervention of the MAC unit.

(1-3) Preferably, the radio resource management unit is configured to enable exchange of information between base station devices via an inter-base-station communication interface, and the scheduler obtains, as the schedule information, information received by the radio resource management unit from another base station device via the inter-base-station communication interface. In this case, the scheduler can perform scheduling based on the information obtained from the another base station device.

(1-4) Preferably, the schedule information includes interference control information that is used for interference control for suppressing inter-cell interference, and the scheduler performs the scheduling so as to suppress the inter-cell interference by using the interference control information. In this case, the scheduler can perform scheduling so as to suppress interference.

(1-5) Preferably, the scheduler is configured to provide allocation information indicating the result of the allocation of the radio resources, to the radio resource management unit without intervention of the MAC unit. In this case, the scheduler can quickly provide the allocation information to the radio resource management unit without intervention of the MAC unit.

(1-6) Preferably, the radio resource management unit is configured to transmit the allocation information obtained from the scheduler, to another base station device via the inter-base-station communication interface. In this case, the radio resource management unit can quickly transmit the obtained allocation information to the another base station device without intervention of the MAC unit. Accordingly, the another base station device can quickly obtain the allocation information.

(1-7) Preferably, the scheduler is connected to a PHY unit which performs processing on a PHY layer that is a layer lower than the MAC layer, so as to provide information to the PHY unit without intervention of the MAC unit. In this case, the scheduler can quickly provide the necessary information to the PHY unit without intervention of the MAC unit.

(1-8) Preferably, the scheduler is configured to provide allocation information indicating the result of the allocation of the radio resources, to the PHY unit without intervention of the MAC unit. In this case, the scheduler can quickly provide the allocation information to the PHY unit without intervention of the MAC unit.

(1-9) Preferably, the scheduler is connected to the PHY unit so as to obtain information from the PHY unit without intervention of the MAC unit. In this case, the scheduler can quickly obtain necessary information from the PHY unit without intervention of the MAC unit.

(1-10) Preferably, the PHY unit is configured to generate, from a reception signal, schedule information required for the scheduling, and the scheduler is configured to obtain the schedule information from the PHY unit without intervention of the MAC unit. In this case, the scheduler can quickly obtain the schedule information generated by the PHY unit, from the PHY unit.

(1-11) According to another aspect, the present invention is a base station device comprising: a MAC unit which performs processing on a MAC layer for wireless communication; a scheduler which performs scheduling for determining allocation of radio resources; and a radio resource management unit which manages the radio resources. The scheduler is connected to the radio resource management unit so as to provide information to the radio resource management unit without intervention of the MAC unit.

According to the present invention, the scheduler can quickly provide necessary information to the radio resource management unit without intervention of the MAC unit.

(1-12) According to another aspect, the present invention is a base station device comprising: a MAC unit which performs processing on a MAC layer for wireless communication; a PHY unit which performs processing on a PHY layer for wireless communication; and a scheduler which performs scheduling for determining allocation of radio resources. The scheduler is connected to the PHY unit so as to provide information to the PHY unit without intervention of the MAC unit.

According to the present invention, the scheduler can quickly provide necessary information to the PHY unit without intervention of the MAC unit.

(1-13) According to another aspect, the present invention is a base station device comprising: a MAC unit which performs processing on a MAC layer for wireless communication; a PHY unit which performs processing on a PHY layer for wireless communication; and a scheduler which performs scheduling for determining allocation of radio resources. The scheduler is connected to the PHY unit so as to obtain information from the PHY unit without intervention of the MAC unit.

According to the present invention, the scheduler can quickly obtain necessary information from the PHY unit without intervention of the MAC unit.

(2-1) In order to achieve the second object, the present invention is a base station device including a scheduler which determines allocation of a plurality of radio resources to terminal devices. The scheduler is configured to perform power allocation scheduling for determining the allocation of the radio resources to the terminal devices, and a transmission power value for each radio resource, by using a transmission power limit value for each of the plurality of radio resources.

According to the present invention, since the scheduler is configured to determine the allocation of the radio resources to the terminal devices, and the transmission power value, by using the transmission power limit value for each of the plurality of radio resources, the scheduler can perform scheduling in view of the transmission power limit value.

(2-2) Preferably, the scheduler is configured to optimize a predetermined evaluation function by using, as a constraint, the transmission power limit value for each of the plurality of radio resources, thereby performing the power allocation scheduling. In this case, the transmission power limit value for each of the plurality of radio resources is considered as a constraint in optimizing the evaluation function.

(2-3) Preferably, the evaluation function includes, as an adjustment parameter thereof, the transmission power value for each of the plurality of radio resources, and the scheduler is configured to adjust the transmission power value for each of the plurality of radio resources, which is the adjustment parameter, by using, as a constraint, the transmission power limit value for each of the plurality of radio resources, thereby optimizing the evaluation function. In this case, the transmission power value for each radio resource is adjusted based on, as a constraint, the transmission power limit value for each of the plurality of radio resources.

(2-4) Preferably, the evaluation function includes, as an adjustment parameter thereof, information indicating which radio resource is to be allocated to which terminal device.

(2-5) Preferably, the evaluation function includes, as parameters thereof, a priority of each terminal device and/or a communication quality value of each radio resource. In this case, allocation can be determined in view of the priority and/or the communication quality.

(2-6) Preferably, the base station device includes a delay information generation section which generates the priority of each terminal device, based on data delay information indicating a transmission delay state of data to be transmitted to each terminal device, and the delay information generation section is configured to provide the priority of each terminal device to the scheduler.

(2-7) Preferably, the base station device includes a data buffer which performs buffering of the data to be transmitted to each terminal device, and the data buffer is configured to provide the data delay information indicating the transmission delay state of the data to be transmitted to each terminal device, to the delay information generation section.

(2-8) Preferably, the base station device includes a communication quality provision section which provides the communication quality value to the scheduler.

(2-9) Preferably, the base station device includes an adaptive modulation control section which adaptively determines a modulation method for each terminal device, based on the allocation of the radio resources to the terminal devices and the transmission power value for each radio resource, which are obtained from the scheduler.

(2-10) Preferably, the evaluation function is an evaluation function relating to throughput.

(2-11) Preferably, the evaluation function is an evaluation function relating to the amount of radio resources used by each terminal device.

(2-12) Preferably, the evaluation function is an evaluation function relating to transmission power.

(2-13) Preferably, the scheduler includes a control area scheduler which secures, in a radio frame, a control area in which control information is stored, and an audio/video scheduler which determines allocation of the radio resources so that some of remaining radio resources that have not been secured as the control area are secured as an audio/video area in which audio and/or video data are stored. The audio/video scheduler is configured to minimize the evaluation function indicating the sum of the transmission power values of the radio resources to be the audio/video area, by using, as a constraint, the transmission power limit value for each radio resource, thereby performing the power allocation scheduling. In this case, the area other than the control area can be secured as the audio/video area.

(2-14) Preferably, the scheduler further includes a retransmission scheduler which determines allocation of the radio resources so that some of remaining radio resources which have been secured as neither the control area nor the audio/video area are secured as a retransmission data area in which retransmission data is stored. The retransmission scheduler is configured to minimize the evaluation function indicating the sum of the transmission power values of the radio resources to be the retransmission data area by using, as a constraint, the transmission power limit value for each radio resource, thereby performing the power allocation scheduling. In this case, the remaining area that has been secured as neither the control area nor the audio/video area can be secured as the retransmission area.

(2-15) Preferably, the scheduler further includes a data information scheduler which determines allocation of the radio resources so that remaining radio resources that have been secured as none of the control area, the audio/video area, and the retransmission area are secured as a general data area in which user data other than the audio/video data and the retransmission data are stored. The data information scheduler is configured to maximize the evaluation function indicating the sum of the throughputs of the radio resources to be the general data area by using, as a constraint, the transmission power limit value for each radio resource, thereby performing the power allocation scheduling. In this case, the remaining area that has been secured as none of the control area, the audio/video area, and the retransmission area is secured as the general data area in which user data other than the audio/video data and the retransmission data are stored.

(2-16) Preferably, the evaluation function includes, as adjustment parameters thereof, the transmission power value for each radio resource, and the information indicating which radio resource is to be allocated to which terminal device. The scheduler has a first mode in which the power allocation scheduling is performed by adjusting both the transmission power value for each radio resource, and the information indicating which radio resource is to be allocated to which terminal device, and a second mode in which the power allocation scheduling is performed by adjusting the information indicating which radio resource is to be allocated to which terminal device, without adjusting the transmission power value for each radio resource. In this case, the scheduler can properly use the first mode and the second mode.

(2-17) Preferably, the evaluation function has, as a parameter thereof, a penalty value that is calculated based on the manner of allocation of the radio resources to the terminal devices, and the penalty value is calculated such that the greater the degree of dispersion, in a radio frame, of resource blocks allocated to the same terminal device is, the greater the penalty value is. Since allocation in which the radio resources allocated to the same terminal device disperse in the radio frame causes increase in the penalty value, such allocation can be suppressed.

(2-18) Preferably, the base station device further includes a power limitation control section which sets a transmission power limit value for each of the plurality of radio resources, and the scheduler is configured to obtain the transmission power limit value for each of the plurality of radio resources, from the power limitation control section. In this case, the scheduler can determine allocation by using the transmission power limit value set by the power limitation control section.

(2-19) Preferably, the power limitation control section is configured to set, as the transmission power limit value, a transmission power value at which inter-cell interference can be suppressed, for each of the plurality of radio resources. In this case, the inter-cell interference can be suppressed.

(2-20) Preferably, the transmission power limit value is obtained from another base station device via a wired interface between the base station devices, or generated based on information obtained from another base station device via the wired interface.

(2-21) Preferably, the transmission power limit value is generated based on a measured value of a radio communication signal in another base station device.

(2-22) Preferably, the transmission power limit value is generated based on information obtained from another base station device via a wired interference between the base station devices, and on a measured value of a radio communication signal in another base station device.

(3-1) In order to achieve the third object, the present invention is a base station device including: a transmission/reception unit which transmits and receives radio signals to and from a terminal device to communicate with the terminal device; and a signal processing unit which performs signal processing on transmission and reception signals exchanged with the transmission/reception unit. The base station device further includes: a broadcast-wave reception unit which receives broadcast signals transmitted from a plurality of broadcast stations; and a position estimation unit which estimates the position of the base station device by using the reception powers of the broadcast waves transmitted from the plurality of broadcast stations and received by the broadcast-wave reception unit.

Since there is correlation between the distance from a broadcast station and the reception power of a broadcast wave broadcast from the broadcast station, the position estimation unit can estimate the position of the base station device, based on the reception powers of the broadcast waves broadcast from the plurality of broadcast stations.

With a broadcast wave broadcast from a single broadcast station, the position estimation unit can estimate the distance from the broadcast station, but cannot determine the direction, from the broadcast station, in which the base station device exists. In the present invention, however, since the broadcast waves broadcast from the plurality of broadcast stations are used, the position estimation unit can estimate the position of the base station device.

(3-2) The position estimation unit may include: an obtaining section which obtains position estimation information, the position estimation information relating to each of a plurality of broadcast stations that broadcast broadcast waves to an area where the base station device is located, and being used for estimating the position of the base station device from the reception powers of the broadcast waves broadcast from the plurality of broadcast stations; and an estimation main section which estimates the position of the base station device based on the reception powers of the broadcast waves received by the broadcast-wave reception unit, and on the position estimation information.

In this case, when the obtaining section obtains the position estimation information, the estimation main section can estimate the position of the base station device, based on the reception powers of the broadcast waves received by the broadcast-wave reception unit, and on the position estimation information.

Further, since the position estimation information used for position estimation is information relating to each of the plurality of broadcast stations that broadcast broadcast waves to the area where the base station device is located, the base station device identifies the area, and obtains the position estimation information relating to the broadcast stations in the neighborhood of the area.

(3-3) As means for identifying the area where the base station device is installed, for example, the user may input the installation position (area) into the base station device when the base station device is installed, and thereby the base station device can select broadcast stations that broadcast broadcast waves to the installation position (area). However, the position estimation unit may include a selection section which identifies an area where the base station device is installed, based on the broadcast waves received by the broadcast-wave reception unit, and selects a plurality of broadcast stations that transmit broadcast waves to the area. The obtaining section may obtain the position estimation information for each of the plurality of broadcast stations selected by the selection section.

In this case, the selection section identifies the area where the base station device is installed, based on the broadcast waves received by the broadcast-wave reception unit, thereby selecting a plurality of broadcast stations that transmit broadcast waves to the area. For example, the selection section can identify the area where the base station device is installed with reference to area codes included in the broadcast waves, and the selection section can select a plurality of broadcast stations that broadcast broadcast waves to the area, based on information in which an area and a broadcast station that broadcasts a radio wave to the area are associated with each other and stored in advance.

Then, the obtaining section can obtain the position estimation information for each of the selected plurality of broadcast stations, from a network or the like.

(3-4) The position estimation unit includes a reception power measurement section which measures the reception powers of the broadcast waves transmitted from the broadcast stations and received by the broadcast-wave reception unit. The position estimation information is position-power correspondence information in which a position from each broadcast station, and the reception power of the broadcast wave from the broadcast station, which can be received at the position, are associated with each other and stored. The estimation main section estimates the position of the base station device, based on the reception powers of the broadcast waves transmitted from the plurality of broadcast stations and measured by the reception power measurement section, and on the position-power correspondence information.

In this case, the reception power measurement section measures the reception powers of the broadcast waves broadcast from the broadcast stations, and thereby the estimation main unit can estimate the position of the base station device by using the reception powers and the position estimation information.

(3-5) Further, the plurality of broadcast waves transmitted from the plurality of broadcast stations, which are used by the position estimation unit to estimate the position of the base station device, may be broadcast waves whose frequencies do not overlap each other. In this case, the position estimation unit can distinguish the plurality of broadcast waves, and estimate the position of the base station device by using the reception powers of the respective broadcast waves.

(3-6) Further, the plurality of broadcast waves that are transmitted from the plurality of broadcast stations and are to be used by the position estimation unit to estimate the position of the base station device, may include broadcast waves that have the same frequency and are synchronously transmitted from the broadcast stations. In this case, the position estimation unit obtains a difference in reception time between the broadcast waves of the same frequency, and estimates that the position of the base station device exists in an area where the reception time difference occurs.

When broadcast waves of the same frequency are synchronously transmitted from different broadcast stations, the broadcast-wave reception unit receives a signal of a multipath channel. By subjecting this signal to, for example, inverse Fourier transform to represent the signal in a time domain, the position estimation unit can obtain a difference in reception time between the plurality of broadcast waves.

Since an area where such reception time difference occurs is limited, the position estimation unit can estimate that the position of the base station device exists in the area where the reception time difference occurs. For example, an area in which broadcast waves of the same frequency, which have been simultaneously transmitted from two broadcast stations, are received with a predetermined reception time difference is an area on a hyperbolic curve between the two broadcast stations. In this way, the area in which the reception time difference occurs can be limited, and the area can be used for estimation of the position of the base station device.

(3-7) Although the above-described base station device estimates its own position by using the broadcast waves, a terminal device may estimate its own position by using broadcast waves, and transmit the estimated positional information to a base station device. Upon receiving the position information, the base station device may estimate its own position.

That is, the present invention is a base station device including: a transmission/reception unit which transmits and receives radio signals to and from a terminal device to communicate with the terminal device; and a signal processing unit which performs signal processing on transmission and reception signals exchanged with the transmission/reception unit. The base station device further includes: the transmission/reception unit which receives, from a terminal device that estimates its own position by using the reception powers of broadcast waves transmitted from a plurality of broadcast stations, information of the position of the terminal device; and a position estimation unit which estimates the position of the base station device, based on the information of the position of the terminal device, which is received by the transmission/reception unit.

According to the present invention, when the terminal device estimates its own position by using the reception powers of the broadcast waves transmitted from the plurality of broadcast stations, the transmission/reception unit of the base station device receives information of the position of the terminal device from the terminal device, and the position estimation unit in the base station device can estimate the position of the base station device, based on the information of the position of the terminal device.

(3-8) The present invention is a terminal device including: a transmission/reception unit which transmits and receives radio signals to and from a base station device to communicate with the base station device; and a signal processing unit which performs signal processing on transmission and reception signals exchanged with the transmission/reception unit. The terminal device further includes: a broadcast-wave reception unit which receives broadcast waves transmitted from a plurality of broadcast stations; and a position estimation unit which estimates the position of the terminal device by using the reception powers of the broadcast waves transmitted from the plurality of broadcast stations and received by the broadcast wave reception unit. The transmission/reception unit transmits, to the base station device, information of the position of the terminal device estimated by the position estimation unit, and thereby causes the base station device to estimate the position of the base station device.

According to the present invention, when the position estimation unit of the terminal device estimates its own position by using the reception powers of the broadcast waves transmitted from the plurality of broadcast stations, the transmission/reception unit of the terminal device transmits information of the estimated position to the base station device. Thereby, the base station device can estimate its own position, based on the information of the position of the terminal device.

BRIEF DESCRIPTION OF THE DRAWINGS

FIG. 18 is a diagram illustrating a penalty value calculating method.

FIG. 25 is a diagram for explaining a process performed by a position estimation unit.

DESCRIPTION OF EMBODIMENTS

<Chapter 1>

Hereinafter, an embodiment of the present invention will be described in detail with reference to the drawings.

Figure 1:
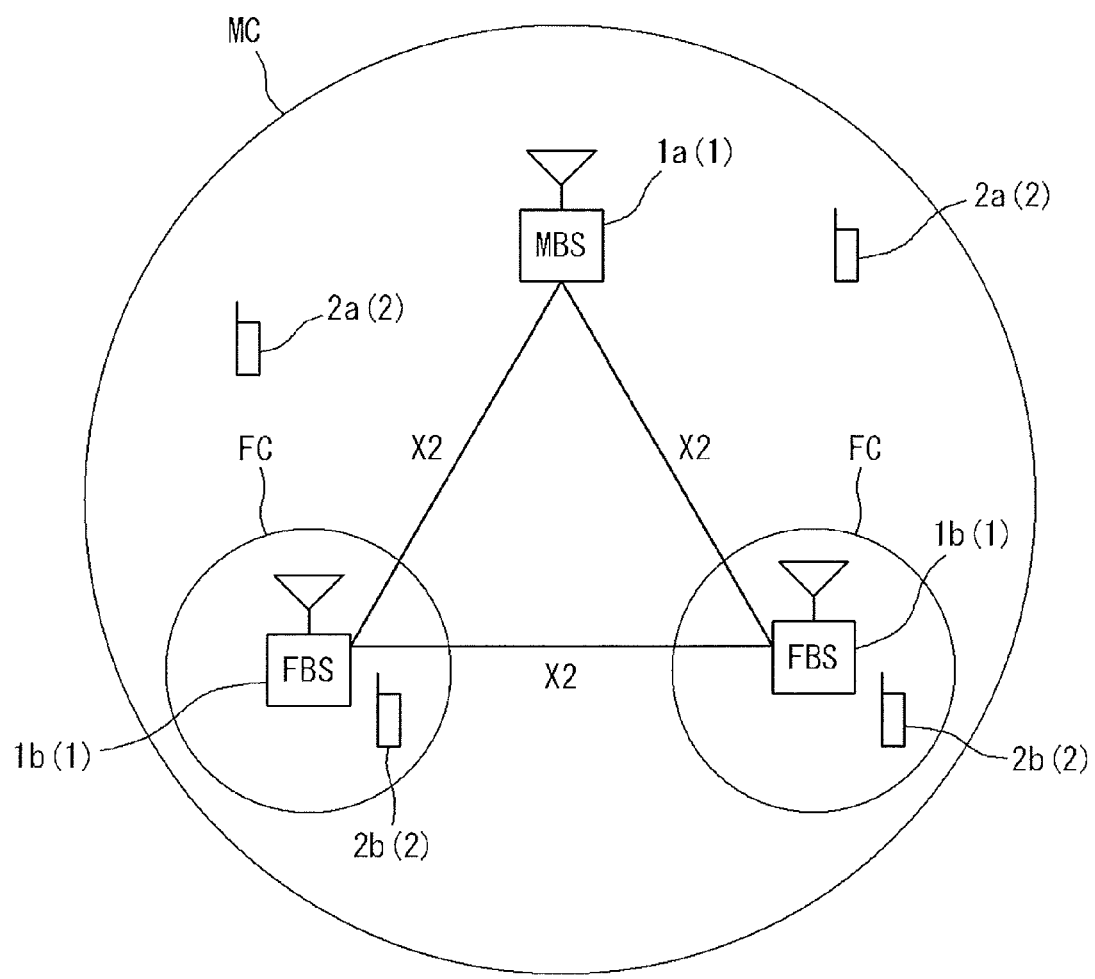
FIG. 1 is a schematic diagram illustrating a configuration of a wireless communication system including a base station device according to the present invention.

FIG. 1 illustrates a configuration of a wireless communication system including a base station device of the present invention. The wireless communication system of the present embodiment is, for example, a system for mobile phones to which LTE (Long Term Evolution) is applied, and communication based on the LTE is performed between each base station device and each terminal device. However, the communication scheme is not limited to the LTE.

The wireless communication system includes a plurality of base station devices 1. A terminal device (mobile station) 2 as a mobile terminal is allowed to wirelessly access any of the base station devices 1, and communicate with the base station device 1.

The base station devices 1 provided in the wireless communication system include: a macro base station device 1a forming a communication area (macro cell) MC having a size of several kilometers; and a plurality of femto base station devices 1b each being installed in the macro cell MC or the like, and forming a relatively small femto cell FC having a size of several tens of meters.

The macro base station device (hereinafter also referred to as "macro BS") 1a is allowed to wirelessly communicate with a terminal device 2 existing in its own macro cell MC.

On the other hand, each femto base station device (hereinafter also referred to as "femto BS") 1b is installed in a place where it is difficult for the terminal device 2 to receive a radio signal from the macro BS 1a, such as indoors, and forms a femto cell FC.

The femto BS 1*b* is allowed to wirelessly communicate with a terminal device (hereinafter also referred to as "MS") 2 existing in its own femto cell FC. In this system, the femto BS 1*b* that forms a relatively small femto cell FC is installed in a place where it is difficult for the MS 2 to receive a radio signal from the macro BS 1*a*, thereby enabling provision of services with sufficient throughput to the MS 2.

In the following description, an MS 2 connected to the femto BS 1*b* is sometimes referred to as a femto MS 2*b*, and an MS 2 connected to the macro BS 1*a* is sometimes referred to as a macro MS 2*a*.

A plurality of base station devices 1*a*, 1*b*, and 1*b* are allowed to exchange information through an inter-base-station communication interface called an X2 interface. This inter-base-station communication interface is implemented by a wired network, and is used for, for example, transmitting later-described schedule information from a base station device to another base station device.

In the LTE, frequency division duplex (FDD) is adopted, and uplink communication and downlink communication can be simultaneously performed by allocating different operating frequencies to an uplink signal (a transmission signal from a terminal device to a base station device) and a downlink signal (a transmission signal from the base station device to the terminal device), respectively.

Since even a plurality of different cells may use the same frequency for communication, inter-cell interference may occur between a plurality of cells (particularly between a macro cell MC and a femto cell FC). The inter-cell interference means that a transmission signal from a base station device becomes an interference signal for a terminal device connected to another base station device, or that a transmission signal from a terminal device connected to a base station device becomes an interference signal for another base station device.

Such inter-cell interference is more likely to occur when a femto BS 1*b* that forms a relatively small femto cell FC having a size of several tens of meters is installed in a relatively large macro cell MC. This is because the macro cell MC and the femto cell FC overlap each other, and a signal from the macro cell MC (femto cell FC) easily reaches the femto cell FC (macro cell MC).

In order to suppress such inter-cell interference, it is considered that a frequency that is not used in another cell is used in the own cell, or that the magnitude of power (transmission power) of a signal transmitted from a base station device or a terminal device in the own cell is limited so as to make the signal less likely to reach another cell. In a later-described MAC scheduler, frequency allocation is performed so as to suppress such inter-cell interference as well. The scheduling function of the MAC scheduler will be described later in detail.

Figure 2:
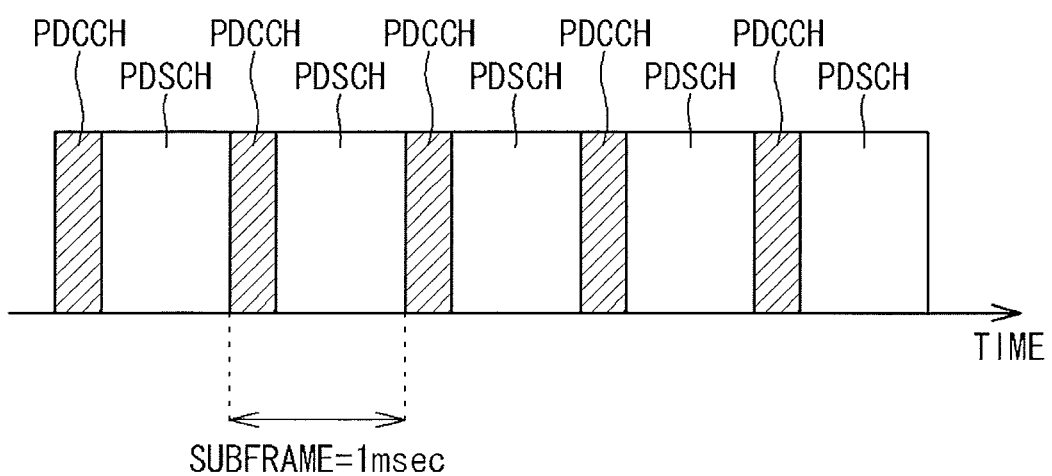
FIG. 2 is a schematic diagram illustrating a DL frame structure based on LTE.

FIG. 2 illustrates a structure of a downlink radio frame (DL frame) based on the LTE. A DL frame is composed of 10 subframes arrayed in the time-axis direction. Note that FIG. 2 illustrates a part of a DL frame. A subframe has a length corresponding to 14 OFDM symbols (=1 msec) in the time-axis direction.

Each subframe has, at its beginning, a control area in which control information is stored, and the control area is followed by a physical downlink shared channel (PDSCH) in which user data is stored.

In the control area, a physical downlink control channel (PDCCH) including downlink and uplink allocation information and the like is secured. The PDCCH includes, in addition to the allocation information, information of an uplink transmission power limit value, and information relating to an instruction for report of a downlink CQI (Channel Quality Indicator). The size of the PDCCH varies depending on the size of the control information.

In addition to the PDCCH, the following channels are allocated in the control area: a physical control format indicator channel (PCFICH) for notifying information relating to the PDCCH; and a physical hybrid-ARQ indicator channel (PHICH) for transmitting an acknowledgement (ACK) or a negative acknowledgement (NACK) in response to a hybrid automatic repeat request (HARQ) to a PUSCH.

The PDSCH in which user data and the like are stored is an area shared by a plurality of terminal devices, and control information and the like for each terminal device is also stored in the PDSCH in addition to the user data.

The PDSCH is configured to have a plurality of resource blocks (RB). Each resource block is a fundamental unit area (a minimum unit for resource allocation) for data transmission. Each resource block has a size corresponding to 12 subcarriers in the frequency-axis direction and 7 OFDM symbols in the time-axis direction.

When the frequency band width of the DL frame is set at 10 MHz, 601 subcarriers are arrayed. Accordingly, in a subframe, 50 resource blocks are arranged in the frequency-axis direction, and the number of resource blocks in the time-axis direction is 2.

The base station device 1 has a power allocation scheduling function for determining allocation of resource blocks as radio resources to terminal devices, and determining a transmission power value for each resource block. Further, like the DL frame, an uplink radio frame (UL frame) based on the LTE has a plurality of resource blocks, and allocation of the resource blocks of the UL frame to terminal devices is also determined by the base station device 1.

The downlink and uplink resource block allocation determined by the base station device 1 is stored in the PDCCH as allocation information, and the allocation information is transmitted from the base station device 1 to a terminal device 2. The base station device 1 and the terminal device 2 perform communication by using the resource blocks, in accordance with the determined allocation information.

Figure 3:
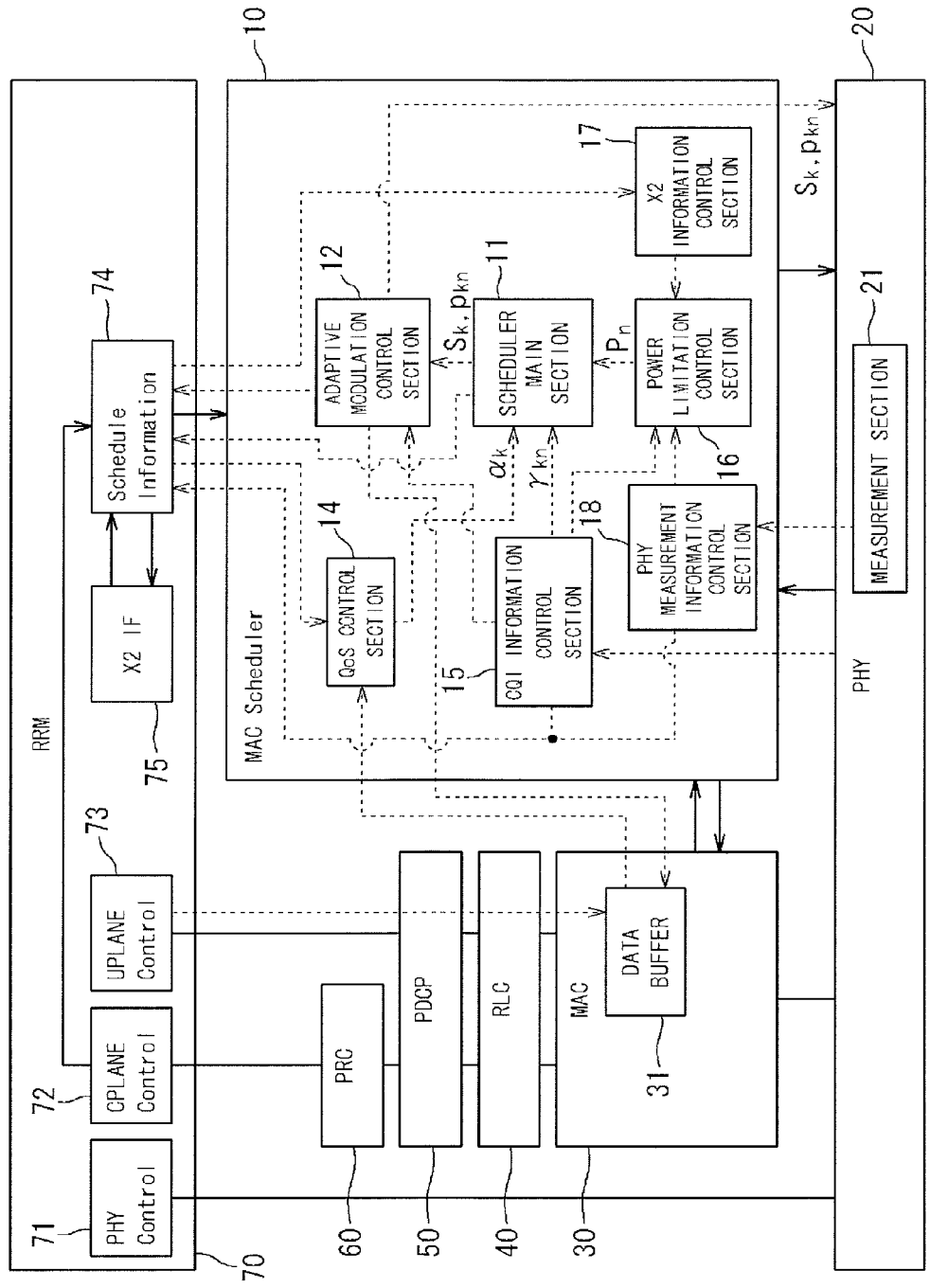
FIG. 3 is a block diagram illustrating a configuration of a base station device.

FIG. 3 illustrates a configuration of the base station device 1. This configuration is preferable as a configuration of a femto BS 1*b*, but is applicable to a macro BS 1*a*.

With reference to FIG. 3, the base station device 1 includes a MAC unit 30 that performs processing relating to a MAC layer in wireless communication, and a PHY unit 20 that performs processing relating to a physical layer (PHY layer) lower than the MAC layer.

The base station device 1 of the present embodiment includes a MAC scheduler 10 independent from the MAC unit 30. The MAC scheduler 10 determines, by using schedule information, which resource block, among a plurality of resource blocks, is to be allocated to which terminal, and determines a transmission power value for each resource block.

The MAC scheduler 10 is connected to the MAC unit 30, and allowed to exchange necessary information with the MAC unit 30.

For example, the MAC scheduler 10 receives, from the MAC unit 30, Buffer Occupancy of Common CH and Dedicated CH, and Control Element of UL subframes.

Further, the MAC scheduler 10 transmits information of an already-scheduled terminal device to the MAC unit 30.

The MAC scheduler 10 is connected to the PHY unit 20 so as to exchange information with the PHY unit 20 without intervention of the MAC unit 30.

For example, the MAC scheduler 10 receives, from the PHY unit 20, TTI Indication, RA (Random Access) Request Indication, HARQ Feedback Indication, SR (Scheduling Request) Indication, DL CQI Indication, UL CQI Indication, and Timing Advance Indication.

Further, the MAC scheduler 10 transmits control information (PDCCH, PCFICH, and PHICH) for the next DL subframe and a reception request for the next UL subframe, directly to the PHY unit 20 without intervention of the MAC unit 30.

In this way, the MAC scheduler 10 is connected to the MAC unit 30 so as to exchange information between them, and is also connected to the PHY unit 20 so as to exchange information between them, without intervention of the MAC unit 30.

When the MAC scheduler 10 and the PHY unit 20 exchange information without intervention of the MAC unit 30, a delay caused by intervention of the MAC unit 30 is avoided, thereby realizing quick exchange of information. Further, since the amount of information passing through the MAC unit 30 is reduced, the processing load on the MAC unit 30 is reduced.

Above the MAC unit 30, an RLC (Radio Link Control) 40, a PDCP (Packet Data Convergence Protocol) 50, an RRC (Radio Resource Control) 60, and an RRM (Radio Resource Management) 70 are provided.

The RRM (radio resource management unit) 70 has functions such as a PHY control 71, a C-PLANE control 72, and a U-PLANE control 73.

Further, the RRM (radio resource management unit) 70 includes a schedule information management section 74 that generates and manages schedule information to be given to the MAC scheduler 10. The schedule information management section 74 performs obtainment, generation, management, and transmission of X2 information, QoS information, and CQI information among the schedule information required for scheduling.

Further, the RRM 70 is communicable with other base station devices via an X2 interface 75 which is an inter-base-station communication interface with the other base station devices.

The MAC scheduler 10 is connected to the RRM 70 (schedule information management section 74) so as to exchange information with the RRM 70 without intervention of the MAC unit 30.

For example, the MAC scheduler 10 receives, from the RRM 70, Cell Config information, UE (User Equipment; terminal device) config information, and LCH (Logical Channel) config information.

The MAC scheduler 10 receives the Cell Config information from the RRM 70 at the time of cell creation.

The Cell Config information includes information such as Bandwidth, UL Subband, RA config, SRS (Sounding Reference Signal) config, System Information config, and the like.

The MAC scheduler 10 receives the UE config information from the RRM 70 when a terminal device 2 establishes an RRC connection.

The UE config information includes information such as RNTI (Radio Network Temporary Identifier), DRX (Discontinuous Reception) config, Time Alignment Timer, Measurement Gap Pattern, Semi Persistent Scheduling Config, SR config, CQI config, HARQ config, and the like.

The MAC scheduler 10 receives the LCH config information from the RRM 70 when a terminal device establishes a radio bearer.

The LCH config information includes information such as Logical CH Group Config, QoS (Quality of Service), and the like.

The QoS information includes QCI (QoS Class Indicator), GBR (Guaranteed Bit Rate), and MBR (Maximum Bit Rate).

If necessary, please refer to 3GPP TS36.331, V8.50, Chapter 6.3.2 "Radio Resource Control Information Element", for the above-described information that the MAC scheduler 10 receives from the RRM 70.

Further, the MAC scheduler 10 is allowed to transmit information indicating the result of allocation, directly to the RRM 70 without intervention of the MAC unit 30.

As described above, the MAC scheduler 10 is connected to the RRM (radio resource management unit) 70 so as to exchange information between them, without intervention of the MAC unit 30.

By exchanging information between the MAC scheduler 10 and the RRM 70 without intervention of the MAC unit 30, a delay caused by intervention of the MAC unit 30 is avoided, thereby realizing quick exchange of information. Further, since the amount of information passing through the MAC unit 30 is reduced, the processing load on the MAC unit 30 is reduced.

Figure 4:
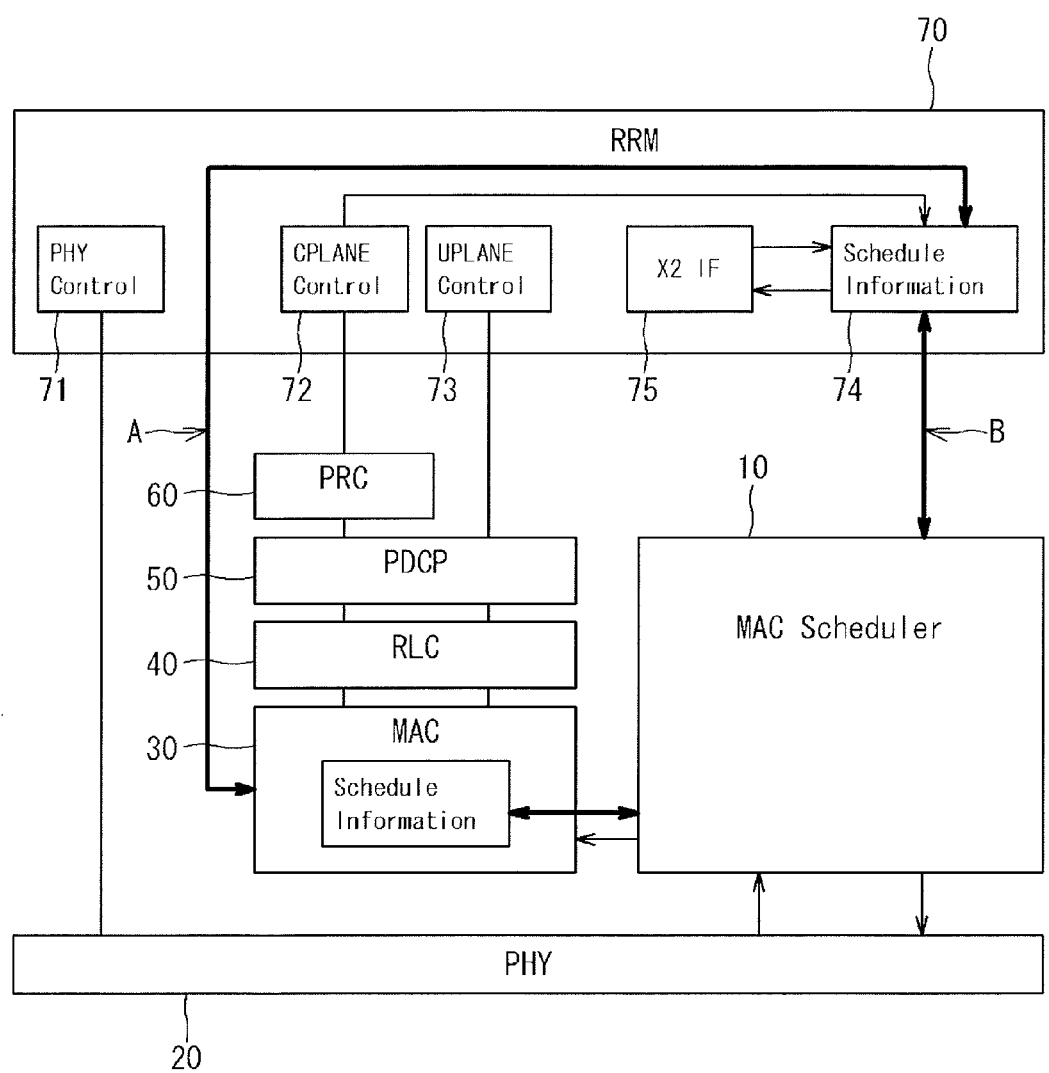
FIG. 4 is a diagram for explaining a flow of information in the base station device.

That is, in the case where information (schedule information) is exchanged between the MAC scheduler 10 and the RRM 70 via the MAC unit 30 as shown by an arrow A in FIG. 4, the information to be exchanged needs to pass through the MAC unit 30 and other function blocks, which takes time. In addition, the process of causing the information to pass through increases the processing load on the MAC unit 30 and the like.

In contrast, in the case where information (schedule information) is exchanged between the MAC scheduler 10 and the RRM 70 without intervention of the MAC unit 30 as shown by an arrow B in FIG. 4, the information exchange can be performed quickly, and moreover, the processing load on the MAC unit 30 can be reduced. As a result, the processor constituting the MAC unit 30 may operate at a relatively low speed, thereby realizing cost reduction.

Moreover, in the configuration shown in FIG. 4, if the schedule information is not directly exchanged between the MAC scheduler 10 and the RRM 70, both the RRM 70 and the MAC unit 30 need to have the schedule information. In this case, exclusive control for the schedule information stored in each of the RRM 70 and the MAC unit 30 is needed, which causes overhead relating to such exclusive control.

Therefore, speed-up of the processor constituting the MAC unit 30 is required. However, such overhead can be avoided by directly exchanging the schedule information between the MAC scheduler 10 and the RRM 70.

The MAC scheduler 10 includes a scheduler main section 11 for determining which resource block, among a plurality of resource blocks, is to be allocated to which terminal, and determining a transmission power value for each resource block.

The scheduler main section 11 is configured to perform scheduling in accordance with a predetermined scheduling algorithm.

Figure 5:
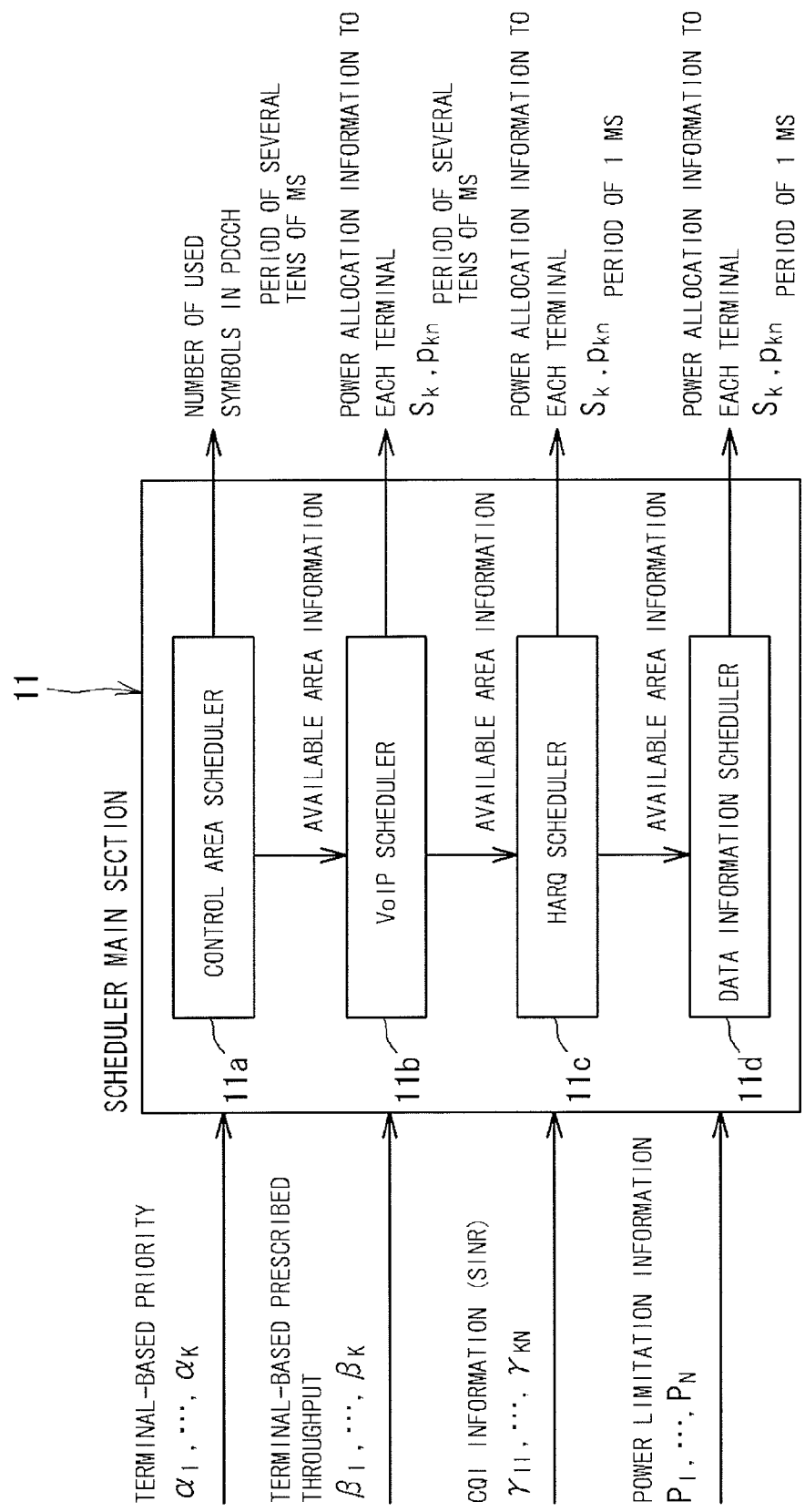
FIG. 5 is a diagram illustrating a scheduler main section of a MAC scheduler.

As shown in FIG. 5, terminal-based priority $\alpha_k$, terminal-based prescribed throughput $\beta_k$, CQI information $\gamma_{kn}$, and power limitation information $P_n$ are input to the scheduler main section 11 as schedule information. Then, the scheduler main section 11 outputs, as a result of scheduling, the number of symbols in PDCCH, resource block allocation information $S_k$ to each terminal device, and a transmission power value $p_{kn}$, of each resource block.

Note that k indicates a terminal device (user) number, and k=1 to K (K: the number of terminal devices in the own cell) is satisfied. $S_k$ indicates a set of resource blocks allocated to the k-th terminal device. Further, n indicates a resource block number, and n=1 to N (N: the number of all resource blocks) is satisfied. Further, $p_{kn}$ indicates a transmission power value of the n-th resource block among the resource blocks allocated to the k-th terminal device.

The result of scheduling (the number of symbols in PDCCH, the $S_k$, and the $p_{kn}$) outputted from the scheduler main section 11 is output to an adaptive modulation control section 12. Upon receiving the $S_k$ and the $p_{kn}$ from the scheduler main section 11, the adaptive modulation control section 12 adaptively determines a modulation method (including a code rate) for each terminal device, based on the $S_k$ and the $p_{kn}$.

The MAC scheduler 10 transmits the information indicating the allocation and the transmission power determined by the scheduler main section 11, and the information indicating the modulation method determined by the adaptive modulation control section 12, to the PHY unit 20 without intervention of the MAC unit 30.

Further, data stored in a data buffer 31 in the MAC unit 30 is given to the PHY unit 20 for modulation and the like. The data buffer 31 receives, from the upper layers, data to be transmitted, and stores the data therein. The data buffer 31 outputs required data to the PHY unit 20 in accordance with the result of resource block allocation.

In order to control the timing of data transmission from the data buffer 31 to the PHY unit 20, the MAC scheduler 10 provides, to the MAC unit 30, as the result of scheduling, information of the terminal device to which the resource blocks are allocated. Upon knowing that the resource blocks are allocated to the terminal device to which data is to be transmitted, the MAC unit 30 transmits the data from the data buffer 31 to the PHY unit 20.

Upon receiving the data from the data buffer 31 of the MAC unit 30, the PHY unit 20 actually performs, for the received data, resource block allocation, transmission power adjustment, and data modulation, in accordance with the information indicating the allocation result and the like of the MAC scheduler 10.

Thus, the MAC unit 30 just needs to output the data from the data buffer 31 based on the result of scheduling in the MAC scheduler 10, but need not to perform scheduling itself. Therefore, the processing load on the MAC unit 30 is reduced.

Furthermore, since the information indicating the allocation and the transmission power determined by the scheduler main section 11 and the information indicating the modulation method determined by the adaptive modulation control section 12 are given to the PHY unit 20 without intervention of the MAC unit 30, the processing load on the MAC unit 30 is reduced also in this regard.

Moreover, the scheduling result such as the allocation information $S_k$ and the transmission power $p_{kn}$ determined by the scheduler main section 11 is provided from the MAC scheduler 10 to the RRM 70 without intervention of the MAC unit 30.

The scheduling result $S_k$ and $p_{kn}$ received by the RRM 70, and other information that can be used for interference suppression control in other base station devices are transmitted to the other base station devices 1 via the X2 interface which is an inter-base-station communication interface.

Upon receiving the scheduling result $S_k$ and $p_{kn}$ and the other information via the X2 interface, each of the other base station devices is allowed to perform, by using the received information, interference suppression control such as using a resource block that is not likely to cause inter-cell interference, or suppressing the transmission power of a resource block that is likely to cause inter-cell interference.

In order to allow the other base station devices to perform appropriate interference suppression control, it is desirable that the scheduling result $S_k$ and $p_{kn}$ and the other information should be transmitted as quickly as possible. In the present embodiment, since the scheduling result $S_k$ and $p_{kn}$ is provided from the MAC scheduler 10 directly to the RRM 70 without intervention of the MAC unit 30, it is possible to transmit the information to the other base station devices more quickly as compared with the case where the MAC unit 30 intervenes.

The scheduler main section 11 determines most appropriate allocation of resource blocks by using the information (schedule information) such as a terminal-based priority $\alpha_k$ (k: 1 to K), a terminal-based prescribed throughput $\beta_k$ (k: 1 to K), and a resource-block-based communication quality value $\gamma_{kn}$ (k: 1 to K, n: 1 to N) for each terminal device.

The scheduler main section 11 obtains the terminal-based priority $\alpha_k$ from a QoS (Quality of Service) control section 14 provided in the MAC scheduler 10. The QoS control section 14 generates the terminal-based priority $\alpha_k$, based on application information obtained from the upper layers, and data delay information obtained from the data buffer 31 of the MAC unit 30. This priority $\alpha_k$ influences the number of resource blocks allocated to each terminal device. That is, the scheduler main section 11 allocates more resource blocks to a terminal device having a larger value of the priority $\alpha_k$, and allocates less resource blocks to a terminal device having a smaller value of the priority $\alpha_k$.

The scheduler main section 11 obtains the terminal-based prescribed throughput $\beta_k$ from the QoS control section 14. The prescribed throughput $\beta_k$ is a prescribed value of throughput required for each terminal device, and the QoS control section 14 generates the prescribed throughput $\beta_k$ based on the application information obtained from the upper layers, and the data delay information obtained from the data buffer 31.

The QoS control section 14 obtains information for generating the priority $\alpha_k$ and the prescribed throughput $\beta_k$ (this information is also "schedule information") mainly from the MAC unit 30.

The scheduler main section 11 obtains the resource-block-based communication quality value $\gamma_{kn}$ for each resource block, from a CQI information control section 15 provided in the MAC scheduler 10. The communication quality value $\gamma_{kn}$ is a CQI. The CQI information control section 15 generates the communication quality value $\gamma_{kn}$, based on the CQI (Channel Quality Indicator) information indicating the communication quality of each resource block in the uplink and downlink. The base station device 1 can measure the uplink CQI by itself, and obtain the downlink CQI measured by the terminal device. The CQI is generated based on, for example, an SINR (Signal to Interference and Noise power Ratio).

If the communication quality is good, the communication speed can be increased, and thereby more data can be transmitted as compared with the case where the communication quality is poor, under the condition that the same number of resource blocks are allocated.

The CQI information control section obtains the uplink and downlink CQIs of the own cell, as information for generating the communication quality value $\gamma_{kn}$ (this information is also "schedule information"), from the PHY unit 20 without intervention of the MAC unit 30.

The scheduler main section 11 obtains the resource-block-based transmission power limit value (power limitation information) $P_n$ (n: 1 to N) from a power limitation control section 16 provided in the MAC scheduler 10. The transmission power limit value $P_n$ specifies, for each resource block, an upper limit value of the transmission power of a signal transmitted from the base station device itself or the terminal device (a lower limit value may also be specified).

Limitation of the transmission power is intended to prevent the signal from interfering with (a base station device or a terminal device in) another cell. That is, if a resource block that is used in another cell is used in the own cell, a signal transmitted from a base station device or a terminal device in the own cell may become an interference signal in the another cell. Therefore, the transmission power of the signal should be kept low. On the other hand, as for a resource block that is not used in the another cell, the transmission power thereof can be increased to increase the throughput.

Therefore, in order to achieve efficient communication while suppressing interference, it is desired to vary the transmission power in accordance with the usage status of resource blocks in other cells. However, the transmission power value $p_{kn}$ in each resource block is not determined only in terms of interference suppression. So, the power limitation control section 16 of the present embodiment does not determine the actual transmission power value $p_{kn}$ of each resource block, but determines the upper limit value of the transmission power (transmission power limit value) $P_n$ for each resource block so as to reduce the actual transmission power value $p_{kn}$ to a value that does not cause interference in other cells.

Then, the scheduler main section 11 adjusts the transmission power value $p_{kn}$ of each resource block within the range of the transmission power limit value (upper limit value) $P_n$, and performs resource block allocation including adjustment of the resource-block-based transmission power value $p_{kn}$.

In order to generate the resource-block-based transmission power limit value (power limitation information) $P_n$, the power limitation control section 16 obtains resource-block-based interference control information (interference power information) from the CQI information control section 15, an X2 information control section 17, and a PHY measurement information control section 18, and the like, and determines the resource-block-based transmission power limit value $P_n$, based on the obtained interference control information.

In the present embodiment, the interference control information includes received-interference-power information in the case where the own cell suffers interference from another cell, and applied-interference-power information in the case where the own cell causes interference in another cell. Both of them are available to determine the resource-block-based transmission power limit value $P_n$.

When the own cell suffers interference from another cell, a signal from the another cell is highly likely to reach the own cell. Accordingly, if an interfered resource block is used in the own cell, the resource block is likely to cause interference in the another cell.

Therefore, from the viewpoint that communication in the another cell (macro cell) should not be interfered, the transmission power of the resource block needs to be reduced in the own cell.

Further, as for a resource block that may cause interference in another cell, the transmission power of the resource block needs to be reduced in the own cell from the viewpoint that communication in the another cell (macro cell) should not be interfered.

The PHY unit 20 in the base station device 1 includes a measurement section 21 which suspends communication in the own cell, sniffs communication between a base station device 1a and a terminal device 2a in another cell (macro cell), and measures a resource-block-based reception power of a signal from the another cell. The magnitude of the reception power of the signal from the another cell indicates the magnitude of the interference power.

So, the PHY measurement information control section 18 obtains the resource-block-based reception power of the signal from the another cell, from the measurement section 21 without intervention of the MAC unit 30, and generates resource-block-based received-interference-power information, and then provides the received-interference-power information (schedule information) to the power limitation control section 16.

Alternatively, the base station device 1 may cause the terminal device 2b in the own cell to measure the interference power from the another cell, and may receive the measured interference power as a CQI report. The CQI information control section 15 obtains the CQI report transmitted from the terminal device 2b, from the PHY unit 20 without intervention of the MAC unit 30, and generates the resource-block-based received-interference-power information, and then provides the received-interference-power information to the power limitation control section 16.

Furthermore, the MAC scheduler 10 of the present embodiment obtains not only the received-interference-power information from the another cell but also the received-interference-power information (schedule information) measured in the another cell (macro cell) from another base station device (macro BS) that forms the another cell, via the X2 interface.

The interference power measured in the another cell (macro cell) indicates the magnitude of the interference power from the own cell (femto cell).

So, the schedule information management section 74 in the RRM 70 obtains the received-interference-power information from the another base station device via the X2 interface, and transmits the received-interference-power information to the X2 information control section 17 in the MAC scheduler 10 without intervention of the MAC unit 30.

Based on the magnitude of the interference power measured in the another cell (macro cell), the X2 information control section 17 generates applied-interference-power information indicating the magnitude of interference power to the another base station device (macro BS), and provides the applied-interference-power information (schedule information) to the power limitation control section 16.

Each of the CQI information control section 15 and the PHY measurement information control section 18 provides the received-interference-power information in the own cell to (the schedule information management section 74 in) the RRM 70 without intervention of the MAC unit 30. The RRM 70 transmits the received-interference-power information in the own cell to another base station device via the X2 interface. The another base station device is allowed to perform scheduling by using the received interference information as applied-interference-power information to its own cell.

The power limitation control section 16 determines the resource-block-based transmission power limit value (upper limit value) $P_n$ such that, for each resource block, the transmission power limit value (upper limit value) $P_n$ is lowered as the interference power(s) indicated by the received-interference-power (from another cell) information and/or the applied-interference-power (to another cell) information is increased, and the transmission power limit value (upper limit valu) $P_n$ is increased as the interference power is decreased. The transmission power limit value $P_n$ is determined based on the interference power information such that the transmission power in the own cell is within a range that does not cause interference to another cell.

As shown in FIG. 5, the scheduler main section 11 of the present embodiment includes a control area scheduler 11a, a VoIP scheduler (audio/video scheduler) 11b, an HARQ scheduler (retransmission scheduler) 11c, and a data information scheduler 11d.

The control area scheduler 11a secures a control area in which control information to be equally given to the respective terminal devices is stored.

The VoIP scheduler 11b, the HARQ scheduler (retransmission scheduler) 11c, and the data information scheduler 11d each secure an area in which user data directed to each terminal device is stored, and perform resource block allocation.

The VoIP scheduler 11b, the HARQ scheduler (retransmission scheduler) 11c, and the data information scheduler 11d each perform scheduling by using the transmission power limit value $P_n$. On the other hand, the control area scheduler 11a does not use the transmission power limit value $P_n$.

Figure 6:
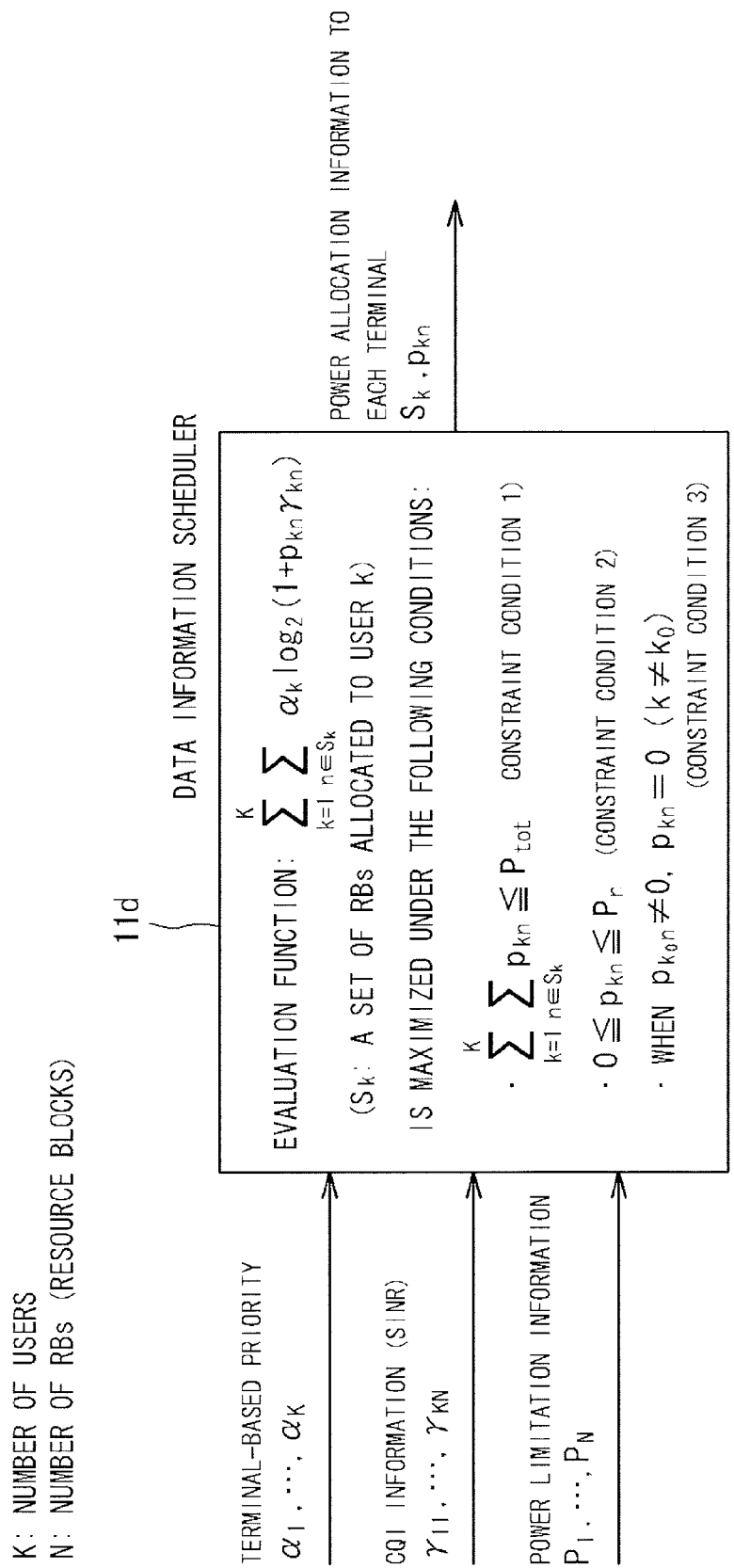
FIG. 6 is a diagram illustrating a data information scheduler.

FIG. 6 illustrates the data information scheduler 11d. The data information scheduler 11d determines resource block allocation to each terminal device and a resource-block based transmission power so that the sum of weighted throughputs according to the QoS information is maximized (throughput optimization).

More specifically, the data information scheduler 11d adjusts the resource block allocation $S_k$ to each terminal device and the resource-block-based transmission power value $p_{kn}$ so that the value of the evaluation function (the sum of weighted throughputs) shown in FIG. 6 is maximized under the constraint conditions 1 to 3 shown in FIG. 6. The scheduler 11d can solve the evaluation function shown in FIG. 6 as a convex linear programming problem. Then, the $S_k$ and the $p_{kn}$ with which the evaluation function is maximized are outputted from the scheduler 11d.

The constraint condition 1 shown in FIG. 6 is intended to prevent the sum of the resource-block-based transmission powers $p_{kn}$ from exceeding a prescribed maximum total power $P_{tot}$. The prescribed maximum total power $P_{tot}$ is a maximum value of power that the PHY unit 20 can actually output, and transmission with a power exceeding this value is impossible.

The constraint condition 2 shown in FIG. 6 is intended to, when a certain resource block n is allocated to a certain terminal device (user) k, keep the transmission power value $p_{kn}$ of the resource block n within a range that is defined by the transmission power limit value (upper limit value) $P_n$ of the resource block n. By keeping the transmission power value $p_{kn}$ smaller than the transmission power limit value (upper limit value) $P_n$, it is possible to set, for each resource block, an appropriate transmission power value $p_{kn}$ that can prevent interference in another cell.

The constraint condition 3 shown in FIG. 6 is intended to, when a certain terminal device (user) $k_0$ uses a certain resource block n, prevent the resource block n from being allocated to another terminal device (user) k ($\neq k_0$). That is, when the terminal device (user) $k_0$ uses the resource block n, the transmission power of the resource block is greater than 0. At this time, for the another terminal device (user) k ($\neq k_0$), "0" is set as the transmission power $p_{kn}$ of the resource block n. That is, the resource block n is not allocated to the another terminal device (user) k ($\neq k_0$).

According to the evaluation function shown in FIG. 6, each terminal device is allocated resource blocks having favorable communication quality values (CQI), and thereby interference from another cell can be avoided. Further, since resource-block-based transmission power limitation is achieved by the constraint condition 2 shown in FIG. 6, interference to another cell can be avoided.

Figure 7:
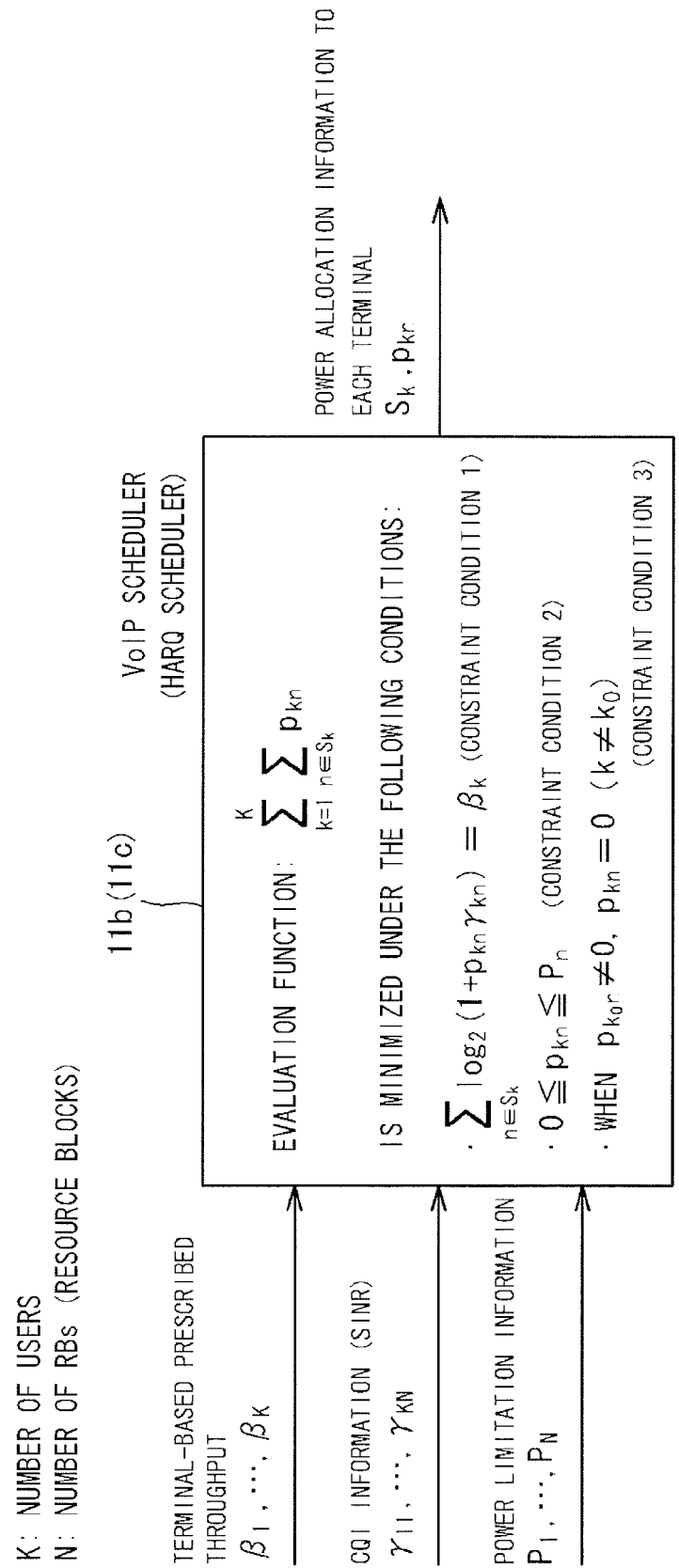
FIG. 7 is a diagram illustrating a VoIP scheduler.

FIG. 7 illustrates the VoIP scheduler 11b. The HARQ scheduler 11c has the same configuration as the VoIP scheduler 11b.

The VoIP scheduler 11b determines resource block allocation to each terminal device and a resource-block-based transmission power so that the throughput of a terminal device (user) k (the sum of throughputs in resource blocks allocated to the terminal device) is equal to (or higher than) the prescribed throughput $\beta_k$, and the resource-block-based transmission power value $P_{kn}$ is minimized (power optimization).

More specifically, the VoIP scheduler 11b adjusts the resource block allocation $S_k$ to each terminal device and the resource-block-based transmission power value $p_{kn}$ so that the value of the evaluation function (the sum of the resource-block-based transmission powers $p_{kn}$) shown in FIG. 7 is minimized under the constraint conditions 1 to 3 shown in FIG. 7. The scheduler 11b can solve the evaluation function shown in FIG. 7 as a convex linear programming problem. Then, the $S_k$ and the $p_{kn}$ with which the evaluation function is minimized are outputted from the scheduler 11b.

The constraint condition 1 shown in FIG. 7 is intended to make the throughput of the terminal device (user) k (the sum of throughputs in resource blocks allocated to the terminal device) equal to (or higher than) the prescribed throughput $\beta_k$ for each terminal device k. In the VoIP data, it is more important to constantly secure the minimum throughput for smooth communication (the prescribed throughput) than to maximize the throughput. In this case, it is more efficient to reduce the transmission power after the prescribed throughput $\beta_k$ is secured than to maximize the throughput.

The constraint condition 2 shown in FIG. 7 is identical to the constraint condition 2 shown in FIG. 6. The constraint condition 2 prevents the transmission power value $p_{kn}$ from exceeding the transmission power limit value (upper limit value) $P_n$, and enables setting of, for each resource block, an appropriate transmission power value $p_{kn}$ that can avoid interference to another cell.

The constraint condition 3 shown in FIG. 7 is identical to the constraint condition 3 shown in FIG. 6.

The allocation determined by the VoIP scheduler 11b is made effective over several frames by semi-persistent scheduling. Remaining resource blocks other than the resource blocks secured for the VoIP data by the VoIP scheduler 11b are allocated for other user data.

Referring back to FIG. 5, the respective schedulers 11a to 11d included in the scheduler 11 will be described.

Initially, the control area scheduler 11a secures, in a subframe, a control area (PDCCH) in which control information to be equally provided to all terminal devices is stored. Then, the control area scheduler 11a outputs the number of symbols that are secured as the control area (PDCCH). The securement of the control area by the control area scheduler 11a is performed with a period of several tens of milliseconds (a period of several tens of subframes). That is, the once-secured control area is fixed over a plurality of subframes.

Further, the control area scheduler 11a notifies the VoIP scheduler 11b of information indicating an area other than the control area in the radio frame, as information indicating an available area for the other schedulers 11b to 11d.

Based on the notified available area information, the VoIP scheduler 11b recognizes the remaining area that has not been secured as the control area, and secures some of the resource blocks included in the remaining area as a VoIP area in which VoIP data is to be stored. The VoIP scheduler 11b determines the resource blocks (and the transmission powers thereof) to be secured as the VoIP area, by using the above-described evaluation function. Then, the VoIP scheduler 11*b* outputs information of $S_k$ and $p_{kn}$ for the VoIP data.

The securement of the VoIP area by the VoIP scheduler 11*b* is also performed with a period of several tens of milliseconds (a period of several tens of subframes). That is, the once-secured VoIP area is fixed over a plurality of subframes, resulting in stable communication.

Moreover, since the area in which the VoIP data is to be stored is preferentially secured over other user data, stable communication is realized also in this regard.

The VoIP scheduler 11*b* notifies the HARQ scheduler 11*c* of information indicating a remaining area that has been secured as neither the control area nor the VoIP area in the radio frame, as information indicating an available area for the other schedulers 11*c* and 11*d*.

Based on the notified available area information, the HARQ scheduler (retransmission scheduler) 11*c* recognizes the remaining area that has been secured as neither the control area nor the VoIP area, and secures some of the resource blocks included in the remaining area, as an HARQ data area in which HARQ data is to be stored. Like the VoIP scheduler 11*b*, the HARQ scheduler 11*c* determines the resource blocks (and the transmission powers thereof) to be secured as the HARQ data area. Then, the HARQ scheduler 11*c* outputs information of $S_k$ and $p_{kn}$ for the HARQ data.

The securement of the HARQ data area by the HARQ scheduler 11*c* is performed with a period of 1 msec (a period of 1 subframe). Since the HARQ data needs to be transmitted urgently, allocation of resource blocks for the HARQ data is preferentially determined over other user data, thereby achieving reliable transmission of the HARQ data.

The HARQ scheduler 11*c* notifies the data information scheduler 11*d* of information indicating a remaining area that has been secured as none of the control area, the VoIP area, and the HARQ data area, as an available area for the data information scheduler 11*d*.

Based on the notified available area information, the data information scheduler 11*d* recognizes the remaining area that has been secured as none of the control area, the VoIP area, and the HARQ data area, and secures some of the resource blocks included in the remaining area, as a general data area in which user data other than the VoIP data and the HARQ data is to be stored.

The data information scheduler 11*d* determines the resource block (and the transmission powers thereof) to be secured as the general data area, by using the above-described evaluation function. Then, the data information scheduler 11*d* outputs information of $S_k$ and $p_{kn}$ for the general data.

The securement of the general data area by the data information scheduler 11*d* is also performed with a period of 1 msec (a period of 1 subframe).

As described above, by allocating the resource blocks in the area other than the control area to the VoIP data, the HARQ data, and the general data in this order, it is possible to perform allocation in accordance with the priorities of the data.

In the scheduler 11 of the present embodiment, allocation control and power control for the user data other than the VoIP data are performed with a period of 1 msec (1 subframe), but may be performed with a period of several subframes.

The result of scheduling ($S_k$ and $p_{kn}$) and the like obtained as described above are given to the PHY unit 20 without intervention of the MAC unit 30, and further, given to the RRM 70 without intervention of the MAC unit 30, and then transmitted to other base station devices via the X2 interface.

Figure 8:
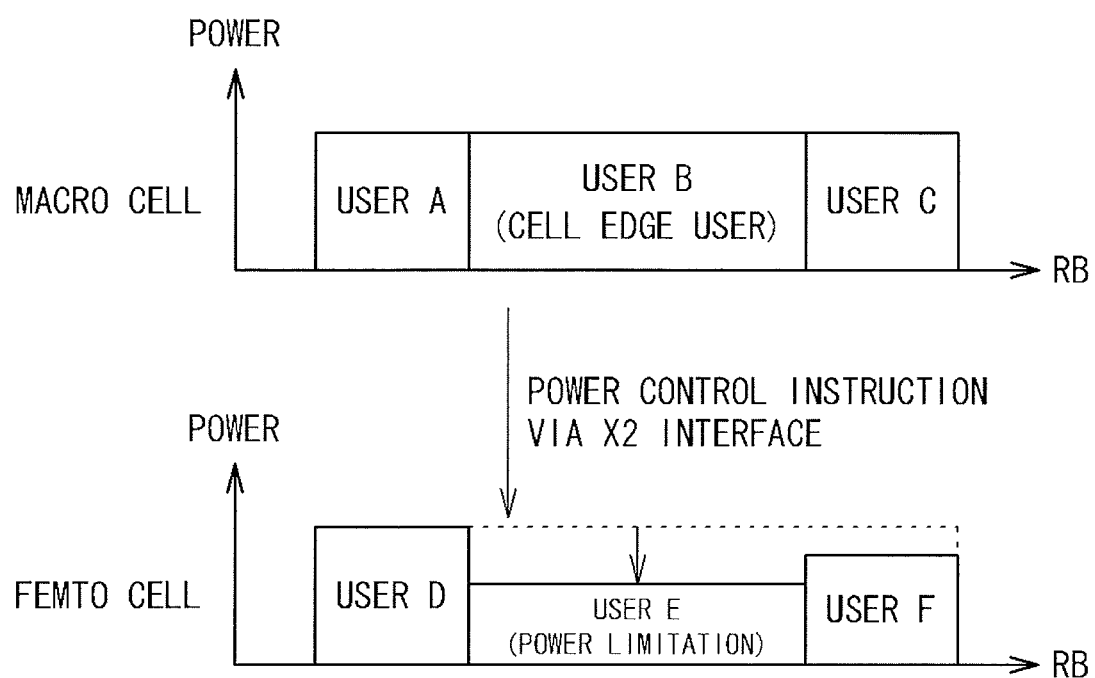
FIG. 8 is a diagram illustrating an example of power allocation.
Figure 9:
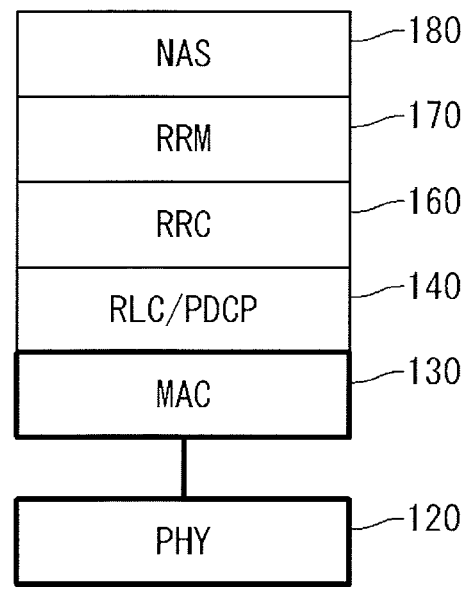
FIG. 9 is a diagram illustrating a layer structure in the base station device.

FIG. 8 illustrates an example of power allocation in a case where a base station device having the above-described functions is adopted as a femto BS 1*b* to avoid interference in a neighboring macro cell. It is assumed that a user (terminal device) B in a macro cell shown in FIG. 8 is a cell edge user (a user existing in the neighborhood of a femto cell), and a signal in the femto cell is likely to interfere with the user B.

In this case, the macro BS 1*a* transmits, as a power control instruction, a result of scheduling ($S_k$ and $p_{kn}$) in its own cell and received-interference-power information (interference control information) received from the femto cell, to the femto BS 1*b* via the X2 interface.

Upon receiving the instruction from the macro BS 1*a*, the femto BS 1*b* causes the X2 information control section 17 to generate resource-block-based applied-interference-power information.

Further, based on the applied-interference-power information, the power limitation control section 16 generates power limitation information Pn for resource blocks (resource blocks allocated to a user E in the femto cell) identical to resource blocks allocated to the user B in the macro cell.

Based on the power limitation information Pn, the scheduler 11 reduces the transmission power values $p_{kn}$ of the resource blocks allocated to the user E. Thereby, interference from the femto cell to the macro cell is avoided.

Even a user F in the femto cell, which is not likely to cause interference in the macro cell, may have reduced transmission power values $p_{kn}$. This is because, as is apparent from the evaluation function shown in FIG. 6, the transmission powers of the resource blocks may be kept small depending on the state of the communication channel (CQI).

According to the present invention, the femto BS 1*b*, which has received the above-described instruction from the macro BS 1*a*, is allowed to quickly transmit the information included in the instruction, from the RRM 70 directly to the MAC scheduler 10 without intervention of the MAC unit 30. Accordingly, the femto BS 1*b* can quickly perform scheduling that reflects the resource block usage status of the macro BS 1*a*.

Moreover, since the femto BS 1*b* is allowed to quickly transmit its own scheduling result and the like to the macro BS 1*a* and another femto BS 1*b* via the X2 interface, quick response in the other BSs 1*a* and 1*b* can be expected.

<Chapter 2>

Figure 10:
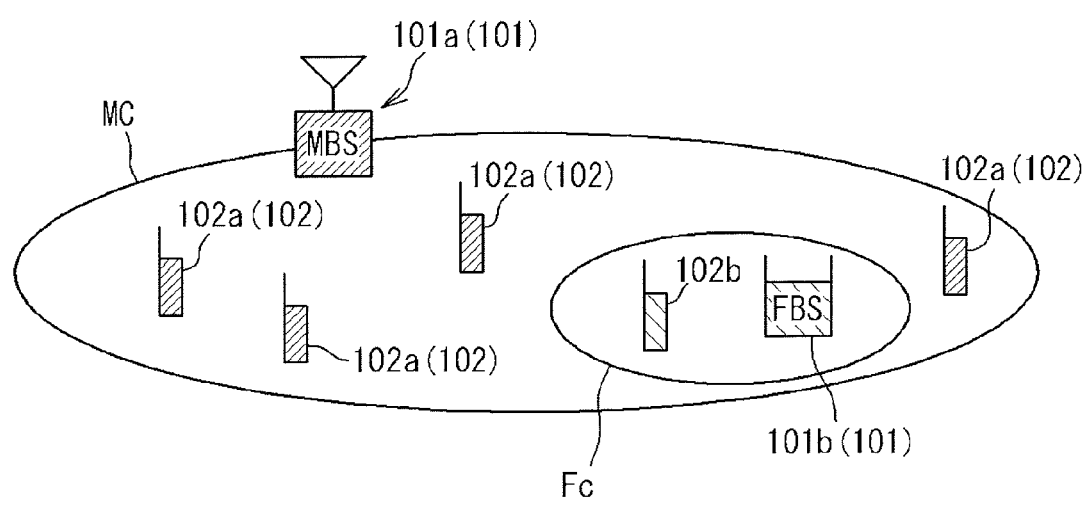
FIG. 10 is a schematic diagram illustrating a configuration of a wireless communication system including a base station device according to an embodiment of the present invention.

FIG. 10 illustrates a configuration of a wireless communication system including a base station device of the present invention. The wireless communication system of the present embodiment is, for example, a system for mobile phones to which LTE (Long Term Evolution) is applied, and communication based on the LTE is performed between each base station device and each terminal device. However, the communication scheme is not limited to the LTE.

The wireless communication system includes a plurality of base station devices 101. A terminal device (mobile station) 102 as a mobile terminal is allowed to wirelessly access any of the base station devices 101, and communicate with the base station device 101.

The base station devices 101 provided in the wireless communication system include: a macro base station device 101*a* forming a communication area (macro cell) MC having a size of several kilometers; and a plurality of femto base station devices 101*b* each being installed in the macro cell MC or the like, and forming a relatively small femto cell FC having a size of several tens of meters.

The macro base station device (hereinafter also referred to as "macro BS") 101*a* is allowed to wirelessly communicate with a terminal device 102 existing in its own macro cell MC.

On the other hand, each femto base station device (hereinafter also referred to as "femto BS") 101b is installed in a place where it is difficult for the terminal device 102 to receive a radio signal from the macro BS 101a, such as indoors, and forms a femto cell FC. The femto BS 101b is allowed to wirelessly communicate with a terminal device (hereinafter also referred to as "MS") 102 existing in its own femto cell FC. In this system, the femto BS 101b that forms a relatively small femto cell FC is installed in a place where it is difficult for the MS 102 to receive a radio signal from the macro BS 101a, and thereby enabling provision of services with sufficient throughput to the MS 102.

In the following description, an MS 102 connected to the femto BS 101b is sometimes referred to as a femto MS 102b, and an MS 102 connected to the macro BS 101a is sometimes referred to as a macro MS 102a.

In the LTE, frequency division duplex (FDD) is adopted, and uplink communication and downlink communication can be simultaneously performed by allocating different operating frequencies to an uplink signal (a transmission signal from a terminal device to a base station device) and a downlink signal (a transmission signal from the base station device to the terminal device), respectively.

Figure 11:
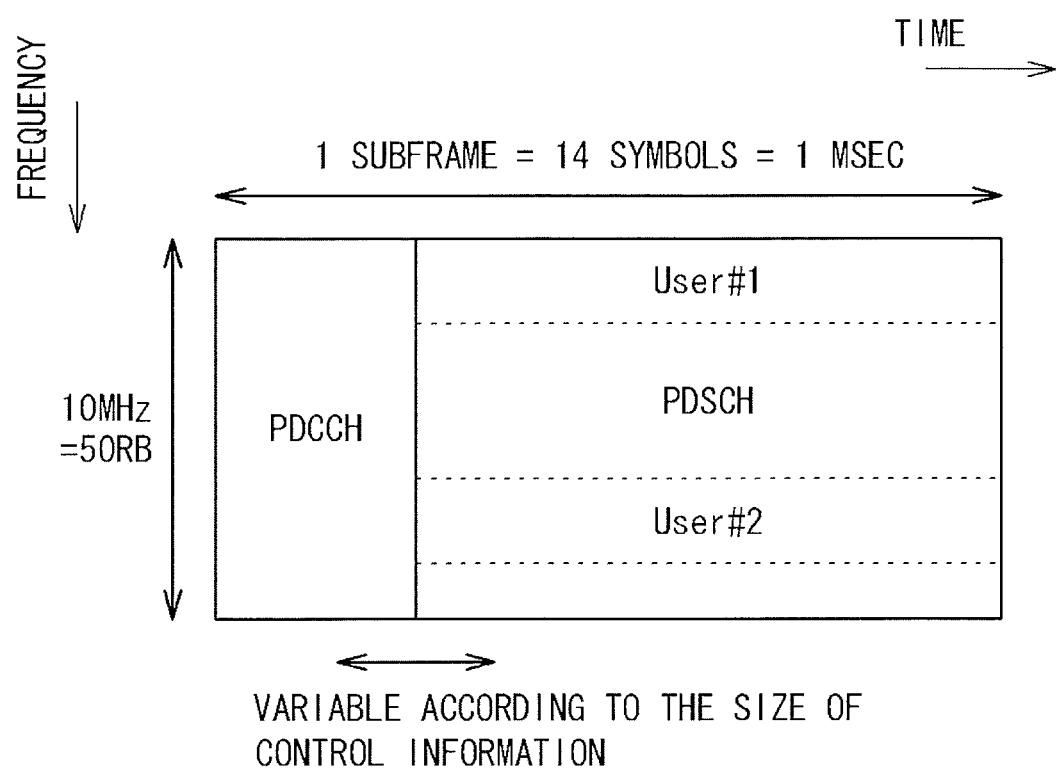
FIG. 11 is a schematic diagram illustrating a DL subframe structure based on LTE.

FIG. 11 illustrates a structure of a subframe included in a downlink radio frame (DL frame) based on the LTE. A DL frame is composed of 10 subframes arrayed in the time-axis direction. A subframe has a length corresponding to 14 OFDM symbols (=1 msec) in the time-axis direction.

Each subframe has, at its beginning, a control area in which control information is stored, and the control area is followed by a physical downlink shared channel (PDSCH) in which user data is stored.

In the control area, a physical downlink control channel (PDCCH) including downlink and uplink allocation information and the like is secured. The PDCCH includes, in addition to the allocation information, information of an uplink transmission power limit value, and information relating to an instruction for report of a downlink CQI (Channel Quality Indicator). The size of the PDCCH varies depending on the size of the control information.

In addition to the PDCCH, the following channels are allocated in the control area: a physical control format indicator channel (PCFICH) for notifying information relating to the PDCCH; and a physical hybrid-ARQ indicator channel (PHICH) for transmitting an acknowledgement (ACK) or a negative acknowledgement (NACK) in response to a hybrid automatic repeat request (HARQ) to a PUSCH.

The PDSCH in which user data and the like are stored is an area shared by a plurality of terminal devices, and control information and the like for each terminal device is also stored in the PDSCH in addition to the user data.

The PDSCH is configured to have a plurality of resource blocks (RB). Each resource block is a fundamental unit area (a minimum unit for radio resource allocation) for data transmission. Each resource block has a size corresponding to 12 subcarriers in the frequency-axis direction and 7 OFDM symbols in the time-axis direction.

When the frequency band width of the DL frame is set at 10 MHz, 601 subcarriers are arrayed. Accordingly, in a subframe, 50 resource blocks are arranged in the frequency-axis direction, and the number of resource blocks in the time-axis direction is 2.

The base station device 101 has a power allocation scheduling function for determining allocation of resource blocks as radio resources to terminal devices, and determining a transmission power value for each resource block. Further, like the DL frame, an uplink radio frame (UL frame) based on the LTE has a plurality of resource blocks, and allocation of the resource blocks of the UL frame to terminal devices is also determined by the base station device 101.

The downlink and uplink resource block allocation determined by the base station device 101 is stored in the PDCCH as allocation information, and the allocation information is transmitted from the base station device 101 to a terminal device 102. The base station device 101 and the terminal device 102 perform communication by using the resource blocks, in accordance with the determined allocation information.

Figure 12:
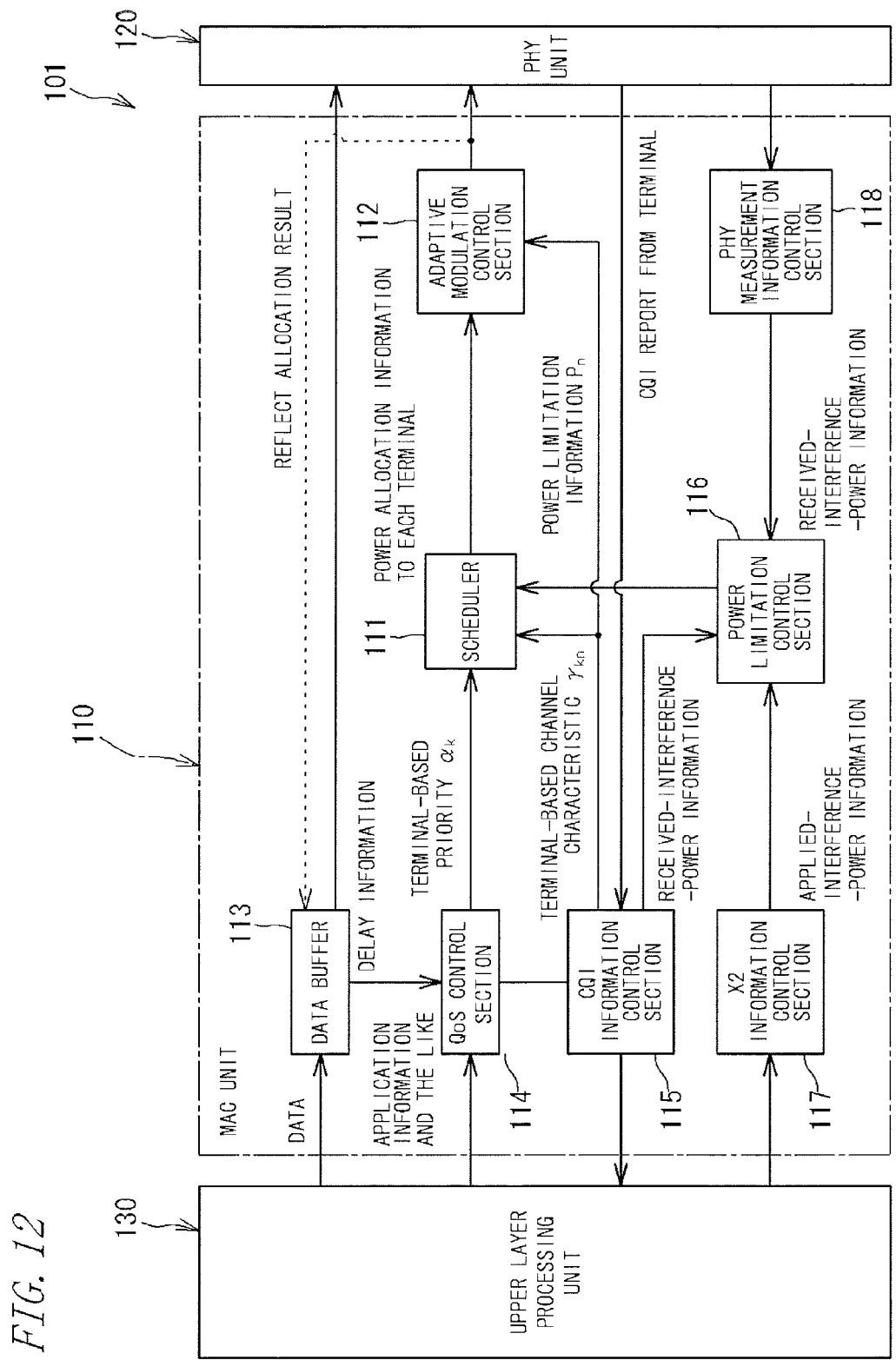
FIG. 12 is a block diagram illustrating a configuration of a base station device.

FIG. 12 illustrates a configuration of the base station device 101 relating to the scheduling function. This configuration is preferable as a configuration of a femto BS 101b, but is applicable to a macro BS 101a.

With reference to FIG. 12, the base station device 101 includes a MAC unit 110 that performs processing relating to a MAC layer in wireless communication, and a PHY unit 120 that performs processing relating to a physical layer (PHY layer) lower than the MAC layer. The base station device 101 further includes an upper layer processing unit 130 that performs processing relating to the layers higher than the MAC layer.

The MAC unit 110 includes a scheduler 111 that determines allocation of resource blocks to terminal devices. The scheduler 111 determines which resource block, among a plurality of resource blocks, is to be allocated to which terminal, and determines a transmission power value for each resource block, and then outputs the result of the determination.

The scheduler 111 outputs resource block allocation information $S_k$ to each terminal device, and a transmission power value $p_{kn}$ for each resource block, to an adaptive modulation control section 112.

Note that k indicates a terminal device (user) number, and k=1 to K (K: the number of terminal devices in the own cell) is satisfied. $S_k$ indicates a set of resource blocks allocated to the k-th terminal device. Further, n indicates a resource block number, and n=1 to N (N: the number of all resource blocks (=50)) is satisfied. Further, $p_{kn}$ indicates a transmission power value of the n-th resource block among the resource blocks allocated to the k-th terminal device.

Upon receiving the $S_k$ and the $p_{kn}$ from the scheduler 111 as the result of power allocation scheduling, the adaptive modulation control section 112 adaptively determines a modulation method (including a code rate) for each terminal device, based on the $S_k$ and the $p_{kn}$.

The PHY unit 120 actually performs resource block allocation, transmission power adjustment, and data modulation, in accordance with the allocation and the transmission power determined by the scheduler 111, and the modulation method determined by the adaptive modulation control section 112. Further, data stored in a data buffer 113 in the MAC unit 110 is given to the PHY unit 120 for modulation and the like. The data buffer 113 receives, from the upper layer processing unit 130, data to be transmitted, and stores the data therein. The data buffer 113 outputs required data to the PHY unit 120 in accordance with the result of resource block allocation.

The scheduler 111 determines most appropriate allocation of resource blocks by using the information such as a terminal-based priority $\alpha_k$ (k: 1 to K), a terminal-based prescribed throughput $\beta_k$ (k: 1 to K), and a resource-block-based communication quality valve $\gamma_{kn}$ (k: 1 to K, n: 1 to N) for each terminal device.

The scheduler 111 obtains the terminal-based priority $\alpha_k$ from a QoS (Quality of Service) control section 114 in the MAC unit 110. The QoS control section (delay information generation section) 114 generates the terminal-based priority $\alpha_k$, based on application information obtained from the upper layer processing unit 130, and data delay information obtained from the data buffer 113.

The data buffer 113 buffers transmission data to be transmitted to each terminal device. The transmission data provided from the upper layers is buffered in the data buffer 113. When allocation of resource blocks to a user as a destination of the transmission data is performed, a transmittable amount of the transmission data is outputted from the buffer 113. The data buffer 113 generates data delay information indicating the transmission delay state of the data to be transmitted to each terminal device, and provides the data delay information to the scheduler 111.

This priority $\alpha_k$ influences the number of resource blocks allocated to each terminal device. That is, the scheduler 111 allocates more resource blocks to a terminal device having a larger value of the priority $\alpha_k$, and allocates less resource blocks to a terminal device having a smaller value of the priority $\alpha_k$.

For example, transmission data whose amount of delay is increasing needs to be transmitted as soon as possible, and therefore, the value of the priority $\alpha_k$ of a terminal device as a destination of the transmission data is increased.

The scheduler 111 obtains the terminal-based prescribed throughput $\beta_k$ from the QoS control section 114. The prescribed throughput $\beta_k$ is a prescribed value of throughput required for each terminal device, and the QoS control section 114 generates the prescribed throughput $\beta_k$ based on the application information obtained from the upper layer processing unit 130 and the data delay information obtained from the data buffer 113.

The scheduler 111 obtains the resource-block-based communication quality value $\gamma_{kn}$ for each terminal device, from a CQI information control section 115 in the MAC unit 110. The communication quality value $\gamma_{kn}$ is a CQI. The CQI information control section (communication quality value provision section) 15 generates the communication quality value $\gamma_{kn}$ based on CQI (Channel Quality Indicator) information indicating the communication quality of each resource block. The base station device 101 can measure the uplink CQI by itself, and obtain the downlink CQI measured by the terminal device. The CQI is generated based on, for example, an SINR (Signal to Interference and Noise power Ratio).

If the communication quality is good, the communication speed can be increased, and thereby more data can be transmitted as compared with the case where the communication quality is poor, under the condition that the same number of resource blocks are allocated.

Further, the scheduler 111 of the present embodiment is allowed to determine resource block allocation by using a resource-block-based transmission power limit value (power limitation information) $P_n$ (n: 1 to N) in addition to the above-described information.

The scheduler 111 obtains the resource-block-based transmission power limit value (power limitation information) $P_n$ from a power limitation control section 116. The transmission power limit value $P_n$ specifies, for each resource block, an upper limit value of the transmission power of a signal transmitted from the base station device itself or the terminal device (a lower limit value may also be specified).

Limitation of the transmission power is intended to prevent the signal from interfering with (a base station device or a terminal device in) another cell. That is, if a resource block that is used in another cell is used in the own cell, a signal transmitted from a base station device or a terminal device in the own cell may become an interference signal in the another cell. Therefore, the transmission power of the signal should be kept low. On the other hand, as for a resource block that is not used in the another cell, the transmission power thereof can be increased to increase the throughput.

Therefore, in order to achieve efficient communication while suppressing interference, it is desired to vary the transmission power in accordance with the usage status of resource blocks in other cells. However, the transmission power value $p_{kn}$ in each resource block is not determined only in terms of interference suppression. So, the power limitation control section 116 of the present embodiment does not determine the actual transmission power value $p_{kn}$ of each resource block, but determines the upper limit value of the transmission power (transmission power limit value) $P_n$ for each resource block so as to reduce the actual transmission power value $p_{kn}$ to a value that does not cause interference in other cells.

Then, the scheduler 111 adjusts the transmission power value $p_{kn}$ of each resource block within the range of the transmission power limit value (upper limit value) $P_n$, and performs resource block allocation including adjustment of the resource-block-based transmission power value $p_{kn}$.

In order to generate the resource-block-based transmission power limit value (power limitation information) $P_n$, the power limitation control section 116 obtains resource-block-based interference power information from the CQI information control section 115, an X2 information control section 117, and a PHY measurement information control section 118, and the like, and determines the resource-block-based transmission power limit value $P_n$, based on the obtained interference power information.

The interference power information includes received-interference-power information in the case where the own cell suffers interference from another cell, and applied-interference-power information in the case where the own cell causes interference in another cell. Both of them are available to determine the resource-block-based transmission power limit value $P_n$.

When the own cell suffers interference from another cell, a signal from the another cell is highly likely to reach the own cell. Accordingly, if an interfered resource block is used in the own cell, the resource block is likely to cause interference in the another cell.

Therefore, from the viewpoint that communication in the another cell (macro cell) should not be interfered, the transmission power of the resource block must be reduced in the own cell.

Further, as for a resource block that may cause interference in another cell, the transmission power of the resource block must be reduced in the own cell from the viewpoint that communication in the another cell (macro cell) should not be interfered.

The PHY unit 120 in the base station device 101 suspends communication in the own cell, sniffs communication (downlink communication or uplink communication) between a base station device 101$a$ and a terminal device 102$a$ in neighboring another cell (macro cell), and measures a resource-block-based reception power of a signal from the another cell to obtain a measured value. The magnitude of the reception power of the signal from the another cell indicates the magnitude of the interference power.

So, the PHY measurement information control section 118 generates the resource-block-based received-interference-power information, based on the measured value of the resource-block-based reception power of the signal from the neighboring another cell, and provides the received-interference-power information to the power limitation control section 116.

Alternatively, the base station device 101 may cause the terminal device in the own cell to measure the interference power from the another cell, and may receive the measured interference power as a CQI report. The CQI information control section 115 generates the resource-block-based received-interference-power information, based on the CQI report received from the terminal device, and provides the received-interference-power information to the power limitation control section 116.

Furthermore, the base station device 101 may obtain, not the interference power from the another cell, but the interference power measured in the another cell (macro cell) from the base station device (macro BS) that forms the another cell, via a wired network (backbone network; X2 network). The interference power measured in the another cell (macro cell) indicates the magnitude of the interference power from the own cell (femto cell).

Based on the magnitude of the interference power measured in the another cell (macro cell), the X2 information control section 117 provided in the MAC unit 110 generates applied-interference-power information indicating the magnitude of interference power to the another base station device (macro BS), and provides the applied-interference-power information to the power limitation control section 116.

The power limitation control section 116 determines the resource-block-based transmission power limit value (upper limit value) $P_n$ such that the transmission power limit value (upper limit value) $P_n$ is kept lower as the interference power(s) indicated by the received-interference-power (from another cell) information and/or the applied-interference-power (to another cell) information for each resource block is greater, and the transmission power limit value (upper limit value) $P_n$ is increased as the interference power is smaller. The transmission power limit value $P_n$ is determined based on the interference power information so that the transmission power in the own cell is within a range that does not cause interference in the another cell.

The neighboring another base station device (macro BS) may calculate the transmission power limit value $P_n$, based on the interference power measured by the another base station device. In this case, the femto BS can obtain the transmission power limit value from the macro BS via the X2 interface (wired interface).

Further, the resource-block-based transmission power limit value $P_n$ may be generated by using both the wired interface information (the transmission power limit value, the received-interference-power information, the interference (from another cell) power information, and the like) obtained from the another base station device via the X2 interface, and the measured value of the resource-block-based reception power of the signal from the another cell. In this case, information (such as presence/absence of interference) that could not have been obtained by either information can be obtained by the other information, thereby generating a more appropriate transmission power limit value.

Figure 13:
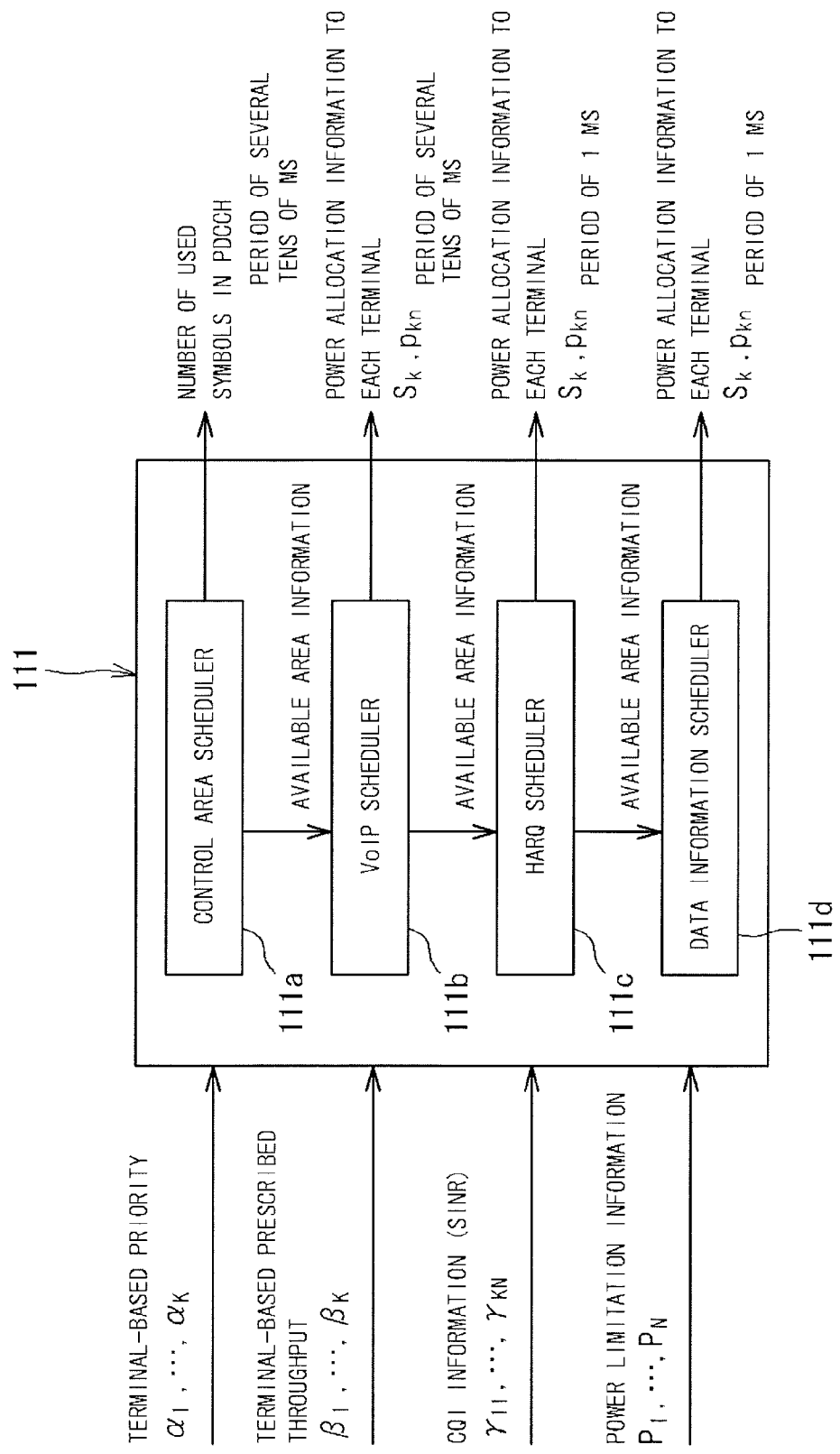
FIG. 13 is a block diagram illustrating a configuration of a scheduler.

As shown in FIG. 13, the scheduler 111 of the present embodiment includes a control area scheduler 111a, a VoIP (audio/video) scheduler 111b, an HARQ scheduler (retransmission scheduler) 111c, and a data information scheduler 111d.

The control area scheduler 111a secures a control area in which control information to be equally given to the respective terminal devices is stored.

Each of the VoIP scheduler 111b, the HARQ scheduler (retransmission scheduler) 11c, and the data information scheduler 111d secures an area in which user data directed to each terminal device is stored, and performs resource block allocation.

Each of the VoIP scheduler 111b, the HARQ scheduler (retransmission scheduler) 11c, and the data information scheduler 111d performs scheduling by using the transmission power limit value $P_n$. On the other hand, the control area scheduler 111a does not use the transmission power limit value $P_n$.

Figure 14:
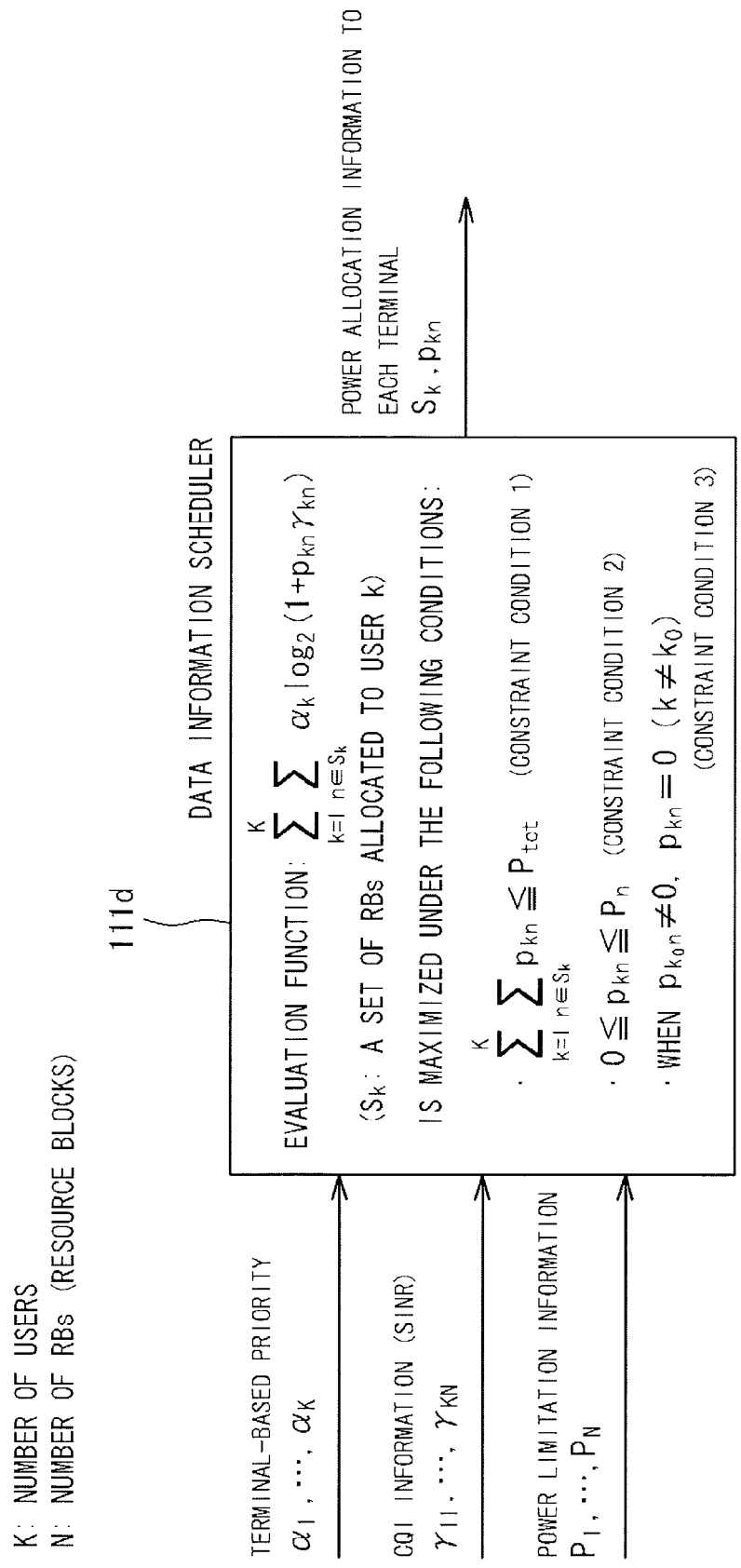
FIG. 14 is a diagram illustrating a data information scheduler.

FIG. 14 illustrates the data information scheduler 111d. The data information scheduler 111d determines resource block allocation to each terminal device and a resource-block based transmission power so that the sum of weighted throughputs according to the QoS information is maximized (throughput optimization). In the evaluation function shown in FIG. 14, the throughput for each resource block in accordance with SINR ($p_{kn} \times \gamma_{kn}$) is approximated by using the Shannon theorem. Although the actual throughput discretely varies depending on the modulation method (QPSK, 16QAM, 64QAM, or the like), the Shannon theorem provides good approximation. Moreover, by expressing the approximated value in analog fashion, an analytical method such as differential and integral calculus can be easily used.

More specifically, the data information scheduler 111d adjusts the resource block allocation $S_k$ to each terminal device and the resource-block-based transmission power value $p_{kn}$ so that the value of the evaluation function (the sum of weighted throughputs) shown in FIG. 14 is maximized under the constraint conditions 1 to 3 shown in FIG. 14. The scheduler 111d can solve the evaluation function shown in FIG. 14 as a convex linear programming problem. Then, the $S_k$ and the $p_{kn}$ with which the evaluation function is maximized are outputted from the scheduler 111d.

The constraint condition 1 shown in FIG. 14 is intended to prevent the sum of the resource-block-based transmission powers $p_{kn}$ from exceeding a prescribed maximum total power $P_{tot}$. The prescribed maximum total power $P_{tot}$ is a maximum value of power that the PHY unit 120 can actually output, and transmission with a power exceeding this value is impossible.

The constraint condition 2 shown in FIG. 14 is intended to, when a certain resource block n is allocated to a certain terminal device (user) k, keep the transmission power value $p_{kn}$ of the resource block n within a range that is defined by the transmission power limit value (upper limit value) $P_n$ of the resource block n. By keeping the transmission power value $p_{kn}$ smaller than the transmission power limit value (upper limit value) $P_n$, it is possible to set, for each resource block, an appropriate transmission power value $p_{kn}$ that can prevent interference in another cell.

The constraint condition 3 shown in FIG. 14 is intended to, when a certain terminal device (user) $k_0$ uses a certain resource block n, prevent the resource block n from being allocated to another terminal device (user) k ($\neq k_0$). That is, when the terminal device (user) $k_0$ uses the resource block n, the transmission power of the resource block is greater than 0. At this time, for the another terminal device (user) k ($\neq k_0$), "0" is set as the transmission power $p_{kn}$ of the resource block n. That is, the resource block n is not allocated to the another terminal device (user) k ($\neq k_0$).

According to the evaluation function shown in FIG. 14, each terminal device is allocated resource blocks having good communication quality values (CQI), and thereby interference from another cell can be avoided. Further, since resource-block-based transmission power limitation is achieved by the constraint condition 2 shown in FIG. 14, interference to another cell can be avoided.

The scheduler 111d shown in FIG. 14 performs scheduling so as to maximize the evaluation function that indicates the sum of the throughputs weighted based on the priorities of the terminal devices. However, the scheduler 111d may perform scheduling by using an evaluation function for equalizing the throughputs of the respective terminal devices, or may perform scheduling by using an evaluation function for equalizing the throughputs weighted based on the priorities of the terminal devices. That is, various evaluation functions relating to the throughput may be used.

Figure 15:
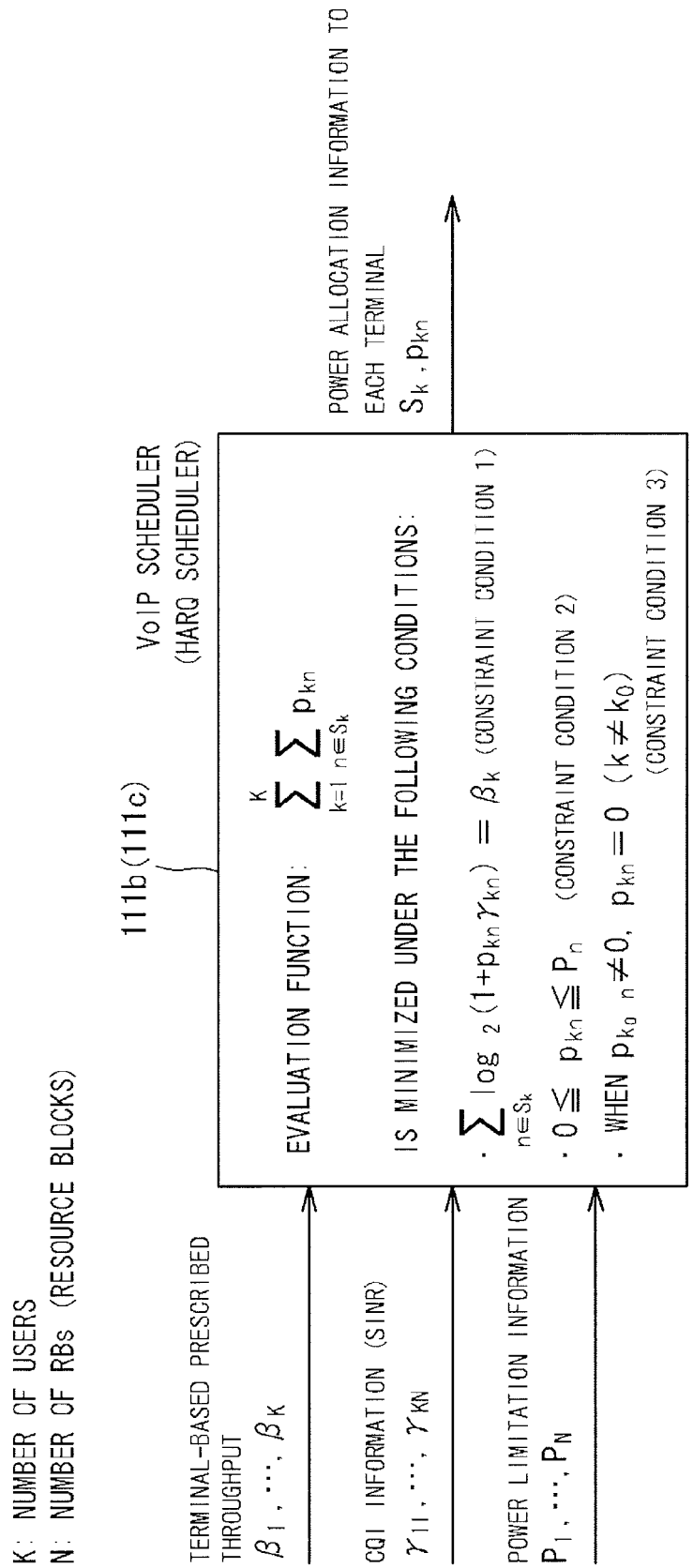
FIG. 15 is a diagram illustrating a VoIP scheduler.

FIG. 15 illustrates the VoIP (audio/video) scheduler 111b. The HARQ scheduler 111c has the same configuration as the VoIP scheduler 111b. The scheduler 111b can be used as a scheduler for application data, not only the VoIP data but also audio/video data, to which a radio resource is allocated fixedly over a relatively long period of time.

The VoIP scheduler 111b determines resource block allocation to each terminal device and a resource-block-based transmission power so that the throughput of a terminal device (user) k (the sum of throughputs in resource blocks allocated to the terminal device) is equal to (or higher than) the prescribed throughput $\beta_k$, and the resource-block-based transmission power value $P_{kn}$ is minimized (power optimization).

More specifically, the VoIP scheduler 111b adjusts the resource block allocation $S_k$ to each terminal device and the resource-block-based transmission power value $p_{kn}$ so that the value of the evaluation function (the sum of the resource-block-based transmission powers $p_{kn}$) shown in FIG. 15 is minimized under the constraint conditions 1 to 3 shown in FIG. 15. The scheduler 111b can solve the evaluation function shown in FIG. 15 as a convex linear programming problem. Then, the $S_k$ and the $p_{kn}$ with which the evaluation function is minimized are outputted from the scheduler 111b.

The constraint condition 1 shown in FIG. 15 is intended to make the throughput of the terminal device (user) k (the sum of throughputs in resource blocks allocated to the terminal device) equal to (or higher than) the prescribed throughput $\beta_k$ for each terminal device k. In the VoIP data, it is more important to constantly secure the minimum throughput for smooth communication (the prescribed throughput) than to maximize the throughput. In this case, it is more efficient to reduce the transmission power after the prescribed throughput $\beta_k$ is secured than to maximize the throughput.

The constraint condition 2 shown in FIG. 15 is identical to the constraint condition 2 shown in FIG. 14. The constraint condition 2 prevents the transmission power value $p_{kn}$ from exceeding the transmission power limit value (upper limit value) $P_n$, and enables setting of, for each resource block, an appropriate transmission power value $p_{kn}$ that can avoid interference to another cell.

The constraint condition 3 shown in FIG. 15 is identical to the constraint condition 3 shown in FIG. 14.

The scheduler 111b (11c) shown in FIG. 15 minimizes the sum of the resource-block-based transmission powers $p_{kn}$, but may perform scheduling by using an evaluation function that equalizes the transmission powers used by the respective terminal devices. That is, various evaluation functions relating to the transmission power may be used.

Further, the scheduler 111b (11c) may perform scheduling by using an evaluation function that equalizes the numbers of resource blocks (the amounts of radio resource) used by the respective terminal devices. That is, various evaluation functions relating to the amount of radio resource may be used.

The allocation determined by the VoIP scheduler 111b is made effective over several frames by semi-persistent scheduling. Remaining resource blocks other than the resource blocks secured for the VoIP data by the VoIP scheduler 111b are allocated for other user data.

Referring back to FIG. 13, the respective schedulers 111a to 111d included in the scheduler 111 will be described.

Initially, the control area scheduler 111a secures, in a subframe, a control area (PDCCH) in which control information to be equally provided to all terminal devices is stored. Then, the control area scheduler 111a outputs the number of symbols that are secured as the control area (PDCCH). The securement of the control area by the control area scheduler 111a is performed with a period of several tens of milliseconds (a period of several tens of subframes). That is, the once-secured control area is fixed over a plurality of subframes.

Further, the control area scheduler 111a notifies the VoIP scheduler 111b of information indicating an area other than the control area in the radio frame, as information indicating an available area for the other schedulers 111b to 111d.

Based on the notified available area information, the VoIP scheduler 111b recognizes the remaining area that has not been secured as the control area, and secures some of the resource blocks included in the remaining area as a VoIP area in which VoIP data is to be stored. The VoIP scheduler 111b determines the resource blocks (and the transmission powers thereof) to be secured as the VoIP area, by using the above-described evaluation function. Then, the VoIP scheduler 111b outputs information of $S_k$ and $p_{kn}$ for the VoIP data.

The securement of the VoIP area by the VoIP scheduler 111b is also performed with a period of several tens of milliseconds (a period of several tens of subframes). That is, the once-secured VoIP area is fixed over a plurality of subframes, resulting in stable communication.

Moreover, since the area in which the VoIP data is to be stored is preferentially secured over other user data, stable communication is realized also in this regard.

The VoIP scheduler 111b notifies the HARQ scheduler 111c of information indicating a remaining area that has been secured as neither the control area nor the VoIP area in the radio frame, as information indicating an available area for the other schedulers 111c and 111d.

Based on the notified available area information, the HARQ scheduler (retransmission scheduler) 11c recognizes the remaining area that has been secured as neither the control area nor the VoIP area, and secures some of the resource blocks included in the remaining area, as an HARQ data area in which HARQ data is to be stored. Like the VoIP scheduler 111b, the HARQ scheduler 111c determines the resource blocks (and the transmission powers thereof) to be secured as the HARQ data area. Then, the HARQ scheduler 111c outputs information of $S_k$ and $p_{kn}$ for the HARQ data.

The securement of the HARQ data area by the HARQ scheduler 111c is performed with a period of 1 msec (a period of 1 subframe). Since the HARQ data needs to be transmitted urgently, allocation of resource blocks for the HARQ data is preferentially determined over other user data, thereby achieving reliable transmission of the HARQ data.

The HARQ scheduler 111c notifies the data information scheduler 111d of information indicating a remaining area that has been secured as none of the control area, the VoIP area, and the HARQ data area, as an available area for the data information scheduler 111d.

Based on the notified available area information, the data information scheduler 111d recognizes the remaining area that has been secured as none of the control area, the VoIP area, and the HARQ data area, and secures some of the resource blocks included in the remaining area, as a general data area in which user data other than the VoIP data and the HARQ data is to be stored.

The data information scheduler 111d determines the resource block (and the transmission powers thereof) to be secured as the general data area, by using the above-described evaluation function. Then, the data information scheduler 111d outputs information of $S_k$ and $p_{kn}$ for the general data.

The securement of the general data area by the data information scheduler 111d is also performed with a period of 1 msec (a period of 1 subframe).

As described above, by allocating the resource blocks in the area other than the control area, to the VoIP data, the HARQ data, and the general data in this order, it is possible to perform allocation in accordance with the priorities of the data.

In the scheduler 111 of the present embodiment, allocation control and power control for the user data other than the VoIP data are performed with a period of 1 msec (1 subframe), but may be performed with a period of several subframes.

Figure 16:
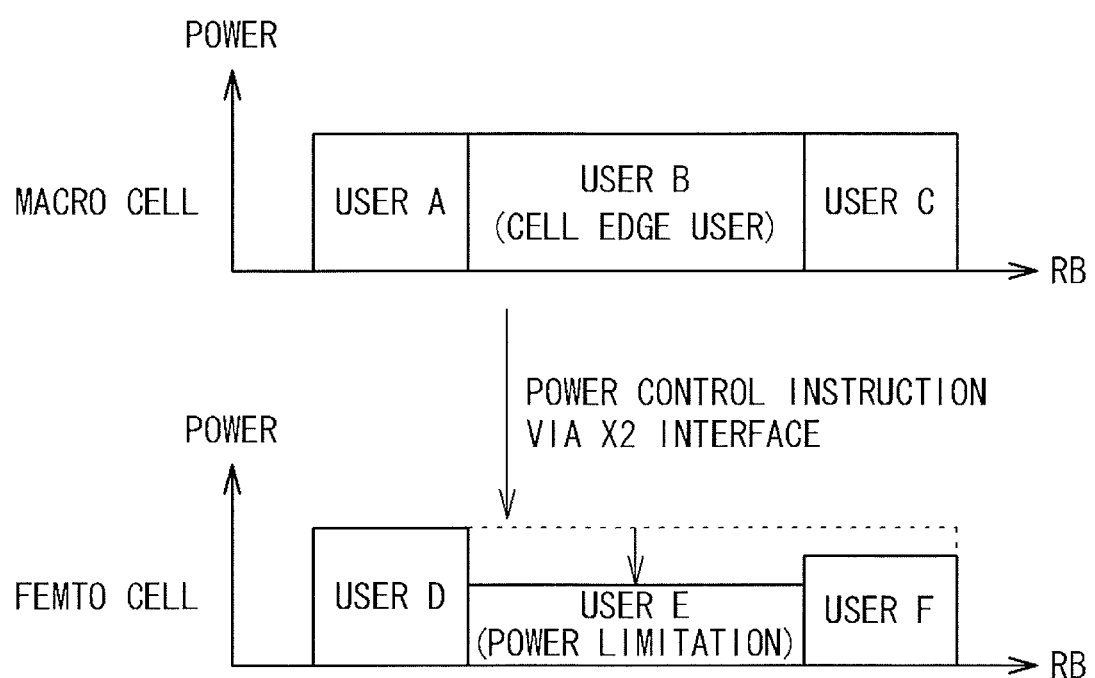
FIG. 16 is a diagram illustrating an example of power allocation.

FIG. 16 illustrates an example of power allocation in a case where a base station device having the above-described functions is adopted as a femto BS 101b to avoid interference in a neighboring macro cell. It is assumed that a user (terminal device) B in a macro cell shown in FIG. 16 is a cell edge user (a user existing in the neighborhood of a femto cell), and a signal in the femto cell is likely to interfere with the user B.

In this case, the macro BS 101a transmits an instruction of power control to the femto BS 101b via the X2 network (backbone network) by using the X2 interface provided in the macro BS 101a. This instruction includes information indicating the interference power from the femto cell, with respect to the resource blocks allocated to the user B in the macro cell.

Upon receiving the instruction from the macro BS 101a, the femto BS 101b causes the X2 information control section 117 to generate applied-interference-power information. Further, based on the applied-interference-power information, the power limitation control section 116 generates power limitation information Pn for resource blocks (resource blocks allocated to a user E in the femto cell) identical to the resource blocks allocated to the user B in the macro cell.

Based on the power limitation information Pn, the scheduler 111 reduces the transmission power values $p_{kn}$ of the resource blocks allocated to the user E. Thereby, interference from the femto cell to the macro cell is avoided.

Even a user F in the femto cell, which is not likely to cause interference in the macro cell, may have reduced transmission power values $p_{kn}$. This is because, as is apparent from the evaluation function shown in FIG. 14, the transmission powers of the resource blocks may be kept small depending on the state of the communication channel (communication quality; SINR).

Figure 17:
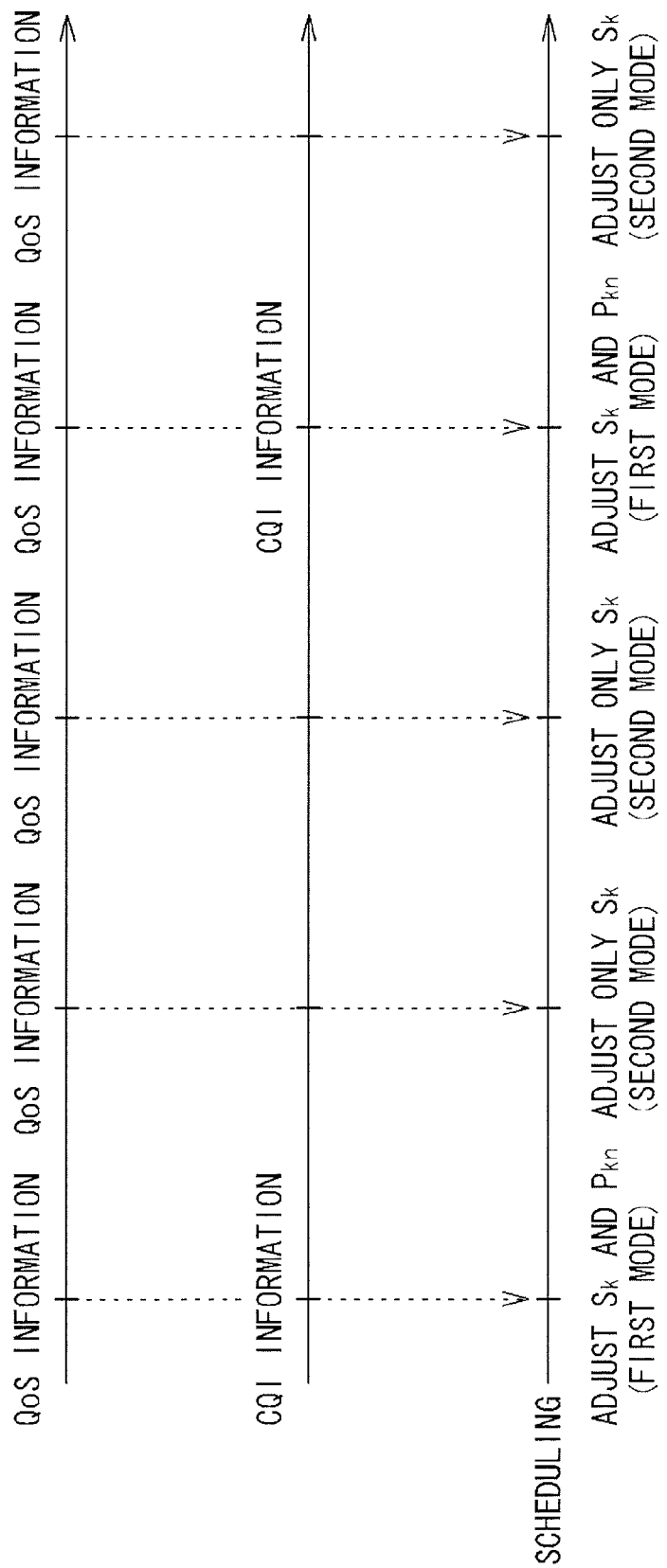
FIG. 17 is a diagram illustrating the relationship between updating timings of QoS information and CQI information, and scheduling timing.

As shown in FIG. 17, the scheduler 111 (particularly, the data information scheduler 111d) has two modes (first mode and second mode) for determining the $S_k$ and the $p_{kn}$.

Since the QoS information is updated every subframe, the terminal-based priority $\alpha_k$ calculated based on the QoS information can be obtained every subframe. On the other hand, since the CQI information is updated once every several subframes, the terminal-based communication quality value (channel characteristic) $\gamma_{kn}$ is obtained once every several subframes.

So, the scheduler 111 (particularly, the data information scheduler 111d) has the first mode which adjusts both the $S_k$ and the $p_{kn}$ to optimize the evaluation function, and the second mode which does not adjust the $p_{kn}$ but adjusts the $S_k$.

As shown in FIG. 17, at the timing when both the QoS information and the CQI information are updated, the first mode is executed to adjust both the $S_k$ and the $p_{kn}$, and thereby appropriate $S_k$ and $p_{kn}$ can be determined.

On the other hand, when the QoS information is updated but the CQI information is not updated, the latest communication quality value $\gamma_k$ is not changed. In this case, it is preferred to execute the second mode which adjusts only the manner of resource block allocation without changing the transmission power value $p_{kn}$.

Thus, the scheduler having the first mode and the second mode as described above can deal with the difference in frequency of update between the QoS information and the CQI information. Moreover, since the frequency of update of the QoS information is higher than the frequency of update of the CQI information, the frequency of update of the resource block allocation information $S_k$ is increased.

FIG. 18 is a diagram illustrating a penalty value fk which can be added as an additional term in the evaluation function shown in FIG. 14 (FIG. 15).

This penalty value is calculated such that the greater the degree of dispersion, in a radio frame, of resource blocks allocated to the same user (terminal device) k, the greater the penalty value.

For example, when resource blocks (RB) are sequentially arranged in numerical order as shown in FIG. 18, if the numbers of resource blocks allocated to a certain user k are "1, 2, 3, 4", these four resource blocks are continuous in the frequency-axis direction and constitute a single group (cluster). In this case, the penalty value fp is the smallest value "1" in response to that the number of groups is 1.

If the numbers of resource blocks allocated to a certain user k are "1, 2, 3, 4, 10, 11", these six resource blocks constitute two groups, "1, 2, 3, 4" and "10, 11". In this case, the penalty value fp is "2" in response to that the number of groups is 2.

If the numbers of resource blocks allocated to a certain user k are "1, 3, 5, 7", these four resource blocks constitute four groups, "1", "3", "5", and "7". In this case, the penalty value fp is "4" in response to that the number of groups is 4.

The penalty value fp is caused to act on the evaluation function so as to degrade the evaluation indicated by the evaluation function shown in FIG. 14 and/or FIG. 15. That is, in the case where the value of the evaluation function is to be maximized as shown in FIG. 14, the penalty value fp is provided in the evaluation function as a subtraction term so as to decrease the value of the evaluation function. On the other hand, in the case where the value of the evaluation function is to be minimized as shown in FIG. 15, the penalty value fp is provided in the evaluation function as an addition term so as to increase the value of the evaluation function.

Thus, by providing the penalty value fp as a parameter in the evaluation function, the probability of dispersion of resource blocks allocated to the same user (terminal device) k is lowered, and thereby an area for the same user can be secured concentratedly.

<Chapter 3>

[1. Configuration of Communication System]

Figure 19:
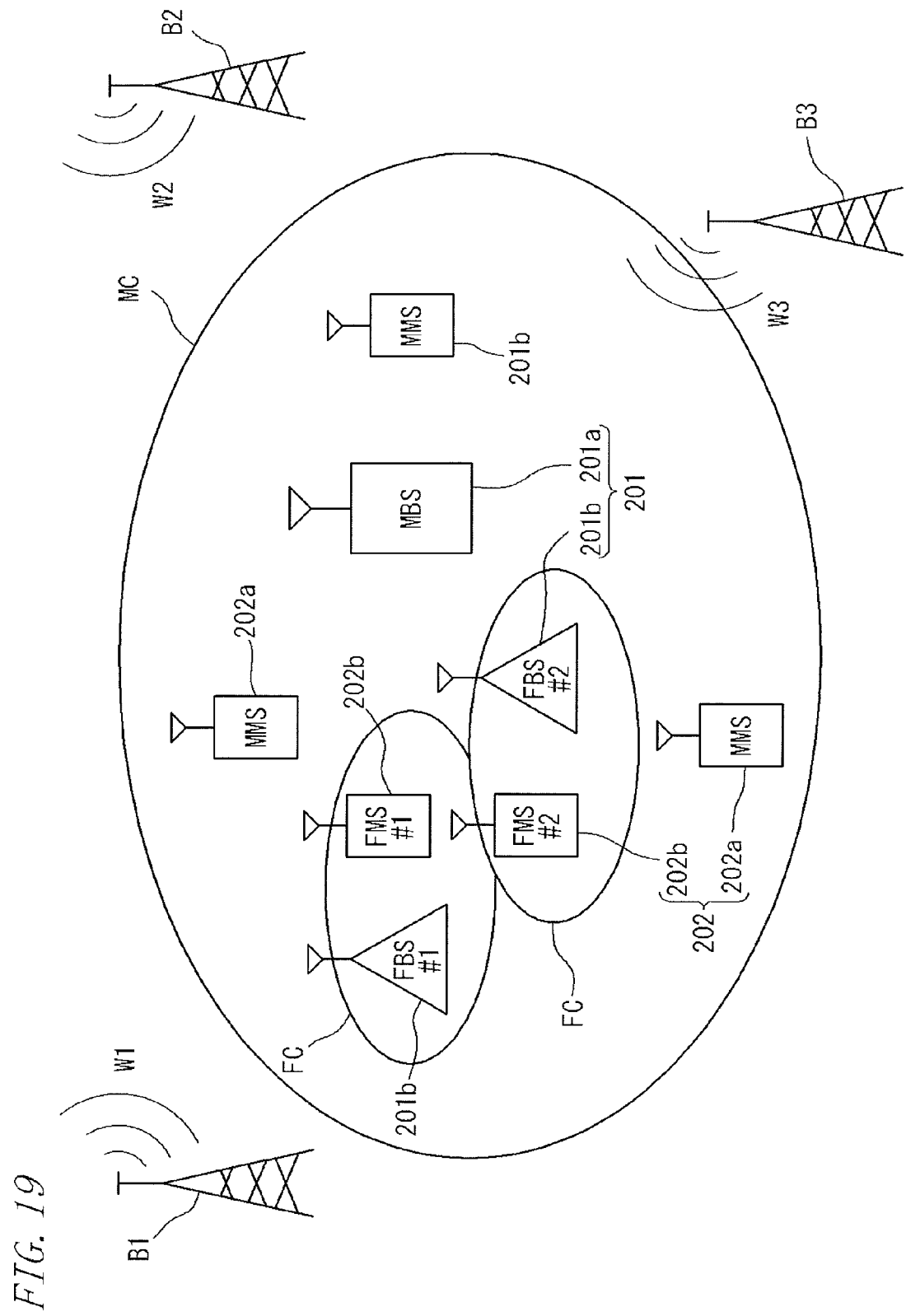
FIG. 19 is a schematic diagram illustrating a configuration of a wireless communication system including a base station device according to the present invention.

FIG. 19 is a schematic diagram showing a configuration of a wireless communication system including a base station device according to the present invention.

This wireless communication system includes a plurality of base station devices 201, and a plurality of terminal devices (mobile stations) 202 that are allowed to perform wireless communication with the base station devices 201.

The plurality of base station devices 201 include: a plurality of macro base stations 201a each forming a communication area (macro cell) MC having a size of several kilometers;

and a plurality of femto base stations 201b each being installed in a macro cell MC and forming a relatively small femto cell FC having a size of several tens of meters.

Each macro base station device 201a is allowed to perform wireless communication with terminal devices existing in its own macro cell MC.

On the other hand, each femto base station device 201b is installed in a place where it is difficult for terminal devices to receive a radio signal from the macro base station device 201a, such as indoors, and forms a femto cell FC. The femto base station device 201b is allowed to perform wireless communication with terminal devices existing in its own femto cell FC. In this system, the femto base station device 201b which forms a relatively small femto cell FC is installed in a place where it is difficult for terminal devices to receive a radio signal from the macro base station device 201a, thereby enabling provision of services with sufficient throughput to the terminal devices.

In the following description, a terminal device 202 connected to a femto base station device 201b is sometimes referred to as a femto terminal device 202b, and a terminal device 202 connected to a macro base station device 201a is sometimes referred to as a macro terminal device 202a.

The wireless communication system of the present embodiment is, for example, a system for mobile phones to which LTE (Long Term Evolution) is applied, and communication based on the LTE is performed between each base station device and each terminal device. In the LTE, frequency division duplex (FDD) can be adopted. The present embodiment will be described on assumption that the FDD is adopted. However, the communication system is not limited to that based on the LTE. Further, the scheme adopted in the LTE is not limited to the FDD. For example, TDD (Time Division Duplex) may be adopted.

[2. Frame Structure for LTE]

In the FDD that can be adopted in the LTE on which the communication system of the present embodiment is based, uplink communication and downlink communication are simultaneously performed by allocating different operating frequencies to an uplink signal (a transmission signal from a terminal device to a base station device) and a downlink signal (a transmission signal from the base station device to the terminal device).

Further, in the present embodiment, OFDM (Orthogonal Frequency Division Multiplexing) is adopted for downlink wireless communication, and SC-FDMA (Single Carrier-Frequency Division Multiple Access) is adopted for uplink wireless communication.

Figure 20:
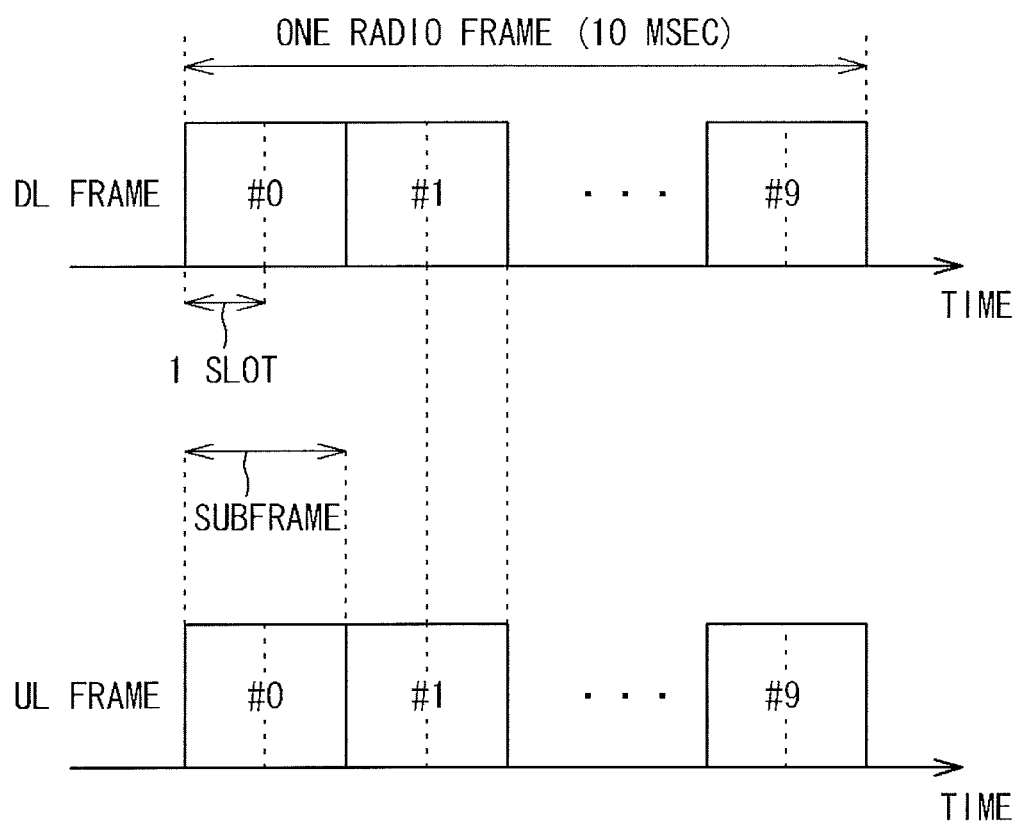
FIG. 20 is a diagram illustrating the structures of UL and DL radio frames for LTE.

FIG. 20 is a diagram illustrating the structures of uplink and downlink radio frames for the LTE. Each of a downlink radio frame (DL frame) and an uplink radio frame (UL frame), which are the essential frames for the LTE, has a time length of 10 milliseconds per radio frame, and consists of 10 subframes #0 to #9. The DL frame and the UL frame are arranged in the time-axis direction with their timings coinciding with each other.

The timings of the DL frame and the UL frame coincide with each other between the base station devices, and thereby communication in each cell is performed in the state where so-called inter-base-station synchronization is achieved.

Figure 21:
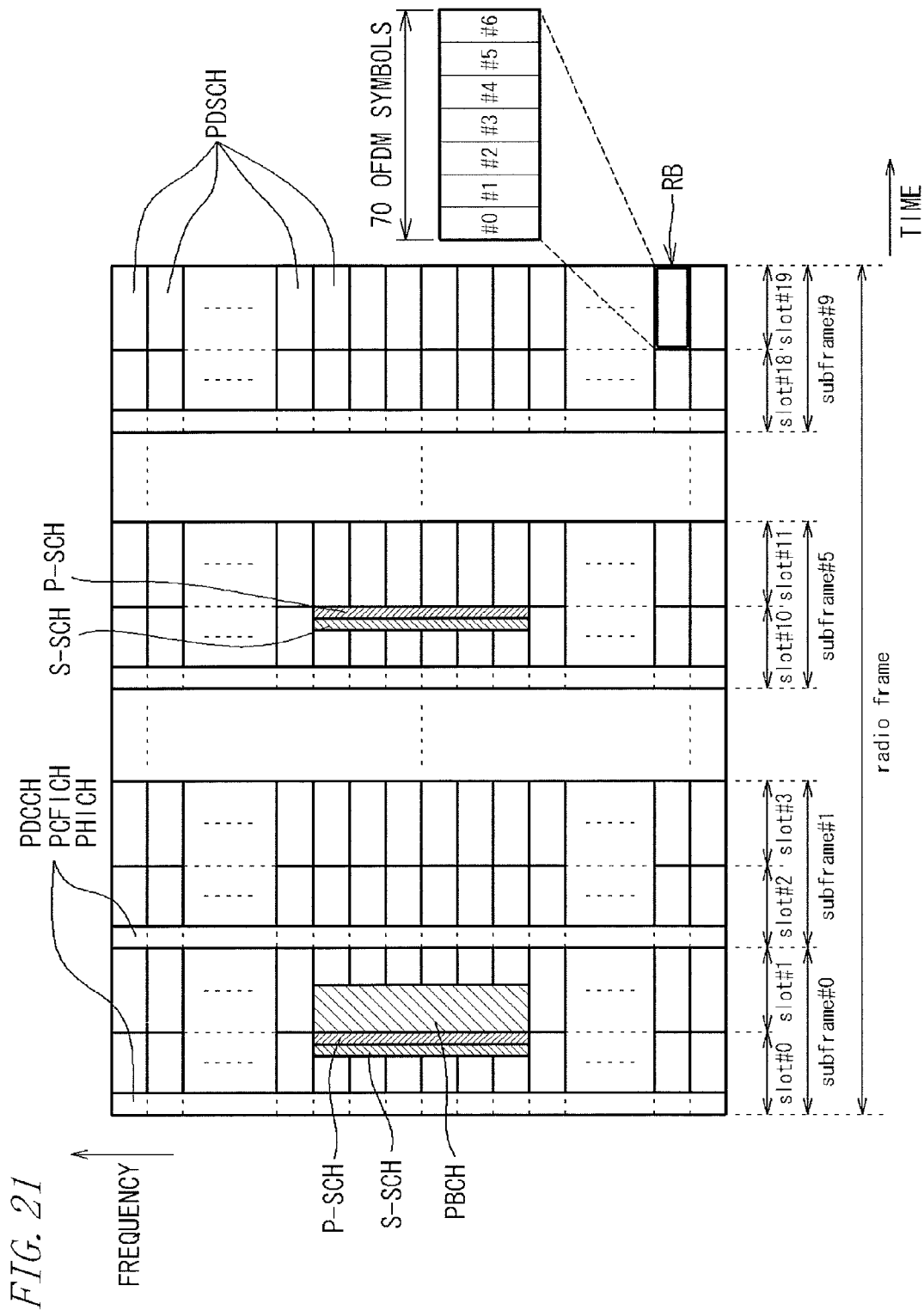
FIG. 21 is a diagram illustrating the DL frame in detail.

FIG. 21 is a diagram illustrating the structure of the DL frame in detail. In FIG. 21, the vertical axis direction indicates the frequency, and the horizontal axis direction indicates the time.

Each of subframes that form the DL frame consists of 2 slots (e.g., slots #0 and #1). One slot consists of 7 (#0 to #6) OFDM symbols (in the case of Normal Cyclic Prefix).

Further, in FIG. 21, a resource block (RB) that is a fundamental unit area (a minimum unit of radio resource allocation) for data transmission is defined by 12 subcarriers in the frequency-axis direction and 7 OFDM symbols (1 slot) in the time-axis direction. Accordingly, when the frequency band width of the DL frame is set at, for example, 5 MHz, 300 subcarriers are arranged, and 25 resource blocks are arranged in the frequency-axis direction.

As shown in FIG. 21, a transmission area for allocating a control channel required for downlink transmission to a terminal device by a base station device is secured at the beginning of each subframe. This transmission area corresponds to symbols #0 to #2 (three symbols at maximum) in the front-side slot in each subframe. Allocated to the transmission area are: a physical downlink control channel (PDCCH) including such as allocation information of a physical downlink shared channel (PDSCH) and a physical uplink shared channel (PUSCH) in which user data and the like are stored; a physical control format indicator channel (PCFICH) for notifying information relating to the PDCCH; and a physical hybrid-ARQ indicator channel for transmitting an acknowledgement (ACK) and a negative acknowledgement (NACK) in response to a hybrid automatic repeat request (HARQ) to the PUSCH.

Further, in the DL frame, a physical broadcast channel (PBCH) for notifying, by broadcasting, terminal devices of the frequency band width or the like of the system is allocated to the first subframe #0. The PBCH is arranged, in the time-axis direction, in a position corresponding to symbols #0 to #3 in the rear-side slot in the first subframe #0 so as to have a width corresponding to 4 symbols, and arranged, in the frequency-axis direction, in the center of the band width of the DL frame so as to have a width corresponding to 6 resource blocks (72 subcarriers). The PBCH is configured to be updated every 40 milliseconds by transmitting the same information over four frames.

Major system information such as the communication band width and the structure of control information is stored in the PBCH.

Further, a master information block (MIB) is stored in the PBCH. The MIB includes information relating to the allocation position of a system information block 1 (SIB1) that is stored in the PDSCH and to be transmitted to a terminal device connected to the base station device, and a radio frame number required for demodulation of the corresponding PDSCH.

Further, among the 10 subframes that form the DL frame, the 1st (#0) and 6th (#5) subframes are each allocated a primary synchronization channel (P-SCH) and a secondary synchronization channel (S-SCH) which are signals for identifying a base station device or a cell.

The P-SCH is arranged, in the time-axis direction, in a position corresponding to symbol #6 that is the last OFDM symbol in the front-side slot in each of subframes #0 and #5 so as to have a width corresponding to one symbol, and arranged, in the frequency-axis direction, in the center of the band width of the DL frame so as to have a width corresponding to 6 resource blocks (72 subcarriers). The P-SCH is information by which a terminal device identifies each of a plurality of (three) sectors into which a cell of a base station device is divided, and 3 patterns are defined.

The S-SCH is arranged, in the time-axis direction, in the position corresponding to symbol #5 that is the second last OFDM symbol in the front-side slot in each of subframes #0 and #5 so as to have a width corresponding to one symbol, and arranged, in the frequency-axis direction, in the center of the band width of the DL frame so as to have a width corresponding to 6 resource blocks (72 subcarriers). The S-SCH is information by which a terminal device identifies each of the communication areas (cells) of a plurality of base station devices, and 168 patterns are defined.

By combining the P-SCH and the S-SCH, 504 (168×3) types of patterns are defined. When a terminal device obtains a P-SCH and a S-SCH transmitted from a base station device, the terminal device can recognize in which sector of which base station device the terminal device exists.

A plurality of patterns that the P-SCH and the S-SCH can take are defined in advance in the communication standards, and are known by each base station device and each terminal device. That is, each of the P-SCH and the S-SCH is a known signal that can take a plurality of patterns.

The resource blocks in an area to which the above-mentioned channels are not allocated are used as the above-mentioned physical downlink shared channel (PDSCH) in which user data and the like are stored. The PDSCH is an area shared by a plurality of terminal devices. Positional information, terminal-based control information, and the like, which will be described later, are stored in the PDSCH in addition to the user data.

Control information to be stored in the PDSCH includes the above-described SIB1. That is, there is a PDSCH allocated for the SIB1. The SIB1 includes information relating to the allocation positions of system information blocks (e.g., SIB2 to SIB12). Examples of the system information blocks include: SIB2 that is a flag indicating whether a currently connected base station device is macro or femto; and SIB9 in which information relating to the name of the base station device is stored.

Allocation of the user data stored in the PDSCH is notified to terminal devices by downlink allocation information relating to downlink radio resource allocation, which is stored in the PDCCH allocated to the beginning of each subframe. The downlink allocation information is information indicating PDSCH-based radio resource allocation, and allows each terminal device to determine whether or not data directed to the terminal device is stored in the subframe.

[3. Configuration of Base Station Device (Femto Base Station Device)]

Figure 22:
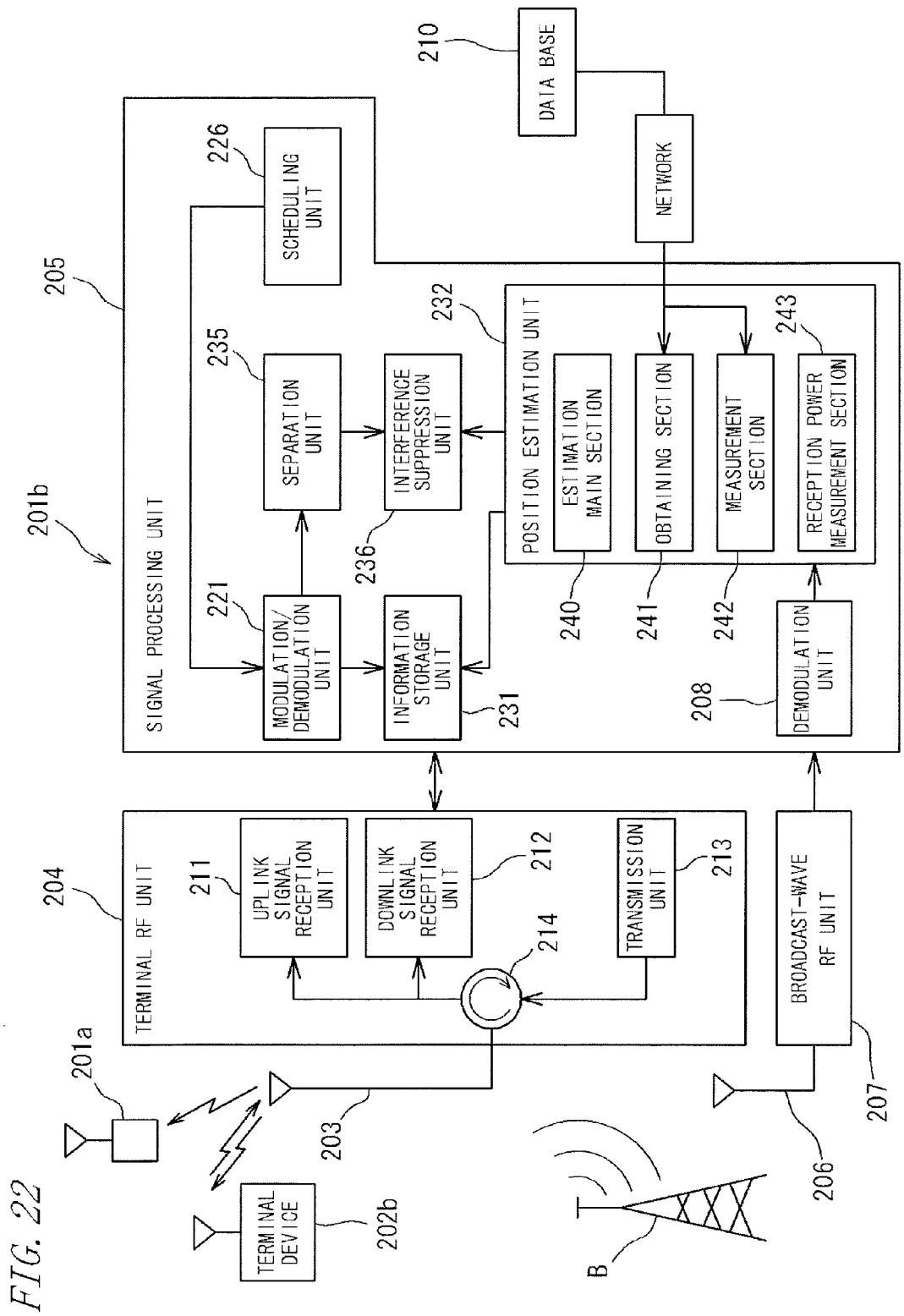
FIG. 22 is a block diagram illustrating a configuration of a femto base station device.

FIG. 22 is a block diagram illustrating the configuration of a femto base station device 201b. While the configuration of the femto base station device 201b will be described hereinafter, the configuration of a macro base station device 201a is identical to the femto base station device 201b.

The femto base station device 201b includes a first antenna 203 for communication with a terminal device 202b, a transmission/reception unit (terminal RF unit) 204 which is connected to the antenna 203 and transmits and receives radio signals to and from the terminal device 202b to communicate with the terminal device 202b, and a signal processing unit 205 which performs signal processing on transmission and reception signals exchanged with the terminal RF unit 204. The first antenna 203 for terminal devices is configured to comply with radio wave transmission and reception between the femto base station device 201b and the terminal device 202b.

The femto base station device 201b further includes a second antenna 206 which receives a broadcast wave broadcast from a broadcast station B, and a broadcast-wave reception unit (broadcast-wave RF unit) 207 to which the antenna 206 is connected. The broadcast station B is, for example, an electric facility that transmits a radio wave of digital terrestrial television broadcasting, and is sometimes referred to as a transmitter station. The second antenna 206 for broadcast wave is configured to comply with reception of broadcast waves from the broadcast station B.

[3.1 Terminal RF Unit]

The terminal RF unit 204 includes an uplink signal reception unit 211, a downlink signal reception unit 212, and a transmission unit 213. The uplink signal reception unit 211 receives an uplink signal from terminal devices 202, and the downlink signal reception unit 212 receives (sniffs) a downlink signal from the macro base station device 201a or another femto base station device 201b. The transmission unit 213 transmits a downlink signal to its own femto cell FC.

The terminal RF unit 204 further includes a circulator 214. The circulator 214 provides a reception signal from the antenna 203 to the uplink signal reception unit 211 and to the downlink signal reception unit 212, and provides a transmission signal outputted from the transmission unit 213, to the antenna 203.

The uplink signal reception unit 211 includes a filter that allows only the frequency band of an uplink signal from a terminal device 202 to pass therethrough, an amplifier, an A/D converter, and the like. The uplink signal reception unit 211 obtains the uplink signal transmitted from the terminal device 202, from the reception signal received by the antenna 203, amplifies the uplink signal, converts the amplified signal into a digital signal, and outputs the digital signal to the signal processing unit 205. Thus, the uplink signal reception unit 211 is a reception unit configured to comply with reception of the uplink signal from the terminal device 202, and is a reception unit that the base station device essentially requires.

The transmission unit 213 includes a D/A converter, a filter, an amplifier, and the like. The transmission unit 213 receives a transmission signal outputted as a digital signal from the signal processing unit 205, converts the digital signal into an analog signal, amplifies the analog signal, and outputs the amplified signal as a downlink signal from the antenna 203.

The femto base station device 201b of the present embodiment further includes the downlink signal reception unit 212. The downlink signal reception unit 212 receives (sniffs) a downlink signal transmitted from a base station device 201 other than the femto base station device 201b.

The downlink signal reception unit 212 includes a filter that allows only the frequency band of a downlink signal from another base station device 201 to pass therethrough, an amplifier, an A/D converter, and the like. The downlink signal reception unit 212 obtains the downlink signal transmitted from the another base station device 201, from the reception signal received by the antenna 203, amplifies the reception signal, converts the amplified signal into a digital signal, and outputs the digital signal.

The downlink signal outputted from the downlink signal reception unit 212 is provided to the signal processing unit 205, and processed by a modulation/demodulation unit 221 and the like.

[3.2 Broadcast-Wave RF Unit]

A broadcast-wave RF unit 207 receives a broadcast wave that is broadcast from a broadcast station B, and includes a filter that allows only the frequency band of the broadcast wave to pass therethrough, an amplifier, an A/D converter, and the like. The broadcast-wave RF unit 207 obtains the broadcast wave received by an antenna 206, amplifies the broadcast wave, converts the amplified signal into a digital signal, and outputs the digital signal to a later-described position estimation unit 232 via a demodulation unit 208 provided in the signal processing unit 205. The broadcast-wave RF unit 207 is a reception unit configured to comply with reception of the broadcast wave from the broadcast station B.

As described above, the femto base station device 201b includes the antenna 203, the terminal RF unit 204, and the signal processing unit 205 which are essentially necessary for performing wireless communication with the terminal device 202b in its own cell (femto cell FC). The femto base station device 201b further includes the broadcast-wave antenna 206, and the broadcast-wave RF unit 207 in order to estimate its own position.

[3.3 Signal Processing Unit]

The signal processing unit 205 includes a modulation/demodulation unit 221 for processing transmission and reception signals exchanged between an upper layer above the signal processing unit 205 and the terminal RF section 204. The modulation/demodulation unit 221 demodulates an uplink signal provided from the uplink signal reception unit 211, as an uplink reception information, and outputs the demodulated uplink signal to the upper layer, and modulates various kinds of transmission information (broadcast information) provided from the upper layer.

Then, the transmission unit 213 in the terminal RF section 204 transmits, to the terminal device 202b communicating with the femto base station device 201b, the transmission information (broadcast information) useful for the terminal device 202b, as a downlink signal.

The modulation/demodulation unit 221 modulates the broadcast information provided from the upper layer, by using a predetermined modulation method for a predetermined data unit, based on an instruction from a scheduling unit 226, and allocates the modulated data to DL frames in units of resource blocks, thereby generating its own downlink signal.

Further, the modulation/demodulation unit 221 is also able to demodulate a downlink signal transmitted from another cell and received by the downlink signal reception unit 212, and demodulate an uplink signal transmitted from another cell and received by the uplink signal reception unit 211.

The broadcast-wave demodulation unit 208 demodulates the broadcast-wave signal provided from the broadcast-wave RF unit 207, and outputs the demodulated broadcast-wave signal to a position estimation unit 232 included in the signal processing unit 205.

The position estimation unit 232 estimates the position of the femto base station device 201b by using the broadcast wave transmitted from the broadcast station B and received by the broadcast-wave RF unit 207. In order to estimate the position of the femto base station device 201b, the position estimation unit 232 uses a plurality of broadcast waves transmitted from a plurality of broadcast stations, respectively. In the present embodiment (refer to FIG. 19), broadcast waves W1, W2, and W3 transmitted from three broadcast stations B1, B2, and B3 are used.

The position estimation unit 232 includes an estimation main section 240 which executes position estimation, an obtaining section 241 which obtains position estimation information described later, a selection section 242 which selects a plurality of predetermined broadcast stations, and a reception power measurement section 243 which measures the reception powers of the broadcast waves. The functions of these units will be described later.

The signal processing unit 205 further includes an information storage unit 231 which adds and stores the positional information relating to the position estimated by the position estimation unit 232, in the broadcast information included in the downlink signal.

The positional information estimated by the position estimation unit 232 and stored in the broadcast information is, as described later, received by a wireless communication device in another cell, and the wireless communication device executes an interference suppression process based on the positional information.

[3.4 Position Estimation (1)]

Figure 23:
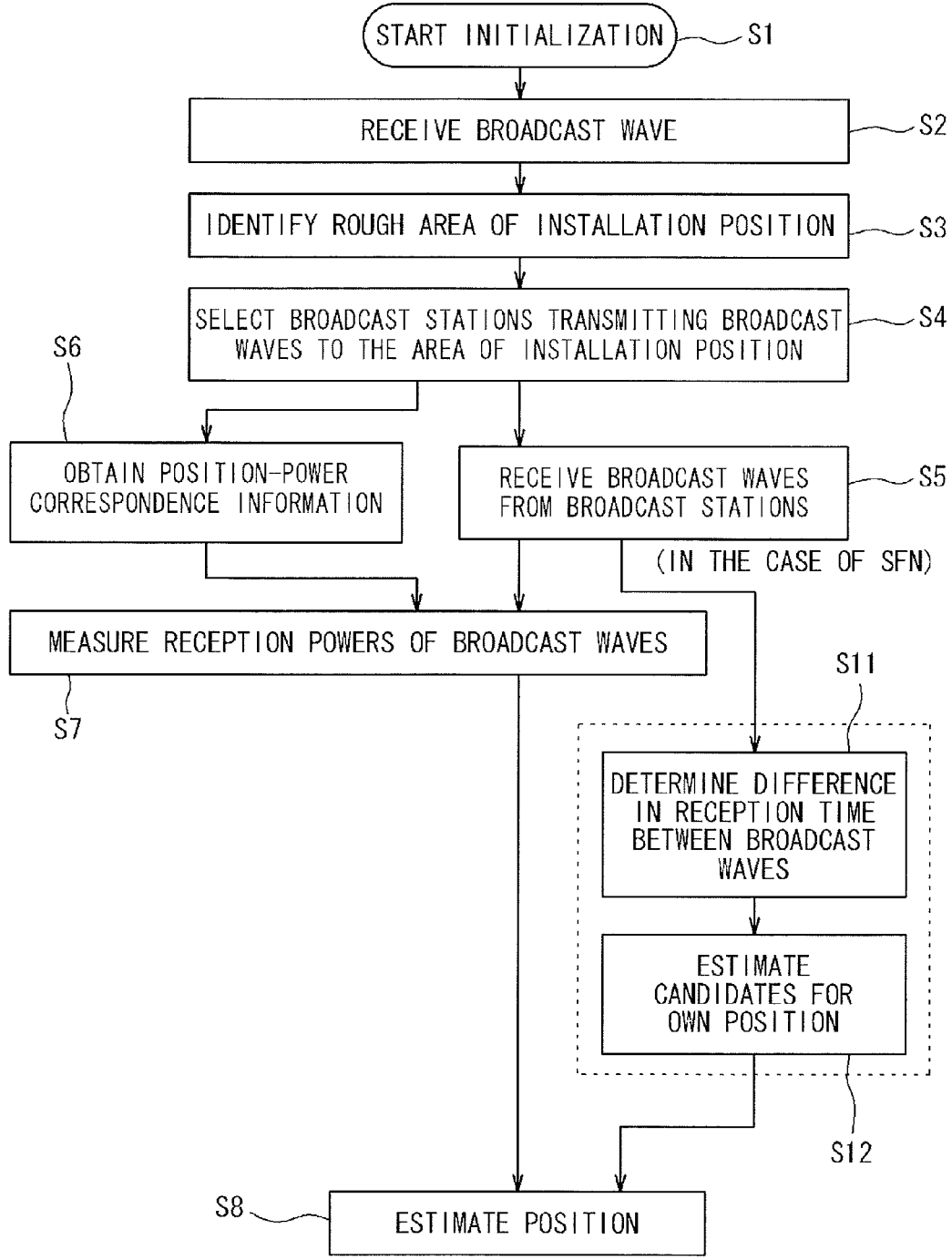
FIG. 23 is a flowchart for explaining a process of estimating the own position.
Figure 24:
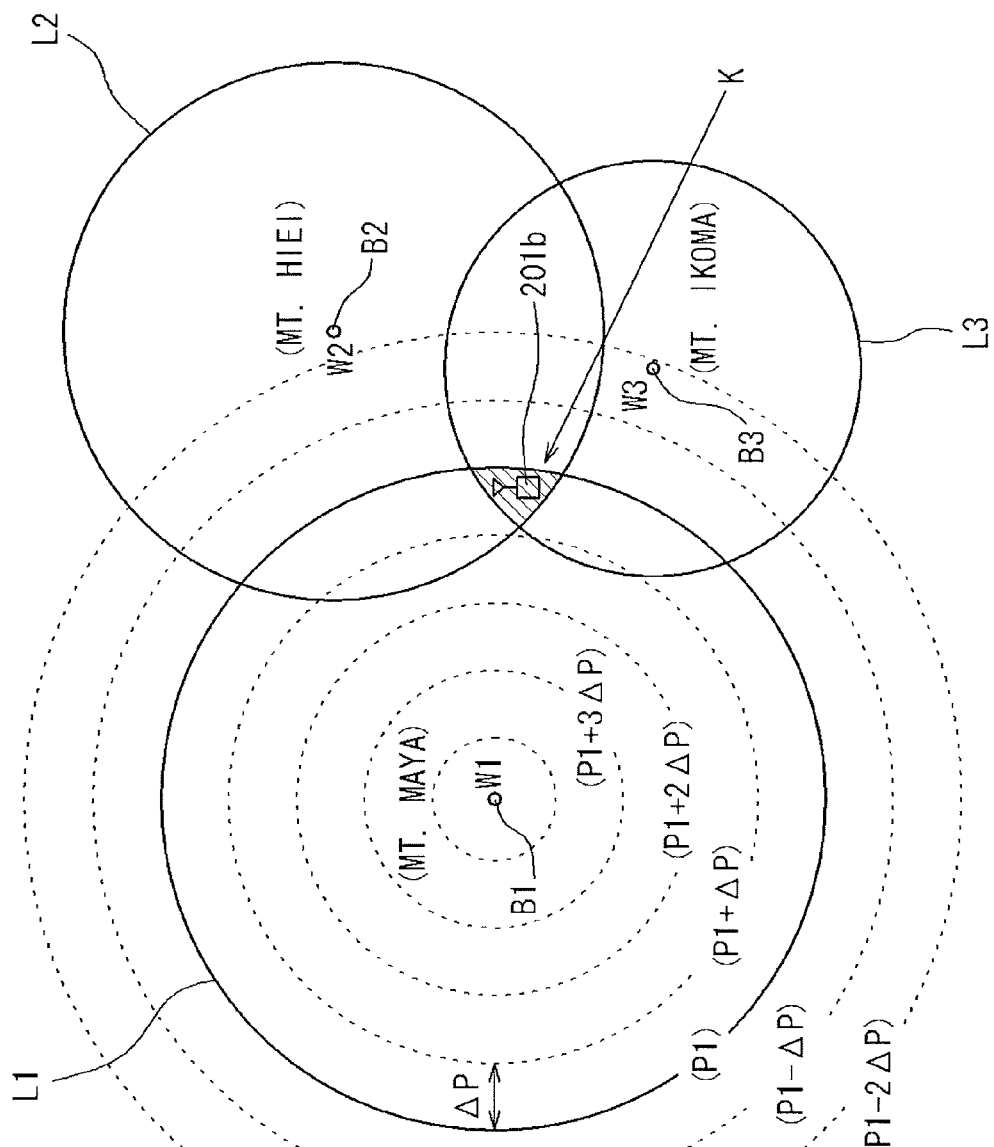
FIG. 24 is a diagram for explaining the process of estimating the own position.

The process of estimating the position of the femto base station device 201b will be described with reference to FIG. 23. When the femto base station device 201b is installed in a predetermined position, it starts initialization (step S1). In an area in which the installation position of the femto base station device 201b is included, broadcast waves are transmitted from the three broadcast stations B1, B2, and B3 as shown in FIG. 24. From at least one of the broadcast stations B1, B2, and B3, a broadcast wave of a channel that broadcasts different programs depending on area is transmitted. An example of a channel that broadcasts different programs depending on area is "NHK General TV (NHK: Nippon Hoso Kyokai)". Further, in the present embodiment, it is assumed that the broadcast waves are radio waves of digital terrestrial television broadcasting, and a broadcast wave of a channel that broadcasts different programs depending on area is transmitted from the first broadcast station B1 shown in FIG. 24.

The broadcast-wave RF unit 207 in the femto base station device 201b receives the broadcast wave of the channel through the antenna 206. The broadcast wave is demodulated by the demodulation unit 208, and a broadcast-wave signal is provided to the position estimation unit 232 (step S2). The broadcast-wave signal includes a network information table (hereinafter referred to as "NIT"), and area codes are included in a satellite delivery system descriptor of the NIT.

Therefore, based on the broadcast wave received by the broadcast-wave RF unit 207, the selection section 242 in the position estimation unit 232 can identify a rough area where the femto base station device 201b is installed (step S3). That is, with reference to the area codes, the selection section 242 identifies the rough area where the femto base station device 201b is installed. In the present embodiment, the rough area is "Kinki area".

The radio wave condition of the broadcast wave need not reach a level at which an image thereof can be output, but may reach a level at which at least an NIT packet can be received. The information that the selection section 242 refers to in order to identify the rough area where the femto base station device 201b is installed is not limited to the area codes in the NIT, but may be broadcaster IDs included in a broadcaster information table.

Then, the selection section 242 selects broadcast stations located in the neighborhood of the installation position of the femto base station device 201b. As described above, since, in step S3, the selection section 242 identifies the rough area where the femto base station device 201b is installed, the selection section 242 selects, based on the identified area, a plurality of broadcast stations that transmit broadcast waves to this area (step S4).

Therefore, in the present embodiment, broadcast station information is stored in a database, in which each of a plurality of areas into which a target region (e.g., Japan) where the femto base station device 201b can be installed is divided is associated with broadcast stations that broadcast broadcast waves to the corresponding area. For example, assuming that one of the areas is "Kinki area", "Mt. Maya broadcast station", "Mt. Hiei broadcast station", and "Mt. Ikoma broadcast station" that broadcast broadcast waves to this area are associated with the "Kinki area", and stored as the broadcast station information.

The broadcast station information further includes information about the locations of the respective broadcast stations. Therefore, the femto base station device 201b (selection section 242) can obtain the locations of the respective broadcast stations.

Since the selection section 242 identifies the rough area where the femto base station device 201b is installed (step S3), the selection section 242 can select a plurality of broadcast stations that broadcast broadcast waves to the identified area, based on the identified area, with reference to the broadcast station information.

In the present embodiment, based on the identified area, i.e., "Kinki area", with reference to the broadcast station information, the selection section 242 can select "Mt. Maya broadcast station B1", "Mt. Hiei broadcast station B2", and "Mt. Ikoma broadcast station B3" that broadcast radio waves to the "Kinki area".

The database in which the broadcast station information is stored may be included in the femto base station device 201b. However, the database is provided in the network, and as shown in FIG. 22, the femto base station device 201b can obtain the broadcast station information via the network to perform the selection process.

Further, position estimation information is also stored in the database. The position estimation information is position-power correspondence information in which a position from each broadcast station is associated with the reception power of the broadcast wave from the broadcast station, which can be received at the corresponding position. The position-power correspondence information is information relating to a broadcast station that broadcasts a broadcast wave to each area, and is used for estimating the position of the femto base station device 201b, based on the reception power of the broadcast wave broadcast from the corresponding broadcast station. The position-power correspondence information is set for each broadcast station.

More specifically, with reference to FIG. 24, in the case of the Mt. Maya broadcast station B1, the reception power of a radio wave transmitted from the broadcast station B1 decreases with distance from the broadcast station B1. Therefore, information in which a contour connecting points of the same reception power is set for each reception power value, is the position-power correspondence information. That is, the position-power correspondence information may be regarded as a contour map of reception powers. In FIG. 24, contours are drawn at intervals of reception power ΔP, and each contour is approximately a circle with the broadcast station in its center.

Referring back to FIG. 23, from each of the broadcast stations B1, B2, and B3 selected by the selection section 242 in step S4, the broadcast-wave RF unit 207 in the femto base station device 201b receives a broadcast wave of a predetermined channel (step S5). In the present embodiment, the broadcast-wave RF unit 207 receives, from the broadcast stations B1, B2, and B3, broadcast waves whose frequencies do not overlap. For example, the broadcast-wave RF unit 207 receives NHK General TV (Kobe) as a first broadcast wave W1 from the "Mt. Maya broadcast station B1", NHK General TV (Kyoto) as a second broadcast wave from the "Mt. Hiei broadcast station B2", and NHK General TV (Osaka) as a third broadcast wave from the "Mt. Ikoma broadcast station B3". The radio wave condition of each broadcast wave need not reach a level at which an image thereof can be output, but may reach a level at which the reception power measurement section 243 in the position estimation unit 232 can measure the reception power.

Further, the obtaining section 241 in the position estimation unit 232 obtains, from the database, the position-power correspondence information (position estimation information) for each of the broadcast stations B1, B2, and B3 selected by the selection section 242 (step S6). In the present embodiment, the obtaining section 241 obtains, from the database, the position-power correspondence information for each of the "Mt. Maya broadcast station B1", the "Mt. Hiei broadcast station B2", and the "Mt. Ikoma broadcast station B3".

The database in which the position-power correspondence information is stored may be included in the femto base station device 201b. However, the database is provided in the network, and the femto base station device 201b can obtain the position-power correspondence information via the network 210.

Then, the reception power measurement section 243 measures the reception powers of the first broadcast wave W1, the second broadcast wave W2, and the third broadcast wave W3 transmitted from the broadcast stations B1, B2, and B3, respectively, and received by the broadcast-wave RF unit 207 (step S7).

Then, the estimation main section 240 estimates the position of the femto base station device 201b, based on the reception powers of the broadcast waves W1, W2, and W3 transmitted from the broadcast stations B1, B2, and B3, respectively, and measured by the reception power measurement section 243, and on the position-power correspondence information obtained by the obtaining section 241 in step S6 (step S8).

Specifically, it is assumed that the reception powers of the broadcast waves W1, W2, and W3 measured by the power measurement section 243 are P1, P2, and P3, respectively. Then, since the reception power of the broadcast wave W1 from the "Mt. Maya broadcast station B1" is P1, it is estimated that the broadcast wave W1 is received on a contour L1 in FIG. 24, according to the position-power correspondence information of the "Mt. Maya broadcast station B1".

Likewise, it is possible to obtain, for the "Mt. Hiei broadcast station B2" and the "Mt. Ikoma broadcast station B3", contours L2 and L3 indicating the positions at which it is estimated that the broadcast waves W2 and W3 are received, respectively.

The distances from the broadcast stations B1, B2, and B3 to the contours L1, L2, and L3 are the distances from the broadcast stations B1, B2, and B3 to the positions at which the broadcast waves W1, W2, and W3 are received, respectively.

From above, the estimation main section 240 can estimate that the intersection of the three contours L1, L2, and L3 is the position of the femto base station device 201b. Since actually a measurement error or the like is contained, it is estimated that the femto base station device 201b is installed, not at the exact point (intersection) as shown in FIG. 24, but in an area K where all the three contours L1, L2, and L3 overlap each other.

[3.5 Position Estimation (2)]

In the above-described embodiment, in step S5, the broadcast-wave RF unit 207 in the femto base station device 201b receives the broadcast waves of channels whose frequencies do no overlap, from the respective broadcast stations selected by the selection section 242. However, the femto base station device 201b might be installed in an area where a single-frequency network (SFN) is constituted. In the SFN, broadcast waves of the same frequency are synchronously broadcast from a plurality of neighboring broadcast stations. The following will describe position estimation in this case.

That is, in the present embodiment, the plurality of broadcast waves W1, W2, and W3 transmitted from the plurality of broadcast stations B1, B2, and B3, which are used by the position estimation unit 232 to estimate the position of the femto base station device 201b, include broadcast waves that have the same frequency and are transmitted synchronously between the broadcast stations.

In this case, the position estimation unit 232 determines a difference in reception time between the broadcast waves having the same frequency, and estimates that the position of the femto base station device 201b exists in a region where the reception time difference occurs. Hereinafter, this estimation process will be specifically described.

It is assumed that the broadcast wave W1 from the "Mt. Maya broadcast station B1" and the broadcast wave W3 from the "Mt. Ikoma broadcast station B3" use the same frequency (same channel), and the broadcast waves W1 and W3 are broadcast synchronously between the both broadcast stations. The broadcast wave W2 from the "Mt. Hiei broadcast station B2" is different from the broadcast waves W1 and W3.

In this case, in step S5 in FIG. 24, the broadcast-wave RF unit 207 in the femto base station device 201b receives signals in a multipath channel. Since the process steps up to step S5 are identical to those of the above-described embodiment, repeated description is not necessary.

FIG. 25 is a diagram for explaining a process performed by the position estimation unit 232 in the femto base station device 201b. FIG. 25(a) shows a reception signal of the broadcast wave W1(W3) received by the broadcast-wave RF unit 207. FIG. 25(a) shows the signal in a frequency domain.

So, the estimation main section 240 in the position estimation unit 232 determines an impulse response of the received signal. For this purpose, inverse Fourier transform is performed to represent the signal in a time domain (refer to FIG. 25(b)). Thereby, it is found that a time difference Δt occurs between one of the broadcast waves W1 and W3 and the other, and the estimation main section 240 can obtain the reception time difference Δt between the broadcast waves W1 and W3 (step S11). In FIG. 25(b), the broadcast wave W1 from the "Mt. Maya broadcast station B1" is on the left while the broadcast wave W3 from the "Mt. Ikoma broadcast station B3" is on the right, although the estimation main section 240 cannot discriminate them.

Based on the reception time difference Δt thus obtained (step S11), the estimation main section 240 can estimate that the position of the femto base station device 201b exists in an area where the reception time difference Δt occurs, because the area where such reception time difference Δt occurs between the "Mt. Maya broadcast station B1" and the "Mt. Ikoma broadcast station B3" is limited.

Figure 26:
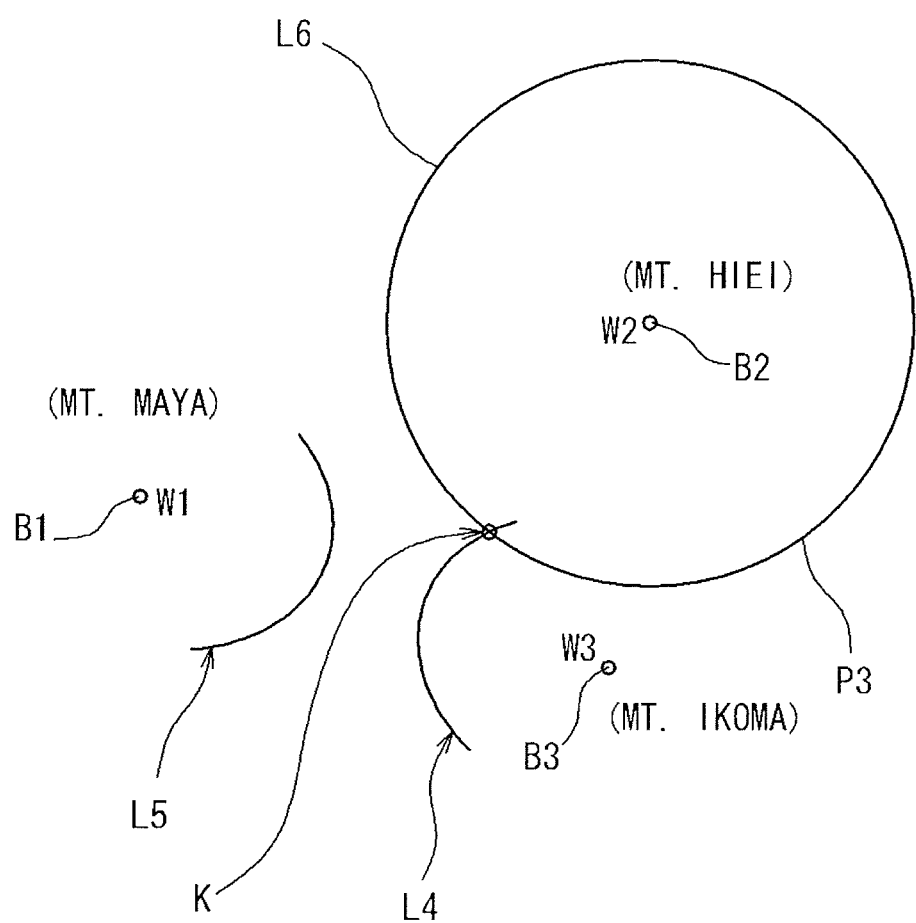
FIG. 26 is a diagram for explaining the process of estimating the own position.

That is, the area where the broadcast waves W1 and W3 of the same frequency which are simultaneously transmitted from the two broadcast stations, the "Mt. Maya broadcast station B1" and the "Mt. Ikoma broadcast station B3", are received with the reception time difference Δt, is limited to an area on a hyperbolic curve (curve L4 or L5) between the two broadcast stations, the "Mt. Maya broadcast station B1" and the "Mt. Ikoma broadcast station B3" as shown in FIG. 26. In this way, the estimation main section 240 can estimate the candidates for the position of the femto base station device 201b by using the broadcast waves W1 and W3 from the "Mt. Maya broadcast station B1" and the "Mt. Ikoma broadcast station B3" (step S12).

Then, as in the above-described embodiment, the broadcast-wave RF unit 207 receives the broadcast wave W2 from the "Mt. Hiei broadcast station B2" (step S5 in FIG. 23), and the reception power measurement section 243 measures the reception power (P3) of the broadcast wave W2 (step S7). Further, as in the above-described embodiment, the obtaining section 241 obtains the position-power correspondence information for the "Mt. Hiei broadcast station B2" selected by the selection section 242 (step S6).

Assuming that, in FIG. 26, the measured reception power of the broadcast wave W3 from the "Mt. Hiei broadcast station B2" is P3, the estimation main section 240 can estimate according to the position-power correspondence information that the broadcast wave W3 is received on the contour L6 in FIG. 26.

Thereby, the estimation main section 240 can estimate that the position of the femto base station device 201b is the intersection between one of the curves L4 and L5 which are the candidates for the position of the femto base station device 201b, and the contour L6 (step S8).

As described above, there is correlation between the distance from a broadcast station and the reception power of a broadcast wave broadcast from the broadcast station. Therefore, in the base station device (femto base station device 201b) of the present invention, the position estimation unit 232 can estimate the position of the femto base station device 201b by using the reception powers of the broadcast waves transmitted from the broadcast stations B1, B2, and B3 and received by the broadcast-wave RF unit 207.

Further, since the obtaining section 241 in the position estimation unit 232 obtains the position-power correspondence information as the position estimation information, the estimation main section 240 in the position estimation unit 232 can easily estimate the position of the femto base station device 201b, based on the reception powers of the broadcast waves received by the broadcast-wave RF unit 207 and on the position-power correspondence information.

Further, although the position-power correspondence information is information relating to each of a plurality of broadcast stations that broadcast broadcast waves to each area, the selection section 242 may identify an area where the femto base station device 201b is installed, and the obtaining section 241 may obtain the position-power correspondence information relating to broadcast stations existing in the neighborhood of the area.

In the above-described embodiment, based on the broadcast waves received by the broadcast-wave RF unit 207, the area where the femto base station device 201b is installed is identified, and thereby a plurality of broadcast stations that transmit the broadcast waves to the area are selected. However, the method by which a base station device identifies an area where it is installed is not limited thereto. For example, when a base station device is installed, the user may input the installation location (area) into the base station device. Thereby, the base station device may select broadcast stations that broadcast radio waves to the installation location (area).

[3.6 Storage of Positional Information]

Referring back to FIG. 22, a description will be given of storage of the positional information in the femto base station device 201b.

The signal processing unit 205 includes the information storage unit 231 which adds and stores, in the broadcast information, the positional information relating to the position (the estimated position) of the femto base station device 201b. A wireless communication device in another cell uses the positional information for an interference suppressing process. The wireless communication device in another cell is a device that receives the broadcast information. Examples of the wireless communication device include: a macro base station device 201a which forms a cell different from the femto cell FC formed by the transmission-side femto base station device 201b; and a femto base station device 201b which is located in the neighborhood of the transmission-side femto base station device 201b but is different from the transmission-side femto base station device 201b.

Figure 27:
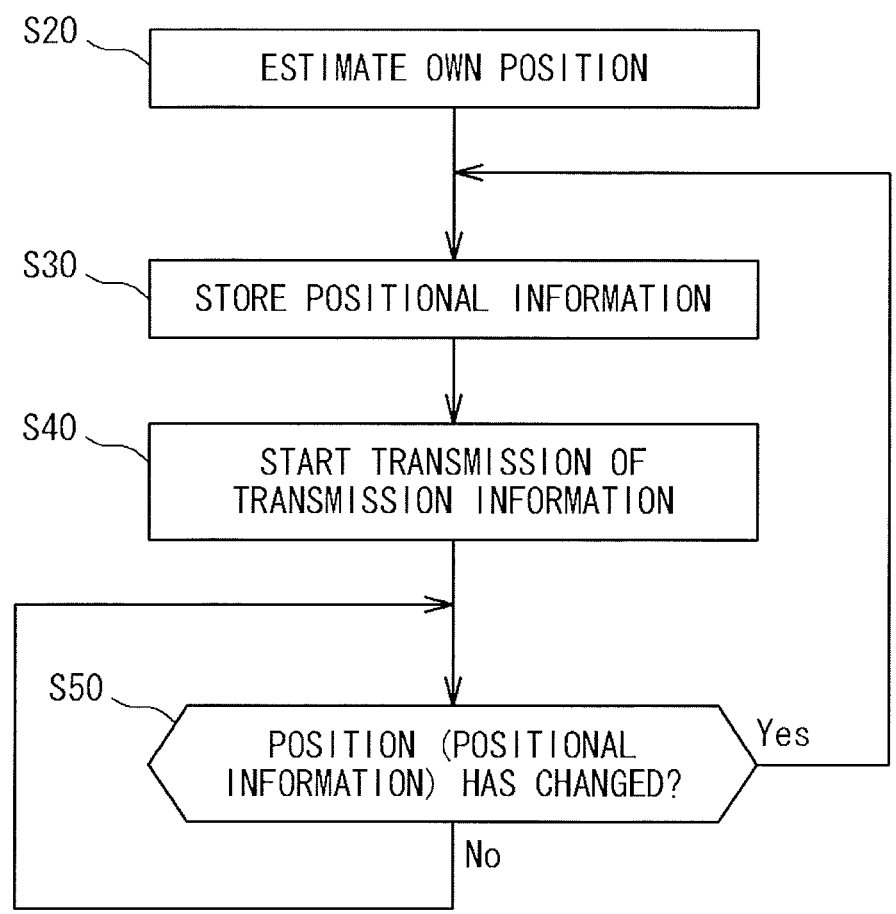
FIG. 27 is a flowchart of a transmission process performed by a femto base station device.

FIG. 27 is a flowchart illustrating a transmission signal (broadcast information) transmitting process by the femto base station device 201b. When the position of the femto base station device 201*b* is estimated by the position estimation unit 232 (step S20), the information storage unit 231 stores, in the broadcast information, the positional information relating to this position (step S30), the modulation/demodulation unit 221 modulates the broadcast information, and the transmission unit 213 in the terminal RF section 204 transmits the broadcast information as a downlink signal (step S40).

Then, a wireless communication device (in FIG. 22, the macro base station device 201*a*) in a cell other than the cell (femto cell FC) of the femto base station device 201*b* receives the broadcast information in which the positional information is stored, and thereby executes an interference suppressing process.

Even after step S40, the position estimation unit 232 estimates the position of the femto base station device 201*b* at predetermined intervals to determine change in the position (positional information) (step S50). If the position greatly changes beyond a threshold (Yes in step S50), the information storage unit 231 performs a process of restoring the changed positional information in the broadcast information (step S30). If the position (positional information) does not change (No in step S50), determination of positional change is repeatedly executed (step S50).

The positional information relating to the estimated position of the femto base station device 201*b*, which has been estimated by the position estimation unit 232, is stored in any resource block together with part of the broadcast information to be transmitted by the femto base station device 201*b*.

The storage area in which the positional information is stored may be, for example, the SIB9 in which information relating to the name of the base station device (femto base station device 201*b*) is stored, as described in [2. Frame structure of LTE].

In the LTE, the SIB9 (48 bytes) is secured as an area for broadcasting the name of the base station device. Since the base station device is allowed to optionally set its own name and set the name in the SIB9, "information of the name of the base station device+positional information of the base station device" are stored in the SIB9. The positional information is latitude and longitude.

Specifically, it is assumed that the position estimation unit 232 obtains, as the positional information of the femto base station device 201*b*, for example, "longitude=+135 deg, 41 min, 35.600 sec" and "latitude=+35 deg, 00 min, 35.600 sec", which are estimated values. In this case, the information storage unit 231 converts the positional information into a predetermined form as follows, according to a predetermined conversion algorithm.

Regarding the longitude, the positional information is converted into numerical values expressed in milliseconds. That is, the following calculation is executed.

$$(longitude) = +135 \ deg, 41 \ min, 35.600 \ sec$$
$$= 600 \ (msec) + 1000 \times 35 \ (sec) + 1000 \times$$
$$60 \times 41 \ (min) + 1000 \times 60 \times 60 \times 135 \ (deg)$$
$$= 488495600 \ (msec)$$

Further, the information storage unit 231 converts this value (488495600) into UTF-8 as follows.
488495600=0x1d1dd9f0
Further, the information storage unit 231 encodes the value in 6 bits of [0-9, A-Z, a-z, +2 symbols] as follows.
0x1d1dd9f0=0T7Tdm Regarding the latitude, the information storage unit 231 converts the positional information by using the same conversion algorithm as above.

$$(latitude) = 35 \ deg, 00 \ min, 35.600 \ sec$$
$$= 126035600 \ (msec)$$

126035600=0x1d1dd9f0
0x1d1dd9f0=07WoQG
Assuming that the name of the femto base station device 201*b* is "MyFemto", "MyFemto" should originally be stored in the SIB9, but the information storage unit 231 additionally stores the encoded positional information to rewrite the name to "MyFemto_07WoQG_0T7Tdm".

The area in which the information storage unit 231 stores the positional information of the femto base station device 201*b* is not limited to the SIB9. That is, the information storage unit 231 is allowed to optionally set a storage area where the positional information is to be stored.

Further, in the case where SIB2 to SIB11 are usually set as an area in which information to be given to the connected terminal devices 202 is stored, this area may be extended up to SIB12, and the positional information may be stored in the SIB12.

[4. Interference Suppression Control in Wireless Communication Device in Another Cell]

When, in the femto base station device 201*b*, the positional information is stored in the transmission information (broadcast information) to start wireless transmission in step S40 in FIG. 27, the macro base station device 201*a* as a wireless communication device in another cell receives the transmission information in which the positional information is stored, and executes an interference suppressing process. The macro base station device 201*a* has the same configuration as the transmission-side femto base station device 201*b*.

The signal processing unit in the macro base station device 201*a* has a separation function for separating the positional information from the broadcast information in which the positional information is stored, in order to execute the interference suppressing process by using the received positional information. That is, when the positional information is stored in the SIBS, "07WoQG_0T7Tdm" can be extracted from "MyFemto_07WoQG_0T7Tdm".

Then, the signal processing unit in the macro base station device 201*a* restores the positional information into the information of the longitude and latitude, by using a conversion algorithm that is a reverse procedure to the above-described conversion algorithm adopted by the information storage unit 231. That is, the positional information is restored to "longitude=+135 deg, 41 min, 35.600 sec" and "latitude=35 deg, 00 min, 35.600 sec".

In this way, the macro base station device 201*a* can separate and extract the positional information of the femto base station device 201*b* from the downlink signal sniffed from the femto base station device 201*b*, and therefore, the signal processing unit can use the positional information for the interference suppressing process.

The antenna of the macro base station device 201*a* is configured as an adaptive array antenna in which a plurality of antennae are arrayed. The signal processing unit in the macro base station device 201*a* has a directionality control function for adaptively controlling the weights on the respective antennae to electrically change the directionalities of the antennae.

Since the signal processing unit in the macro base station device 201a obtains the positional information of the femto base station device 201b in addition to its own positional information, the signal processing unit performs beam forming so as to direct a null beam to the femto base station device 201b, i.e., the femto cell.

Thereby, while a beam is directed to the terminal device 202a in the own cell, a signal (interference signal) from the macro base station device 201a is less likely to reach the terminal device 202b existing in the femto cell FC (another cell), thereby suppressing interference in the terminal device 202b.

According to the above-described embodiment, the femto base station device 201b is able to estimate its own position by using the broadcast waves W1, W2, and W3 broadcast from the broadcast stations B1, B2, and B3, without using a GPS signal. The macro base station device 201a which has received the positional information is able to execute control to suppress interference that occurs between the macro base station device 201a and the femto cell of the femto base station device 201b.

[5. Embodiment in which Terminal Device Performs Position Estimation by Using Broadcast Wave]

Figure 28:
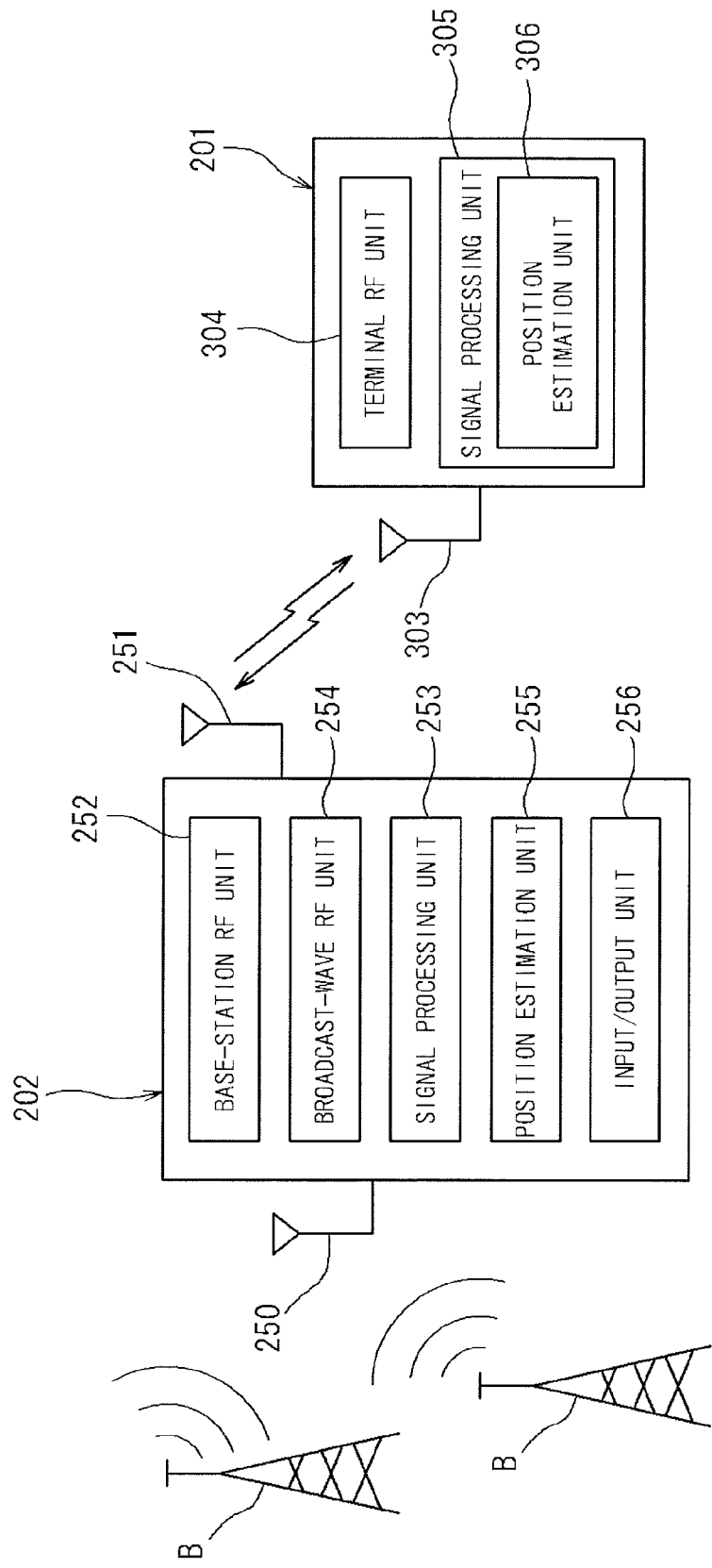
FIG. 28 is a block diagram illustrating schematic configurations of a base station device and a terminal device according to another embodiment.

The base station device (femto base station device 201b) according to the present embodiment shown in FIG. 22 estimates its own position by using the broadcast waves. However, in the embodiment (FIG. 28) described hereinafter, a terminal device 202 estimates its own position by using the broadcast waves from the broadcast stations B, and a base station device 201 receives the information to estimate its own position.

[5.1 Terminal Device]

In order to wirelessly communicate with the base station device 201, the terminal device 202 includes: an antenna 251; a base station RF unit (transmission/reception unit) 252 which is connected to the antenna 251 and transmits and receives radio signals to and from the base station device 201 to communicate with the base station device 201; a signal processing unit 253 which performs signal processing on transmission/reception signals exchanged with the base station RF unit 252; and an input/output unit 256 which is implemented by a keyboard, a monitor and the like, and performs input/output of transmission/reception data. These components are essentially required for the terminal device.

The signal processing unit 253 controls the base station RF unit 252 and the input/output unit 256, and performs processes required for communication with the base station device, such as modulation and demodulation.

In addition to the essentially required components for wireless communication with the base station device 201, the terminal device 202 includes: a broadcast wave antenna 250; a broadcast-wave reception unit (broadcast-wave RF unit) 254 which is connected to the antenna 250, and receives broadcast waves transmitted from a plurality of broadcast stations B; and a position estimation unit 255 which estimates the position of the terminal device 202 by using the reception powers of the broadcast waves transmitted from the broadcast stations B and received by the broadcast-wave RF unit 254. The signal processing unit 253 may have the function of the position estimation unit 255.

The broadcast-wave RF unit 254 can be implemented by a conventionally-known function mounted on a handy phone, which function receives, for example, a radio wave of digital terrestrial television broadcasting and displays an image. Further, the broadcast-wave RF unit 254 is identical to the broadcast-wave RF unit 207 included in the base station device 201b described with reference to FIG. 22, in that it can receive a radio wave of digital terrestrial television broadcasting.

Further, the configuration and function of the position estimation unit 255 included in the terminal device 202 are identical to those of the position estimation unit 232 included in the base station device 201b which is described with reference to FIG. 22. Therefore, a position estimation process performed by the terminal device 202 is realized by sequentially executing the process steps shown in FIG. 23.

Thereby, the terminal device 202 can estimate its own position by using the broadcast waves, without using a GPS signal. Then, the terminal device 202 transmits positional information relating to the estimated position, via the base station RF unit 252 and the antenna 251 to the base station device 201 communicating with the terminal device 202.

[5.2 Base Station Device]

Upon receiving the positional information, the base station device 201 executes the process of estimating its own position, based on the position of the terminal device 202 estimated by the terminal device 202.

For this purpose, the base station device 201 includes: an antenna 303; a transmission/reception unit (terminal RF unit) 304 which is connected to the antenna 303 and transmits and receives radio signals to and from the terminal device 202 to communicate with the terminal device 202; and a signal processing unit 305 which performs signal processing on transmission/reception signals exchanged with the terminal RF unit 304.

Then antenna 303, the terminal RF unit 304, and the signal processing unit 305 are functions essentially required for wireless communication with the terminal device 202, and are identical to those described with reference to FIG. 22.

The signal processing unit 305 controls the terminal RF unit 304, and performs processes required for communication with the terminal device 2, such as modulation and demodulation.

Since, as described above, the terminal device 202 estimates its own position by using the reception powers of the broadcast waves transmitted from the plurality of broadcast stations B, the terminal RF unit 304 receives the positional information about the position of the terminal device 202, from the terminal device 202 via the antenna 303.

The base station device 201 includes a position estimation unit 306 which estimates the position of the base station device 201, based on the positional information about the position of the terminal device 202, which is received by the terminal RF unit 304. In the present embodiment, the signal process unit 305 has the function of the position estimation unit 306.

The position estimation process performed by the position estimation unit 306 is as follows.

Since the terminal device 202 exists in the neighborhood of the base station device 201 to which the terminal device 202 is connected, the position estimation unit 306 in the base station device 201 executes a process of regarding the position based on the positional information of the terminal device 202 as the position of the base station device 201, thereby obtaining its own position.

Alternatively, in the case where a plurality of terminal devices 202 exist in the cell of the base station device 201, and the base station device 201 obtains a plurality of pieces of positional information from the plurality of terminal devices 202, the position estimation unit 306 determines an average value of the positions based on the obtained plurality of pieces of positional information, and regards the average value as the position of the base station device 201. Thereby, the base station device 201 can obtain its own position.

As described above, in the embodiment shown in FIG. 28, when the terminal device 202 estimates its own position by using the reception powers of the broadcast waves transmitted from the plurality of broadcast stations B, the terminal RF unit 304 in the base station device 201 receives the information about the position of the terminal device 202. Then, the position estimation unit 306 in the base station device 201 can estimate the position of the base station device 201, based on the information about the position of the terminal device 202.

In the above-described embodiments, the broadcast waves used for estimating the position of the base station device are broadcast waves of digital terrestrial television broadcasting, but the present invention is not limited thereto. For example, broadcast waves of analog broadcasting, AM or FM radio broadcasting, and the like are also within the scope of the present invention.

Further, in the above-described embodiments, the interference suppressing process executed based on the positional information is directionality control, but the present invention is not limited thereto. The interference suppressing process may be transmission power control and the like.

Further, in the above-described embodiments, the position estimation information is used for position estimation, and the position estimation information is position-power correspondence information which is obtained in advance as information indicating a map of reception powers. However, position estimation may be executed by other means. For example, upon receiving the transmission power value (set value) of a broadcast wave, the position estimation unit may obtain the pass-loss value of the broadcast wave, based on the reception power (measured value) of the broadcast wave, and perform position estimation based on the path-loss value. Since the pass-loss value is a propagation loss depending on the distance between the broadcast station and the base station device, it indicates the level of power at which the current transmission power from the broadcast station reaches the base station device. That is, since there is correlation between the path-loss value obtained from the reception power and the distance from the broadcast station, the distance from the broadcast station can be obtained based on the path-loss value obtained from the reception power, and the position of the base station device can be estimated based on the distance.

The embodiments disclosed in Chapters 1, 2, and 3 are to be considered in all respects as illustrative and not restrictive. The scope of the present invention is indicated by the appended claims rather than by the foregoing meaning, and all changes which come within the meaning and range of equivalency of the claims are therefore intended to be embraced therein.

DESCRIPTION OF THE REFERENCE CHARACTERS 1 base station device
1a macro base station device
1b femto base station device
2a macro terminal device
2b femto terminal device
10 MAC scheduler
11 scheduler main section
11a control area scheduler
11b VoIP scheduler
11c HARQ scheduler
11d data information scheduler
16 power limitation control section
20 PHY unit
30 MAC unit
70 RRM (radio resource management unit)
MC macro cell
FC femto cell
101 base station device
101a macro base station device
101b femto base station device
102a macro terminal device
102b femto terminal device
111 scheduler
111a control area scheduler
111b VoIP scheduler
111c HARQ scheduler
111d data information scheduler
116 power limitation control section
MC macro cell
FC femto cell
201 base station device
202 terminal device
204 terminal RF unit (transmission/reception unit)
205 signal processing unit
207 broadcast-wave RF unit (broadcast-wave reception unit)
232 position estimation unit
240 estimation main section
241 obtaining section
242 selection section
243 reception power measurement section
252 base-station RF unit (transmission/reception unit)
253 signal processing unit
254 broadcast-wave reception unit
255 position estimation unit
304 terminal RF unit (transmission/reception unit)
305 signal processing unit
306 position estimation unit
B1, B2, B3 broadcast station
W1, W2, W3 broadcast wave

The invention claimed is:
1. A base station device, comprising:
a MAC unit which performs processing on a MAC layer for wireless communication;
a PHY unit performing processing on a PHY layer that is a layer lower than the MAC layer;
a scheduler which performs scheduling for determining allocation of radio resources; and
a radio resource management unit which manages the radio resources, and an upper layer that is a layer upper than the MAC layer;
the upper layer being a layer lower than the radio resource management unit, wherein
the MAC unit includes a data buffer for receiving data to be transmitted from the radio resource management unit via the upper layer, and storing the data therein, and is configured to provide data stored in the data buffer to the PHY unit,
the scheduler is configured to provide a result of the allocation of the radio resources to the MAC unit,
the MAC unit is configured to provide data stored in the data buffer to the PHY unit based on the result of the allocation of the radio resources determined by the scheduler, and
the scheduler is connected to the radio resource management unit so as to obtain schedule information required for the scheduling without intervention of the MAC unit and the upper layer.

2. The base station device according to claim 1, wherein the scheduler is configured to obtain schedule information required for the scheduling, from the radio resource management unit without intervention of the MAC unit.

3. The base station device according to claim 2, wherein the radio resource management unit is configured to enable exchange of information between base station devices via an inter-base-station communication interface, and the scheduler obtains, as the schedule information, information received by the radio resource management unit from another base station device via the inter-base-station communication interface.

4. The base station device according to claim 2, wherein the schedule information includes interference control information that is used for interference control for suppressing inter-cell interference, and the scheduler performs the scheduling so as to suppress the inter-cell interference by using the interference control information.

5. The base station device according claim 1, wherein the scheduler is configured to provide allocation information indicating the result of the allocation of the radio resources, to the radio resource management unit without intervention of the MAC unit.

6. The base station device according to claim 5, wherein the radio resource management unit is configured to transmit the allocation information obtained from the scheduler, to another base station device via the inter-base-station communication interface.

7. A base station device, comprising:
a MAC unit which performs processing on a MAC layer for wireless communication;
a PHY unit performing processing on a PHY layer that is a layer lower than the MAC layer;
a scheduler which performs scheduling for determining allocation of radio resources; and
a radio resource management unit which manages the radio resources, and
an upper layer that is a layer upper than the MAC layer;
the upper layer being a layer lower than the radio resource management unit, wherein
the MAC unit includes a data buffer for receiving data to be transmitted from the radio resource management unit via the upper layer, and storing the data therein, and is configured to provide data stored in the data buffer to the PHY unit,
the scheduler is configured to provide the result of the allocation of the radio resources, to the MAC unit,
the MAC unit is configured to provide data stored in the data buffer to the PHY unit based on the result of the allocation of the radio resources determined by the scheduler, and
the scheduler is connected to the radio resource management unit so as to provide allocation information indicating the result of the allocation of the radio resources, to the radio resource management unit without intervention of the MAC unit and the upper layer.

8. A base station device including a scheduler which determines allocation of a plurality of radio resources to terminal devices, wherein
the scheduler is configured to perform power allocation scheduling for determining which the plurality of radio resources are to be allocated to which terminal devices, and a transmission power value for each radio resource, by using a transmission power limit value for each of the plurality of radio resources,
wherein the scheduler is configured to optimize a predetermined evaluation function by using, as a constraint, the transmission power limit value for each of the plurality of radio resources, thereby performing the power allocation scheduling, and
wherein the evaluation function includes, as parameters thereof, a priority of each terminal device and/or a communication quality value of each radio resource,
the base station device further comprising:
a delay information generation section which generates the priority of each terminal device, based on data delay information indicating a transmission delay state of data to be transmitted to each terminal device, wherein
the delay information generation section is configured to provide the priority of each terminal device to the scheduler.

9. The base station device according to claim 8, further comprising:
a data buffer which performs buffering of the data to be transmitted to each terminal device, wherein
the data buffer is configured to provide the data delay information indicating the transmission delay state of the data to be transmitted to each terminal device, to the delay information generation section.

10. The base station device according to claim 8, wherein the evaluation function is an evaluation function relating to throughput.

11. The base station device according to claim 8, wherein the evaluation function is an evaluation function relating to the amount of radio resources used by each terminal device.

12. The base station device according to claim 8, wherein the evaluation function is an evaluation function relating to transmission power.

13. The base station device according to claim 8, wherein the transmission power limit value is obtained from another base station device via a wired interface between the base station devices, or generated based on information obtained from another base station device via the wired interface.

14. The base station device according to claim 8, wherein the transmission power limit value is generated based on a measured value of a radio communication signal in another base station device.

15. The base station device according to claim 8, wherein the transmission power limit value is generated based on information obtained from another base station device via a wired interference between the base station devices, and on a measured value of a radio communication signal in another base station device.

16. A base station device including a scheduler which determines allocation of a plurality of radio resources to terminal devices, wherein
the scheduler is configured to perform power allocation scheduling for determining which the plurality of radio resources are to be allocated to which terminal devices, and a transmission power value for each radio resource, by using a transmission power limit value for each of the plurality of radio resources
wherein
the scheduler includes:
a control area scheduler which secures, in a radio frame, a control area in which control information is stored; and
an audio/video scheduler which determines allocation of the radio resources so that some of remaining radio resources that have not been secured as the control area are secured as an audio/video area in which audio and/or video data are stored, and wherein the audio/video scheduler is configured to minimize the evaluation function indicating the sum of the transmission power values of the radio resources to be the audio/video area, by using, as a constraint, the transmission power limit value for each radio resource, thereby performing the power allocation scheduling.

17. The base station device according to claim 16, wherein the scheduler further includes a retransmission scheduler which determines allocation of the radio resources so that some of remaining radio resources which have been secured as neither the control area nor the audio/video area are secured as a retransmission data area in which retransmission data is stored, and the retransmission scheduler is configured to minimize the evaluation function indicating the sum of the transmission power values of the radio resources to be the retransmission data area by using, as a constraint, the transmission power limit value for each radio resource, thereby performing the power allocation scheduling.

18. The base station device according to claim 17, wherein the scheduler further includes a data information scheduler which determines allocation of the radio resources so that remaining radio resources that have been secured as none of the control area, the audio/video area, and the retransmission area are secured as a general data area in which user data other than the audio/video data and the retransmission data are stored, and the data information scheduler is configured to maximize the evaluation function indicating the sum of the throughputs of the radio resources to be the general data area by using, as a constraint, the transmission power limit value for each radio resource, thereby performing the power allocation scheduling.

* * * * *